United States Patent
Oh

(10) Patent No.: US 12,537,978 B2
(45) Date of Patent: Jan. 27, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Hyunmook Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/702,629

(22) PCT Filed: Oct. 18, 2022

(86) PCT No.: PCT/KR2022/015855
§ 371 (c)(1),
(2) Date: Apr. 18, 2024

(87) PCT Pub. No.: WO2023/068754
PCT Pub. Date: Apr. 27, 2023

(65) Prior Publication Data
US 2025/0227294 A1  Jul. 10, 2025

(30) Foreign Application Priority Data
Oct. 18, 2021 (KR) .................. 10-2021-0138562

(51) Int. Cl.
*H04N 19/597* (2014.01)
*H04N 19/137* (2014.01)
(Continued)

(52) U.S. Cl.
CPC ......... *H04N 19/597* (2014.11); *H04N 19/137* (2014.11); *H04N 19/167* (2014.11); *H04N 19/172* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2020/0258262 A1* | 8/2020 | Lasserre | G06F 17/16 |
| 2021/0289211 A1 | 9/2021 | Oh et al. | |
| 2023/0217046 A1* | 7/2023 | Nishi | H04N 19/597 |

FOREIGN PATENT DOCUMENTS

| | | |
|---|---|---|
| EP | 4365845 A1 | 5/2024 |
| KR | 10-2019-0082065 A | 7/2019 |

(Continued)

OTHER PUBLICATIONS

International Search Report and Written Opinion in International Appln. No. PCT/KR2022/015855, mailed on Feb. 7, 2023, 16 pages (with English translation).
Extended European Search Report in European Appln. No. 22883977.5, mailed on Aug. 5, 2025, 13 pages.

(Continued)

*Primary Examiner* — Christopher Braniff
(74) *Attorney, Agent, or Firm* — Fish & Richardson P.C.

(57) ABSTRACT

A point cloud data transmission method according to embodiments comprises the steps of: encoding geometry data of point cloud data; encoding attribute data of the point cloud data on the basis of the geometry data; and transmitting the encoded geometry data, the encoded attribute data, and signaling data, wherein the step of encoding the geometry data may comprise the steps of: converting coordinates of the geometry data from a first coordinate system to a second coordinate system; and compressing the geometry data by performing prediction between neighboring frames on the second coordinate system.

16 Claims, 40 Drawing Sheets

(51) Int. Cl.
*H04N 19/167* (2014.01)
*H04N 19/172* (2014.01)
*H04N 19/70* (2014.01)

(56) References Cited

FOREIGN PATENT DOCUMENTS

| KR | 10-2020-0026196 A | 3/2020 |
| KR | 10-2020-0037442 A | 4/2020 |
| KR | 10-2021-0116336 A | 9/2021 |
| WO | WO 2020/189982 A1 | 9/2020 |
| WO | 2022/147100 A1 | 7/2022 |

OTHER PUBLICATIONS

Iguchi et al., "[G-PCC] EE13.47 report on spherical coordinate geometry," ISO/IEC JTC 1/SC 29/WG 7 m58051, International Organisation for Standardisation Organisation Internationale De Normalisation, ISO/IEC JTC 1/SC 29/WG 7 Coding of Moving Pictures and Audio, Online, Oct. 2021, 9 pages.

WG 7, MPEG 3D Graphics Coding, "G-PCC codec description," ISO/IEC JTC 1/SC 29/WG 7 N0151, International Organization for Standardization, Organisation Internationale De Normalisation, ISO/IEC JCT I/SC 29/WG 7 MPEG 3D Graphics Coding, Virtual, Jul. 2021, 151 pages.

WG 7, MPEG 3D Graphics Coding, "Technologies under Consideration in G-PCC," ISO/IEC JTc 1/SC 29/WG 7 N00167, International Organization for Standardization Organisation Internationale De Normalisation ISO/IEC JTC 1/SC 29/WG 7 MPEG 3D Graphics Coding, Virtual, Jul. 2021, 44 pages.

\* cited by examiner

FIG. 6
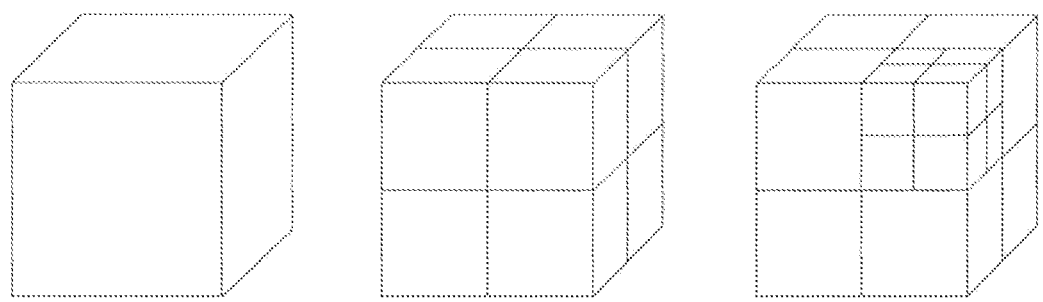
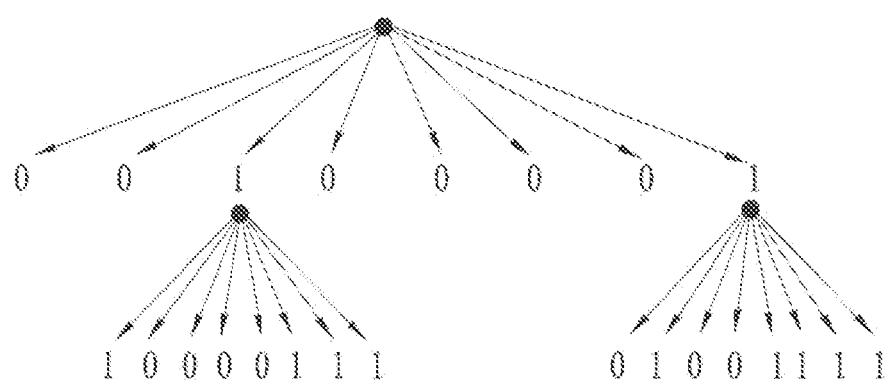

FIG. 7
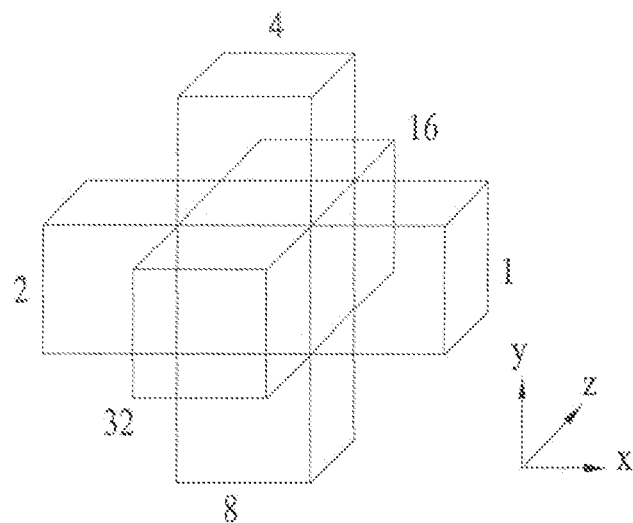
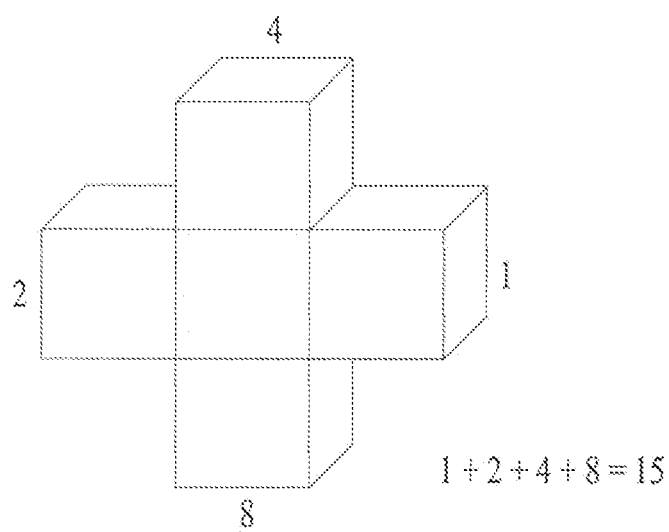
1+2+4+8=15

FIG. 25
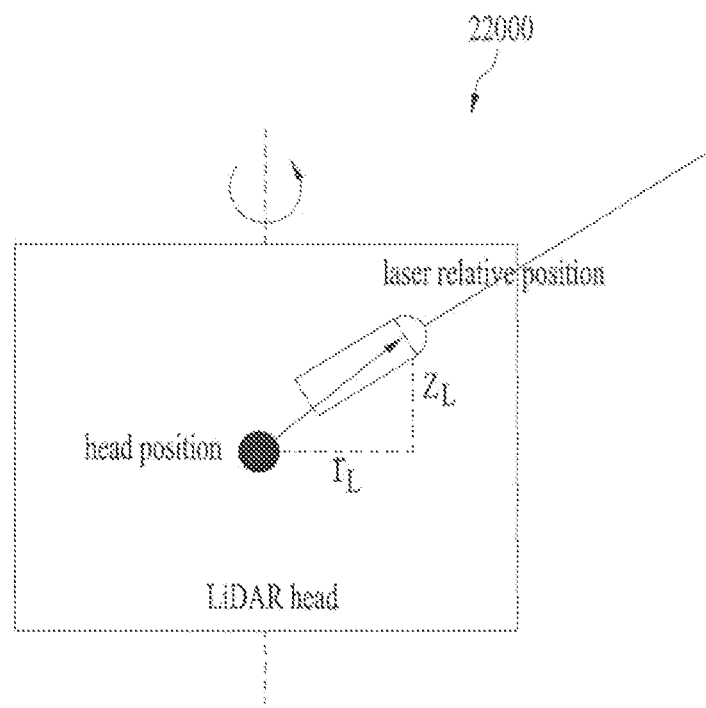
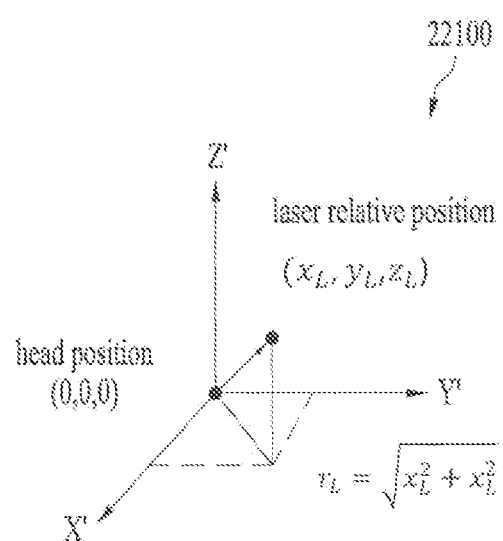

FIG. 29
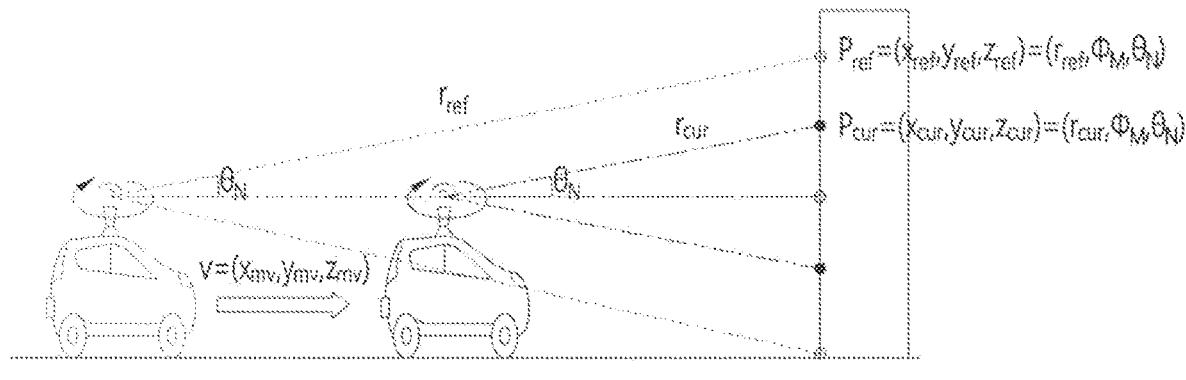
(a)
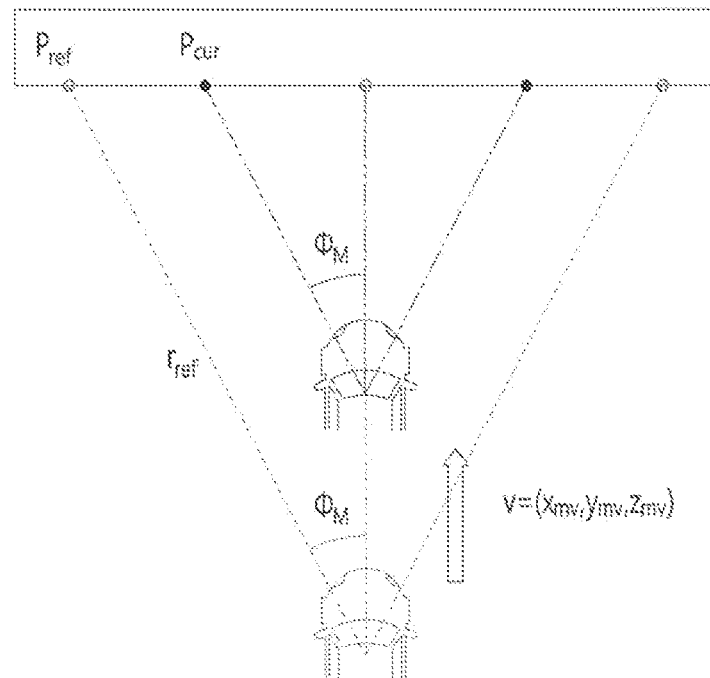
(b)

FIG. 31
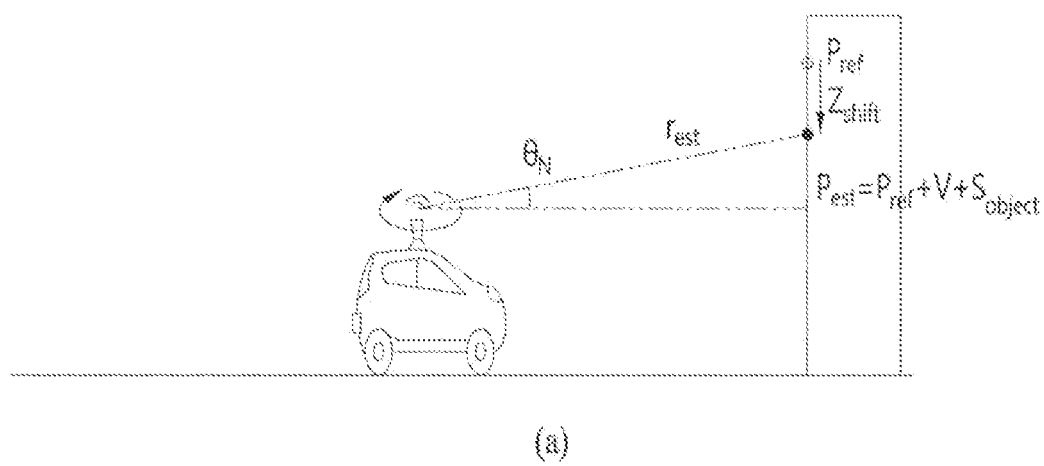
(a)
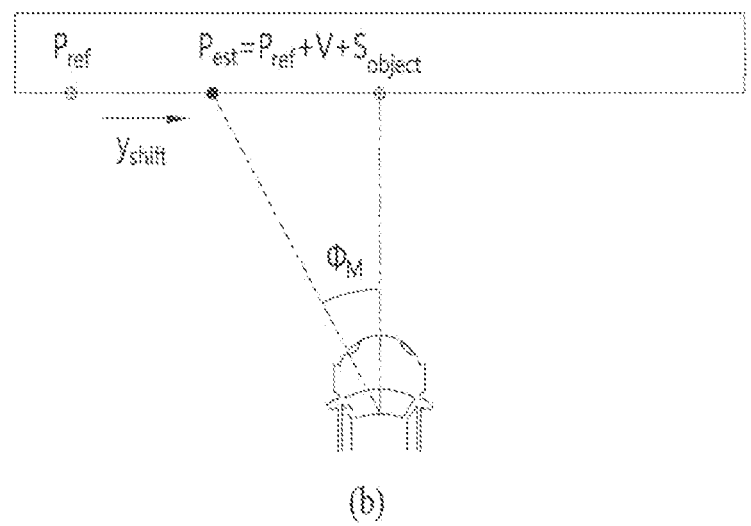
(b)

FIG. 35

| geometry_parameter_set ( ) { | Descriptor |
|---|---|
| ...... | |
| motion_vector_disabled_flag | u(1) |
| spherical_residual_enabled_flag | |
| } | |

FIG. 36

| geometry_data_unit( ) { | Descriptor |
|---|---|
|    geometry_data_unit_header( ) | |
|    if( geom_tree_type == 0 ) | |
|       occupancy_tree( ) | |
|    else if( geom_tree_type == 1 ) | |
|       geometry_predtree_data( ) | |
|    geometry_data_unit_footer( ) | |
| } | |

FIG. 37

| geometry_data_unit_header ( ) { | Descriptor |
|---|---|
| ..... | |
| ref_frame_id | u(8) |
| if(!motion_vector_disabled_flag) { | |
|     mv_depth_start | u(8) |
|     mv_depth_end | u(8) |
| } | |
| if(spherical_residual_enabled_flag ) { | |
|     skip_angles_flag | |
|     if(!skip_angles_flag) { | |
|         per_point_three_residual_signaling_flag | |
|         if(per_point_three_residual_signaling_flag) | |
|             threshold | |
|     } | |
| } | |
| ..... | |
| } | |

FIG. 38

| data_unit ( ) { | Descriptor |
|---|---|
| ..... | |
| if (!motion_vector_disabled_flag) { | |
|   for (i = mv_depth_start; i < maxDepth; i++) { | |
|     for(j = all nodes in depth i) { | |
|       if (i <= mv_depth_end && parentSplitFlag == 1) { | |
|         split_flag[i][j] | u(1) |
|         if(split_flag[i][j] == 0) { | |
|           population_flag[i][j] | u(1) |
|           if(population_flag[i][j] == 1) { | |
|             for(k=0; k<3; k++) | |
|               motion_vector[i][j][k] | u(8) |
|           } | |
|         } | |
|       } | |
|       occupancy_map[i][j] | ae(v) |
|     } | |
|   } | |
| } | |
| if(spherical_residual_enabled_flag){ | |
|   res_radius | |
|   if(!skip_angles_flag) { | |
|     if (per_point_three_residual_signaling_flag) | |
|       three_residual_signaling_flag | |
|       if(three_residual_signaling_flag) | |
|         res_azimuthal_angle | |
|         res_elevation_angle | |
|       } | |
|     } | |
|   } | |
| } | |
| res_x | |
| res_y | |
| res_z | |
| ..... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2022/015855, filed on Oct. 18, 2022, which claims the benefit of Korean Application No. 10-2021-0138562, filed on Oct. 18, 2021. The disclosures of the prior applications are incorporated by reference in their entirety.

TECHNICAL FIELD

Embodiments relate to a method and apparatus for processing point cloud content

BACKGROUND

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), XR (Extended Reality), and self-driving services. However, tens of thousands to hundreds of thousands of point data are required to represent point cloud content. Therefore, there is a need for a method for efficiently processing a large amount of point data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for efficiently transmitting and receiving a geometry-point cloud compression (G-PCC) bitstream.

Another object of the present disclosure is to provide a point cloud data transmission device, a transmission method, a point cloud data reception device, and a reception method for compressing point cloud data based on similarity between frames.

Objects of the present disclosure are not limited to the aforementioned objects, and other objects of the present disclosure which are not mentioned above will become apparent to those having ordinary skill in the art upon examination of the following description.

Technical Solution

According to an embodiment, a point cloud data transmission method includes encoding geometry data of point cloud data, encoding attribute data of the point cloud data based on the geometry data, and transmitting the encoded geometry data, the encoded attribute data, and signaling data, wherein the encoding of the geometry data includes transforming a coordinate of the geometry data from a first coordinate system to a second coordinate system, and compressing the geometry data by performing prediction between adjacent frames on the second coordinate system.

The first coordinate system may be a Cartesian coordinate system constructed by an x axis, a y axis, and a z axis, and the second coordinate system may be a spherical coordinate system constructed by a radius, an azimuthal angle, and an elevation angle.

The point cloud data may be obtained by at least one laser, and the encoding of the geometry data may further include estimating a point position of a current frame based on position information of a point of a previous frame corresponding to a sampling position of the at least one laser and relative movement information of an object.

The at least one laser and the sampling position may be fixed.

The encoding of the geometry data may further include obtaining radius residual information based on radius information of position information of a point of the reference frame and radius information of the estimated position information of the point and outputting a prediction error.

According to an embodiment, a point cloud data transmission device includes a geometry encoder configured to encode geometry data of point cloud data, an attribute encoder configured to encode attribute data of the point cloud data based on the geometry data, and a transmitter configured to transmit the encoded geometry data, the encoded attribute data, and signaling data, wherein the geometry encoder is configured to transform a coordinate of the geometry data from a first coordinate system to a second coordinate system and compress the geometry data by performing prediction between adjacent frames on the transformed second coordinate system.

The first coordinate system may be a Cartesian coordinate system constructed by an x axis, a y axis, and a z axis, and the second coordinate system may be a spherical coordinate system constructed by a radius, an azimuthal angle, and an elevation angle.

The point cloud data may be obtained by at least one laser, and the geometry encoder may be configured to estimate a point position of a current frame based on position information of a point of a previous frame corresponding to a sampling position of the at least one laser and relative movement information of an object.

The at least one laser and the sampling position may be fixed.

The geometry encoder may be configured to obtain radius residual information based on radius information of position information of a point of the reference frame and radius information of the estimated position information of the point and output a prediction error.

According to an embodiment, a point cloud data reception method includes a receiving geometry data, attribute data, and signaling information, decoding the geometry data based on the signaling information, decoding the attribute data based on the signaling information and the decoded geometry data, and rendering point cloud data restored from the decoded geometry data and the decoded attribute data based on the signaling information, wherein the decoding of the geometry data includes restoring the geometry data from a first coordinate system based on the signaling information and transforming the restored geometry data to a second coordinate system.

The first coordinate system may be a spherical coordinate system constructed by a radius, an azimuthal angle, and an elevation angle, and the second coordinate system may be a Cartesian coordinate system constructed by an x axis, a y axis, and a z axis.

The point cloud data may be obtained by at least one laser at a transmitting side, and a point position of a current frame may be estimated based on a point of a reference frame in a state in which the at least one laser and the sampling position are fixed.

The signaling data may include information about whether a prediction error included in the received geometry data includes only radius residual or includes radius residual information, azimuthal angle residual information, and elevation angle residual information.

The prediction error may further include residual information for each of an x axis, a y axis, and a z axis of a Cartesian coordinate system.

Advantageous Effects

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as a self-driving service (or an autonomous driving service).

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefore, thereby improving encoding and decoding performance of the point cloud.

A point cloud data transmission method, a point cloud data transmission device, a point cloud data reception method, and a point cloud data reception device according to embodiments may estimate a point position based on point similarity between adjacent frames for spinning LiDAR to remove redundant information present on the time axis, thereby improving compression efficiency of point cloud data.

A point cloud data transmission method, a point cloud data transmission device, a point cloud data reception method, and a point cloud data reception device according to embodiments may more accurately predict a point position of a reference frame by further considering movement of vertical movement according to LiDAR movement based on laser-based sampling characteristics of spinning LiDAR. The similarity between the current point and the predicted point may be increased, thereby reducing a residual component that makes up a bitstream and increasing compression efficiency.

A point cloud data transmission method, a point cloud data transmission device, a point cloud data reception method, and a point cloud data reception device according to embodiments may further increase compression efficiency by not transmitting a portion of a residual when prediction accuracy is high.

A point cloud data transmission device and an encoder according to embodiments have an effect of efficiently compressing point cloud data by additionally considering not only intra-frame prediction but also inter-frame data prediction mode. Likewise, the point cloud data receiving device and the decoder according to embodiments have an effect of efficiently restoring the point cloud data based on signaling information in a bitstream and/or a decoding operation according to embodiments by receiving the bitstream including the point cloud data.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 6 illustrates an example of octree and occupancy code according to embodiments.

FIG. 7 illustrates an example of a neighbor node pattern according to embodiments.

Figure 16:
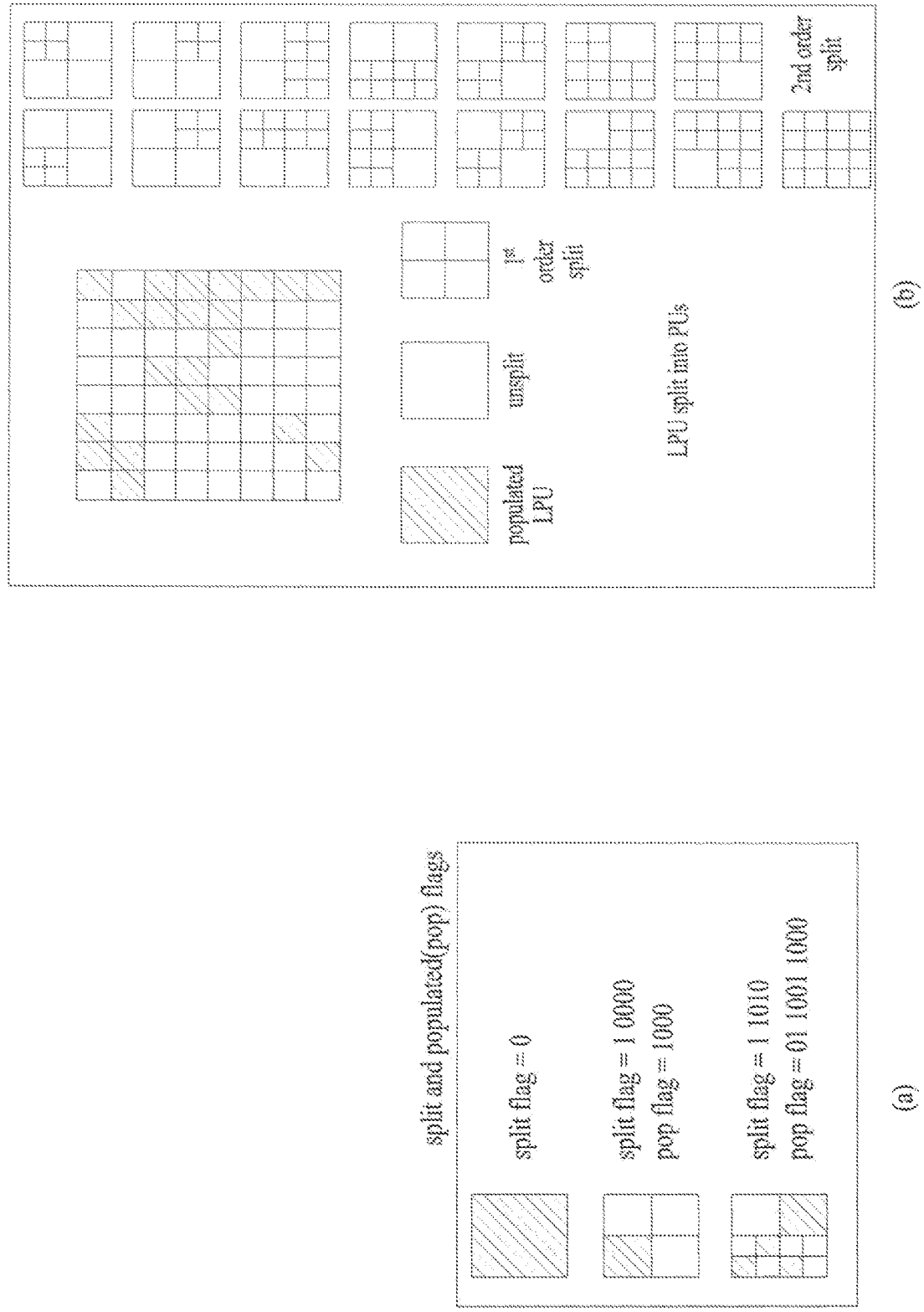

(a) of FIG. 16 and (b) of FIG. 16 are diagrams illustrating examples of signaling of split and flag information in an octree structure according to embodiments.

Figure 17:
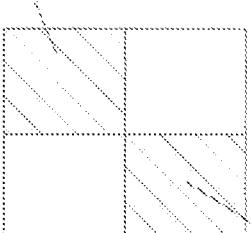

FIG. 17 is a diagram illustrating an example of calculating a cost function for an octree node according to embodiments.

Figure 18:
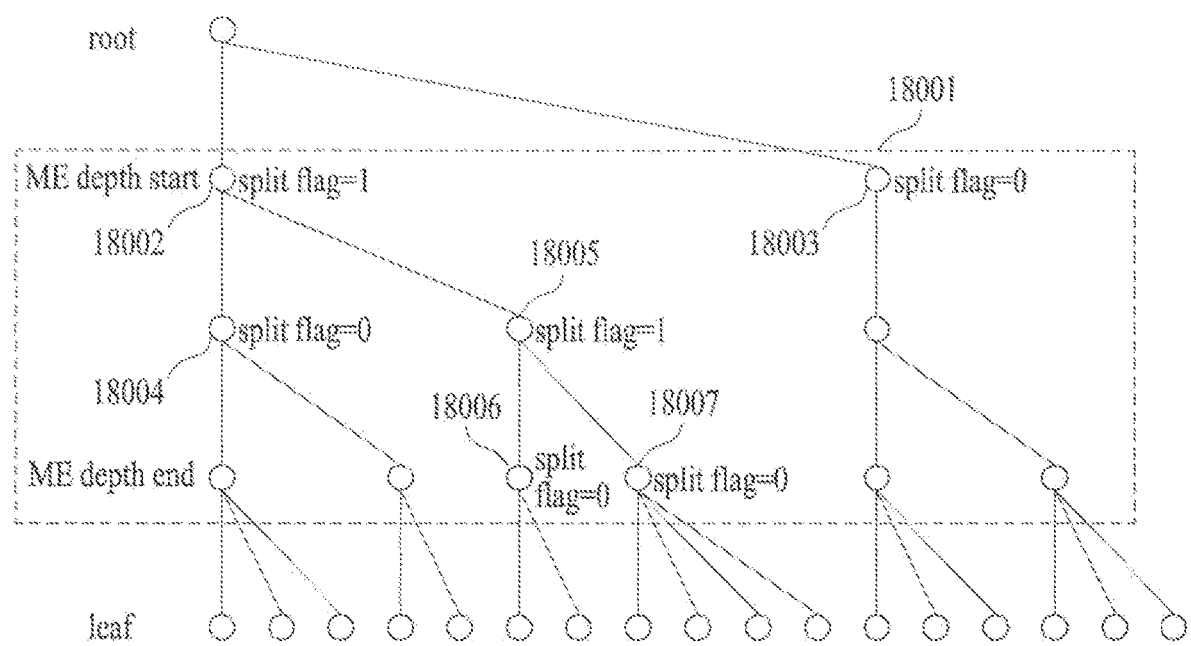

FIG. 18 is a diagram illustrating an example of performing splitting at an octree depth according to embodiments.

Figure 19:
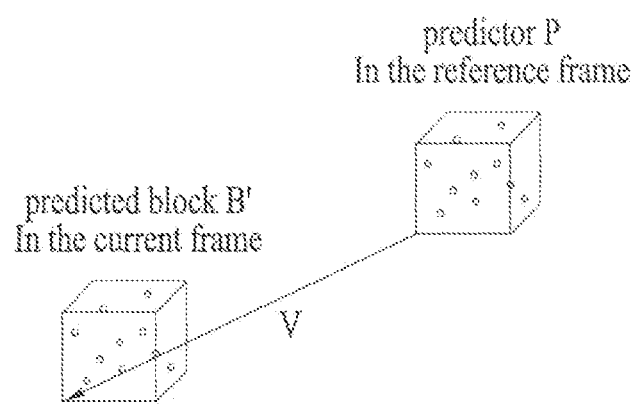

FIG. 19 is a diagram illustrating an example of inter-prediction according to embodiments.

Figure 20:
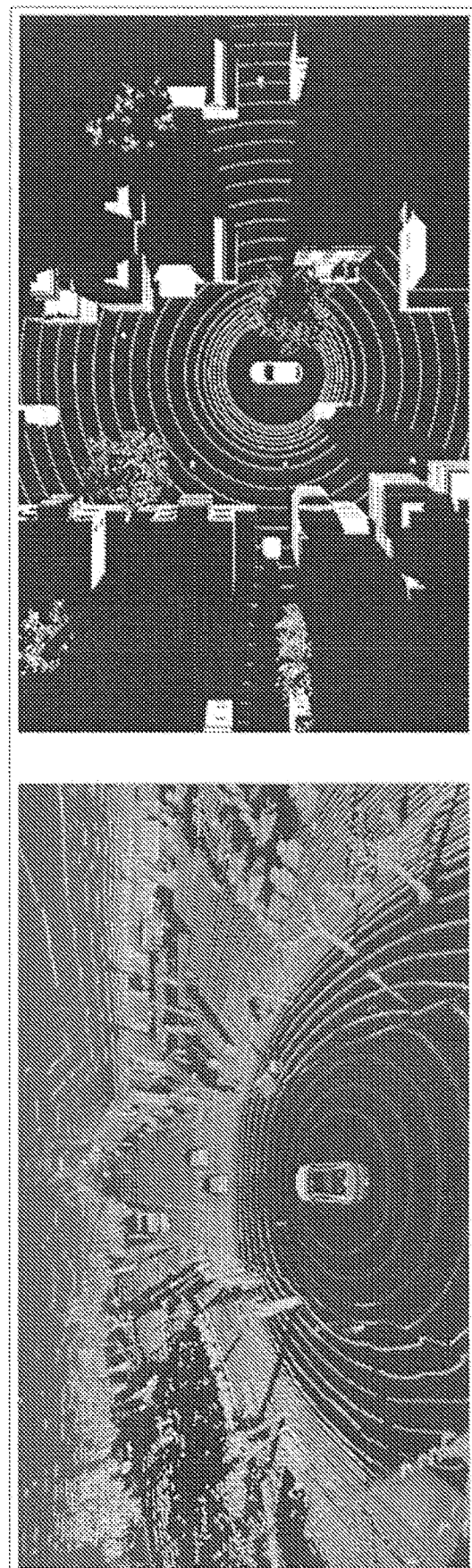

(a) of FIG. 20 and (b) of FIG. 20 show point cloud data obtained by spinning LiDAR installed in a vehicle according to embodiments.

Figure 21:
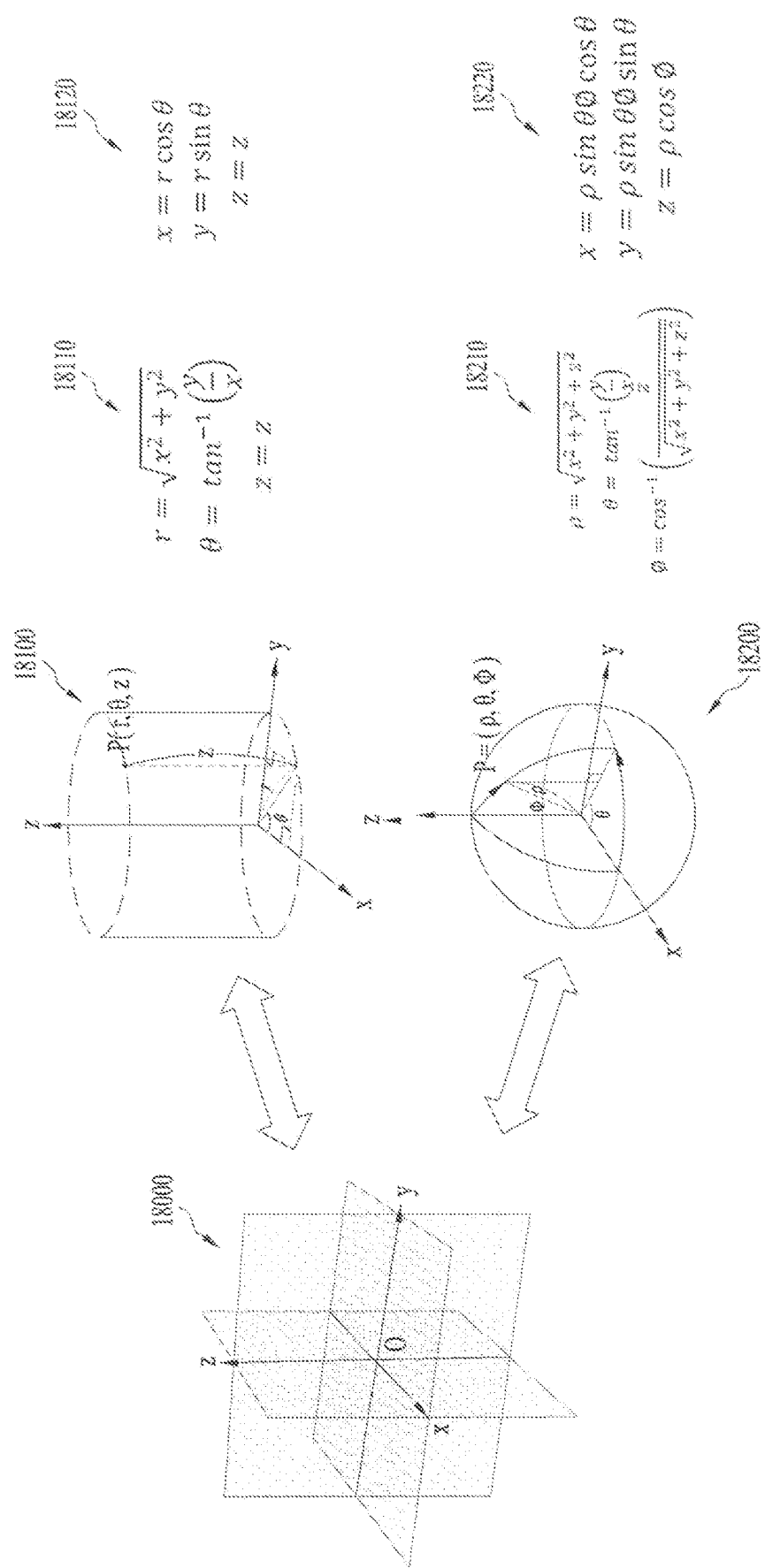

FIG. 21 is a diagram showing an example of a coordinate system transformation process of point cloud data according to embodiments.

Figure 22:
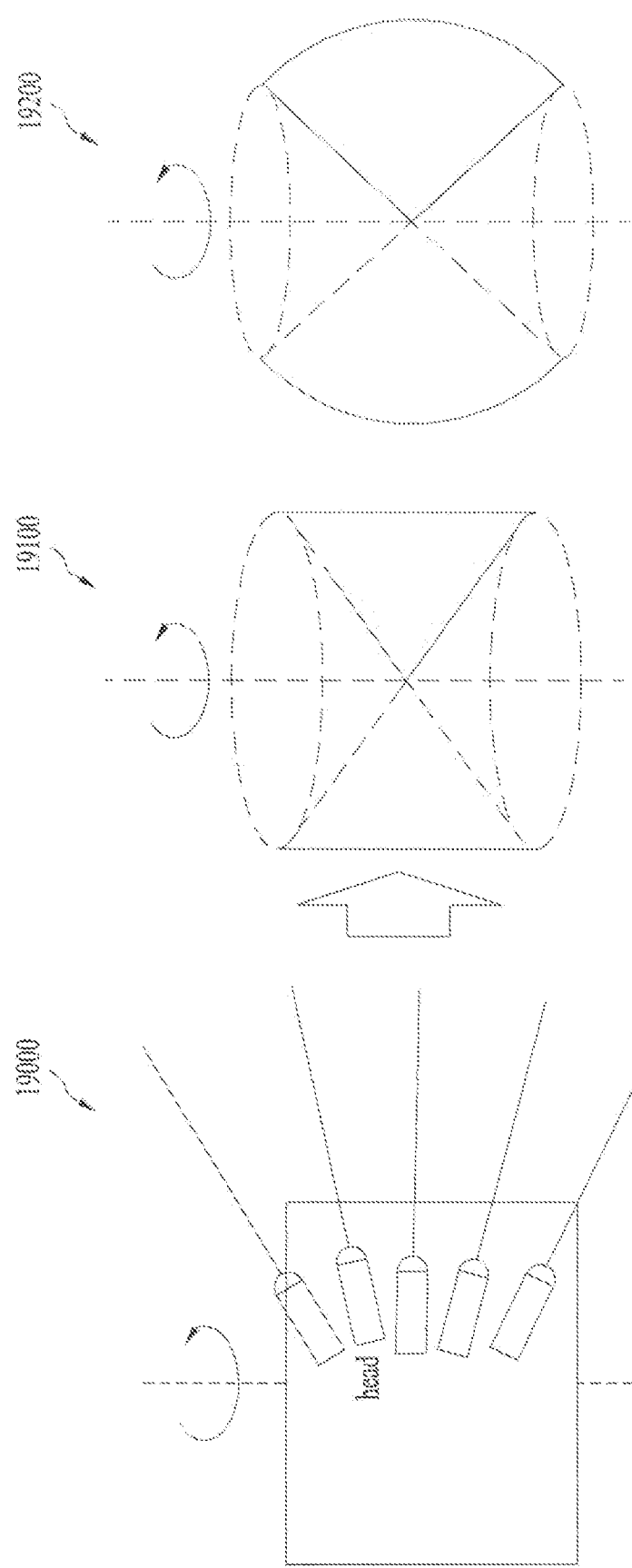

FIG. 22 is a diagram showing an example of sector-shaped coordinate system according to embodiments.

Figure 23:
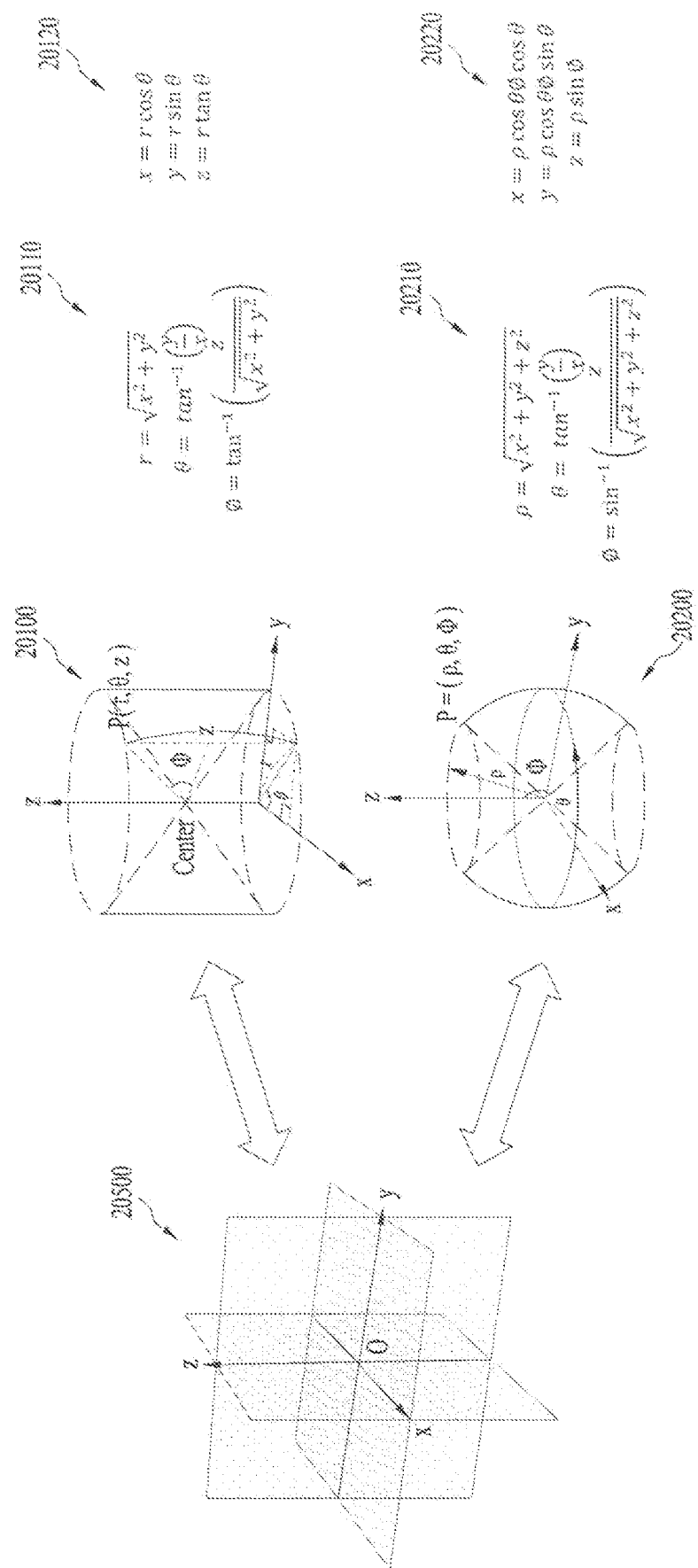

FIG. 23 is a diagram showing an example of a sector-shaped coordinate system transformation of point cloud data according to embodiments.

Figure 24:
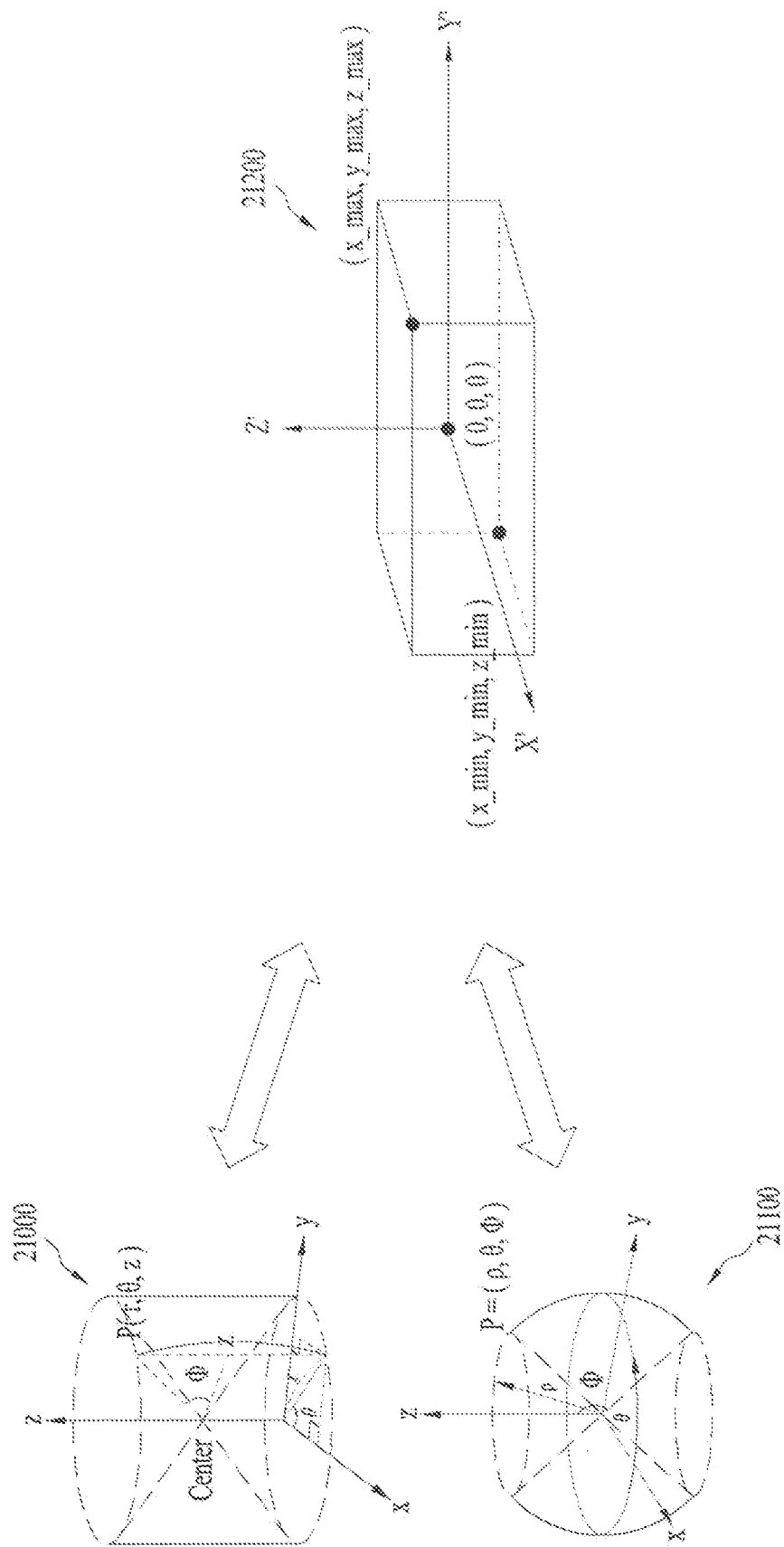

FIG. 24 is a diagram showing an example of coordinate projection of point cloud data according to embodiments.

FIG. 25 is a diagram showing an example of adjustment of a laser position of point cloud data according to embodiments.

Figure 26:
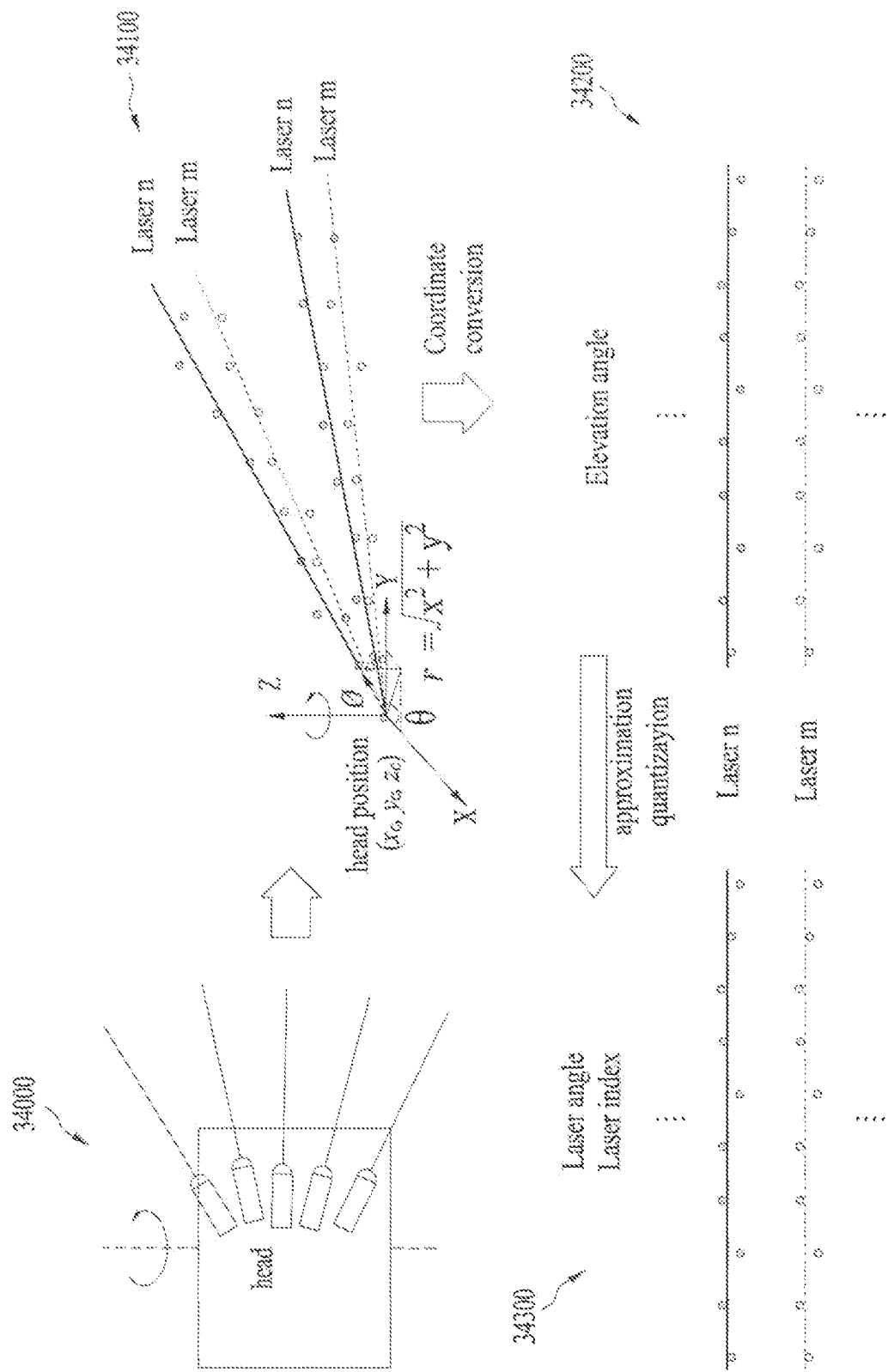

FIG. 26 shows an example of converting point cloud data into an index according to embodiments.

Figure 27:
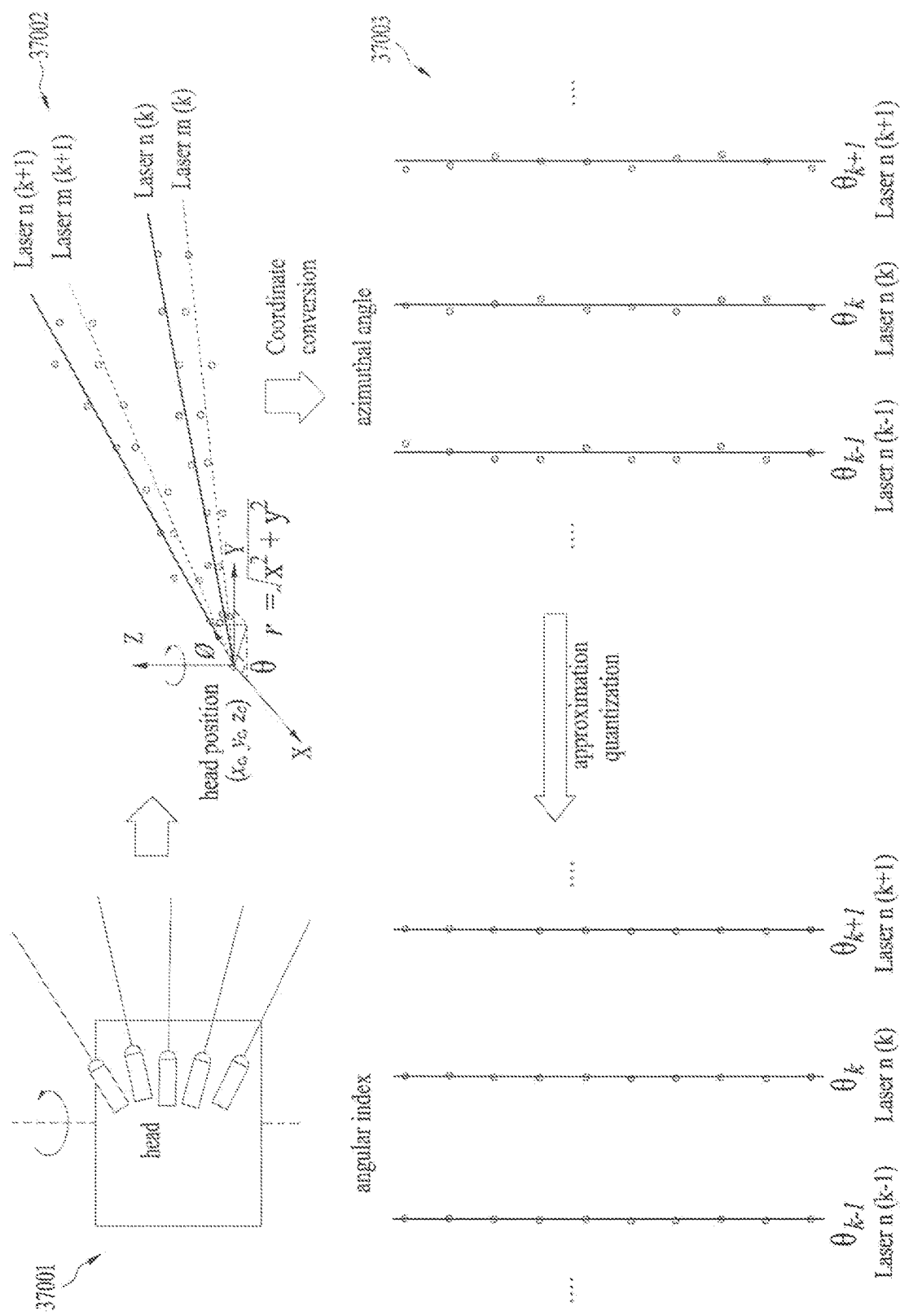

FIG. 27 shows an example of correction by converting an azimuthal angle into an index in point cloud data according to embodiments.

Figure 28:
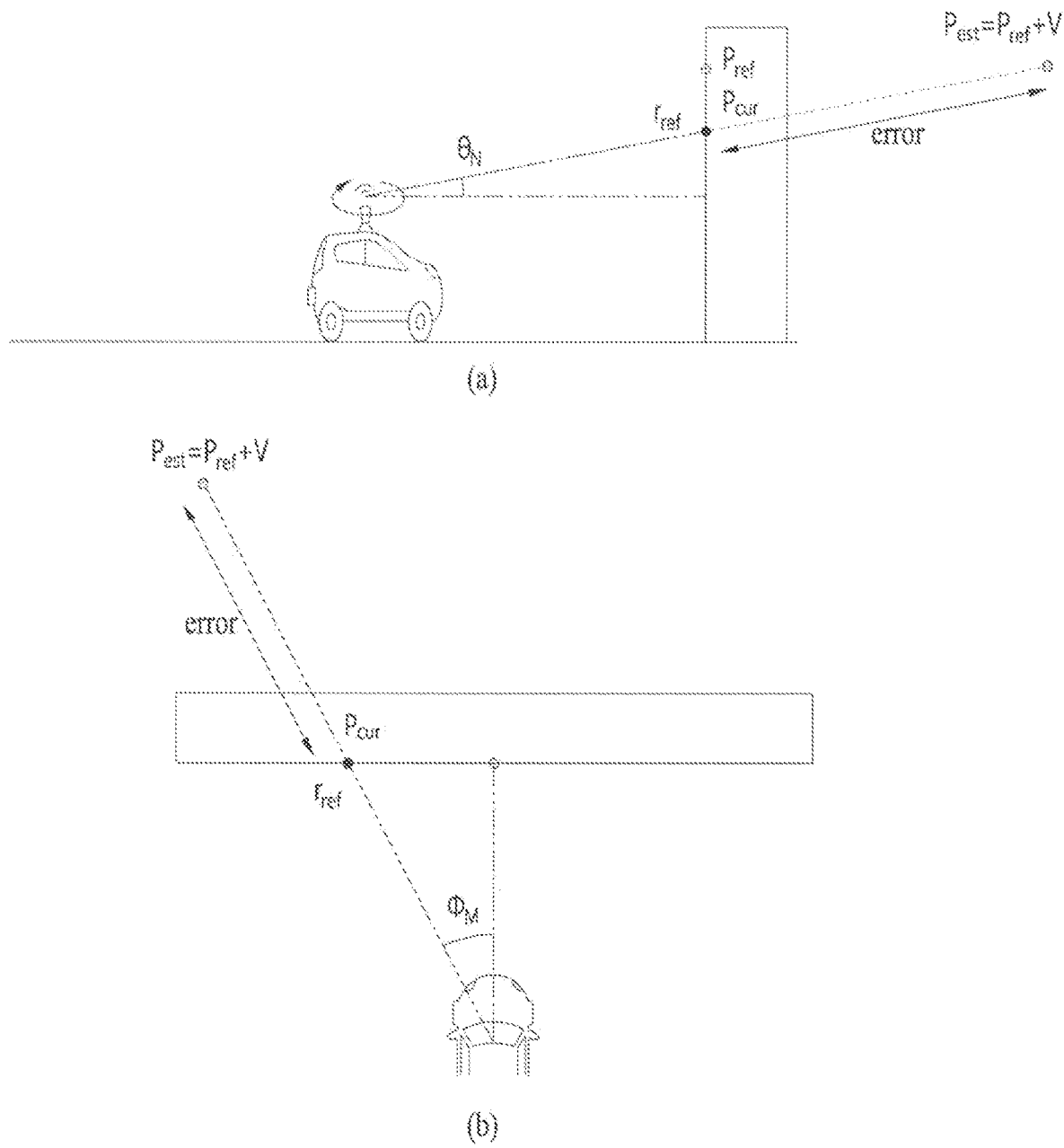

(a) of FIG. 28 and (b) of FIG. 28 are diagrams showing an example of changes in points generated as a vehicle equipped with a LiDAR system moves, according to embodiments.

(a) of FIG. 29 and (b) of FIG. 29 are diagrams showing an example of a difference between an estimated position of a point and a position of a target according to embodiments.

Figure 30:
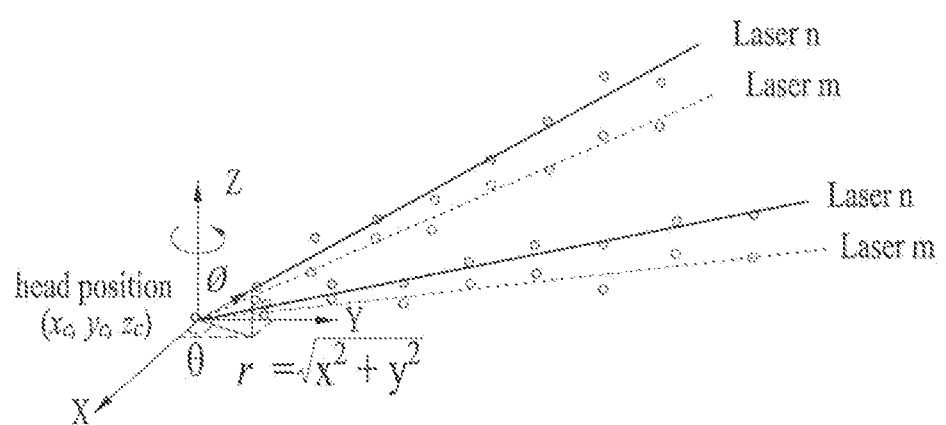

FIG. 30 illustrates an example in which a laser index is used as a value obtained by simplifying an elevation angle according to embodiments.

(a) of FIG. 31 and (b) of FIG. 31 are diagrams showing an example of an estimated position of a current point according to embodiments.

Figure 32:
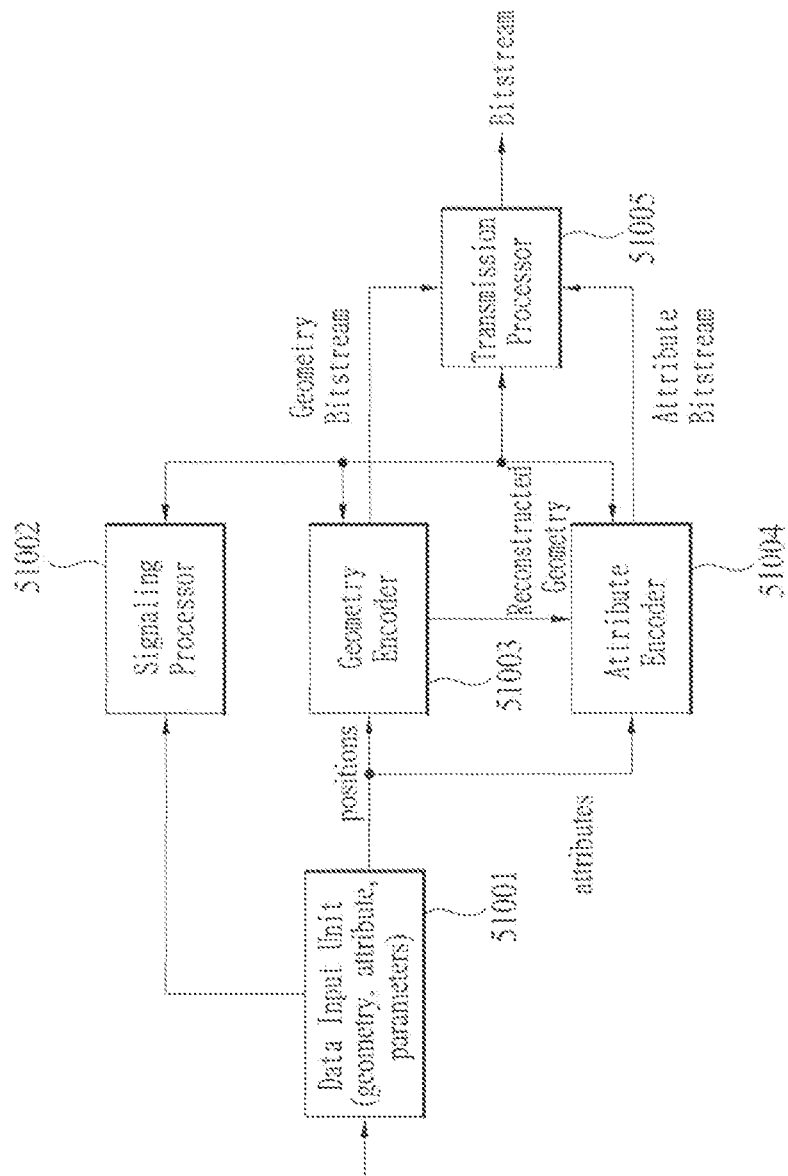

FIG. 32 is a diagram showing another example of a point cloud transmission device according to embodiments.

Figure 33:
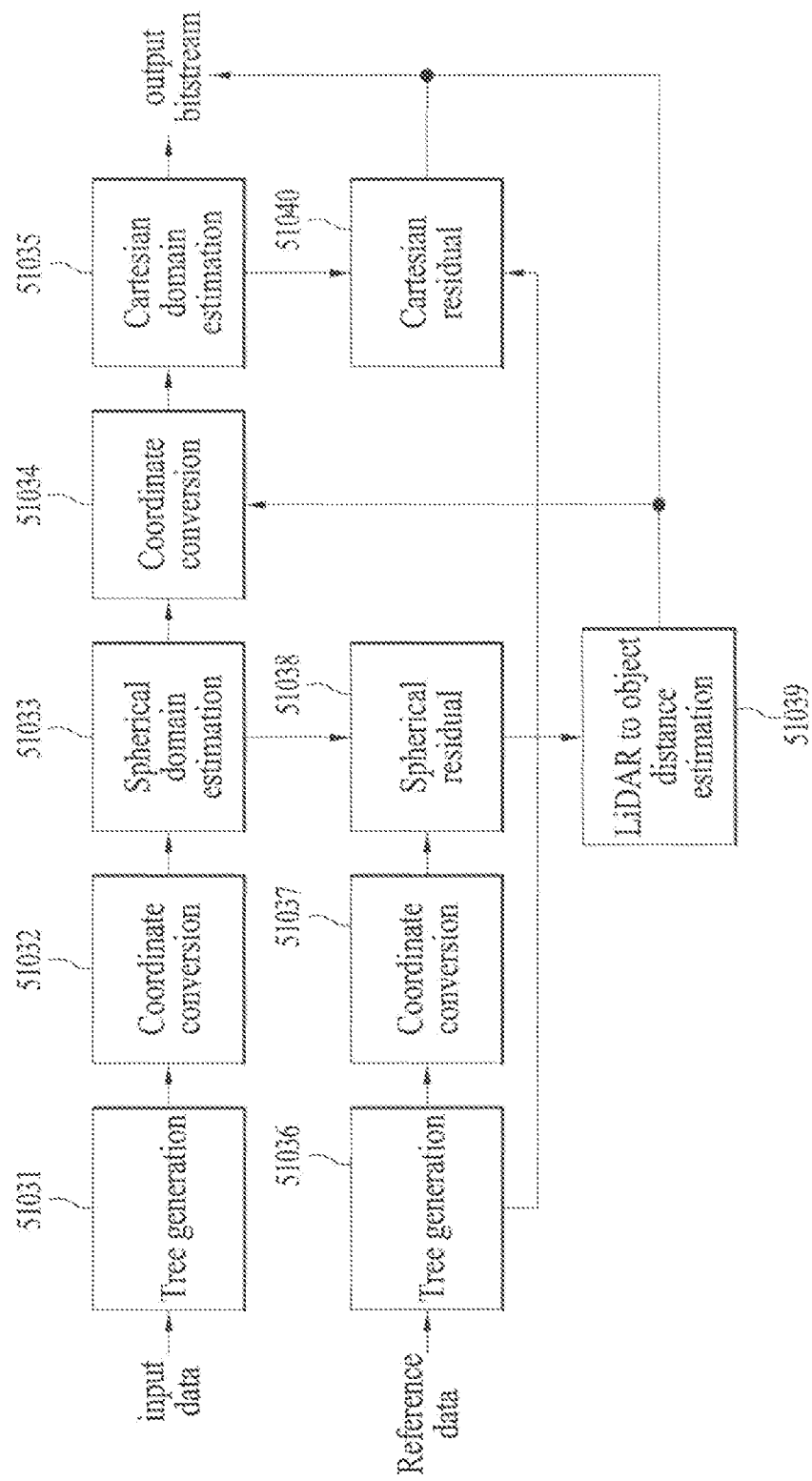

FIG. 33 is a detailed block diagram of the geometry encoder 51003 according to embodiments.

Figure 34:
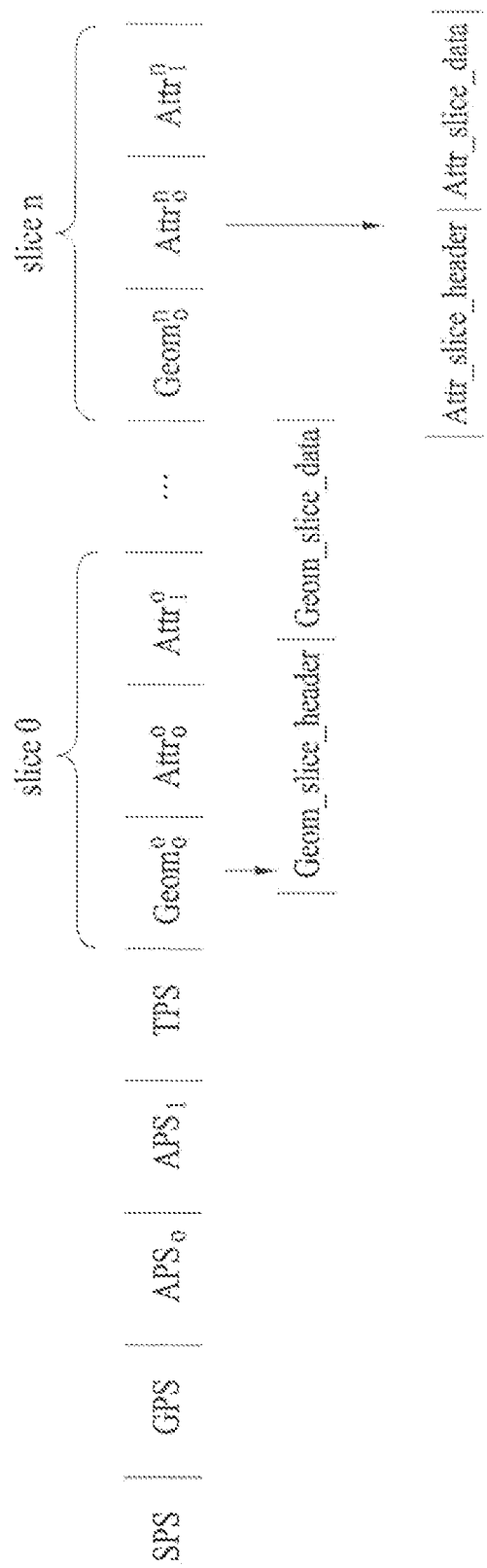

FIG. 34 is a diagram showing an example of a structure of a bitstream of point cloud data for transmission/reception according to embodiments.

FIG. 35 is a diagram showing a syntax structure of geometry_parameter_set( ) (GPS) according to the present disclosure.

FIG. 36 is a diagram showing an example of a syntax structure of geometry_data_unit( ) according to embodiments.

FIG. 37 is a diagram showing an example of a syntax structure of geometry_data_unit_header( ) according to embodiments.

FIG. 38 is a diagram showing an example of a syntax structure of data_unit( ) including geometry compression related information according to embodiments.

Figure 39:
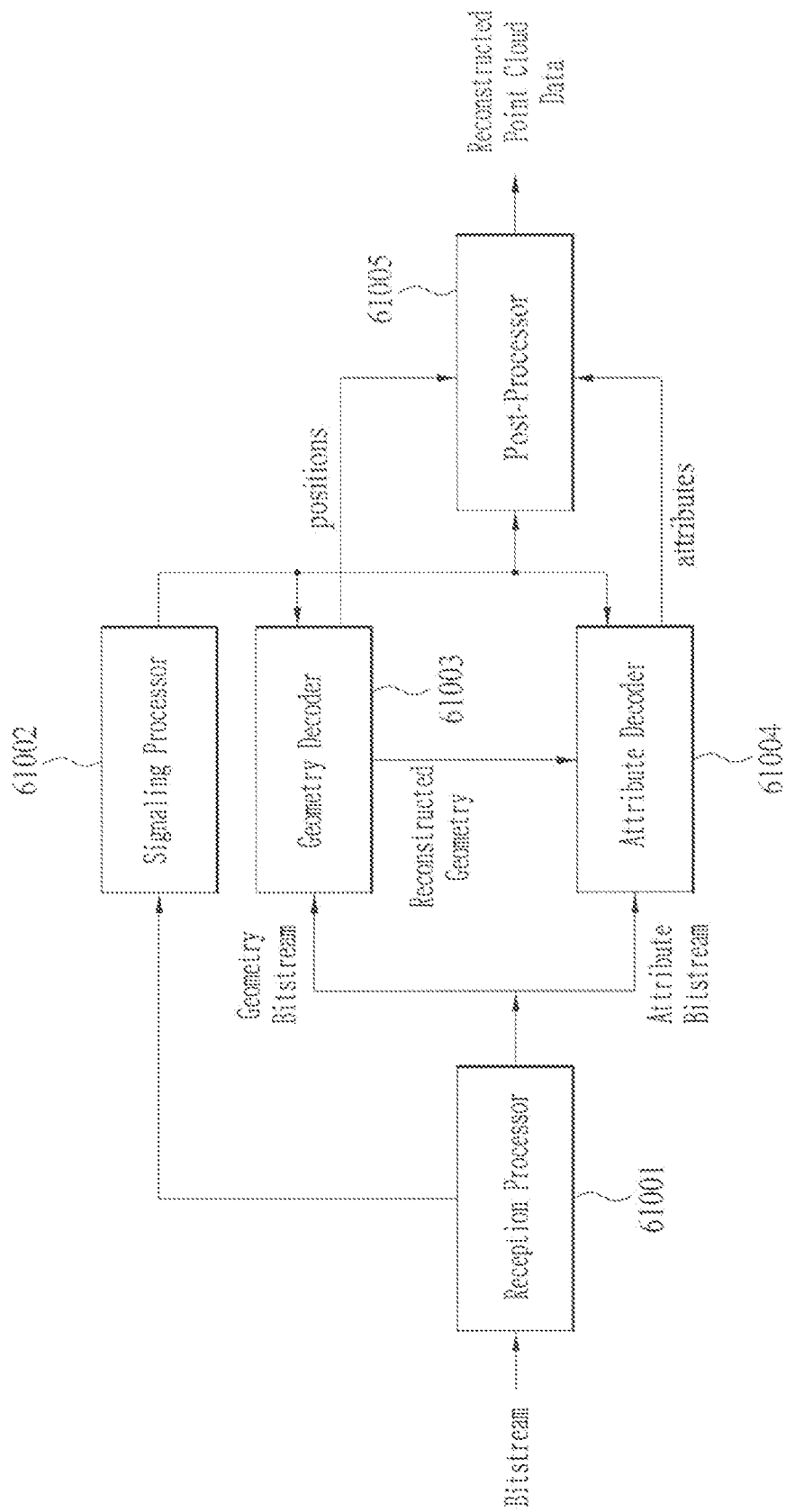

FIG. 39 is a diagram showing another example of a point cloud reception device according to embodiments.

Figure 40:
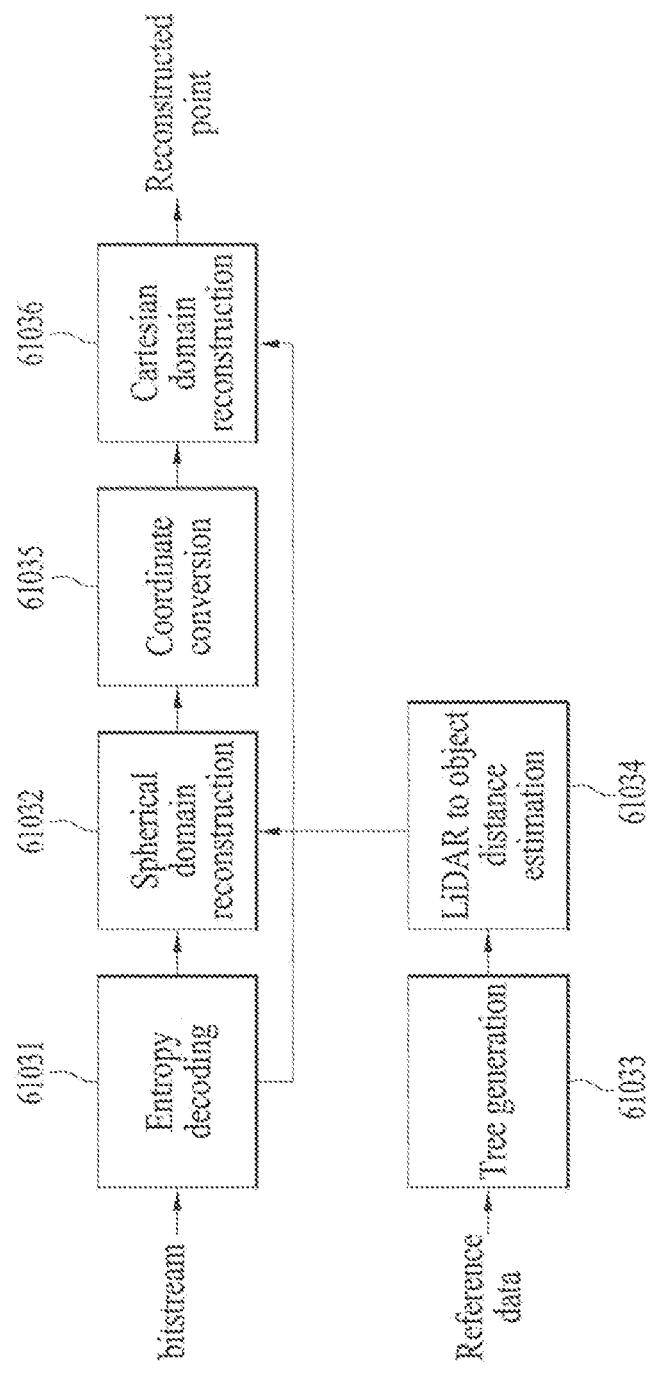

FIG. 40 is a detailed block diagram of the geometry decoder 61003 according to embodiments.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

Figure 1:
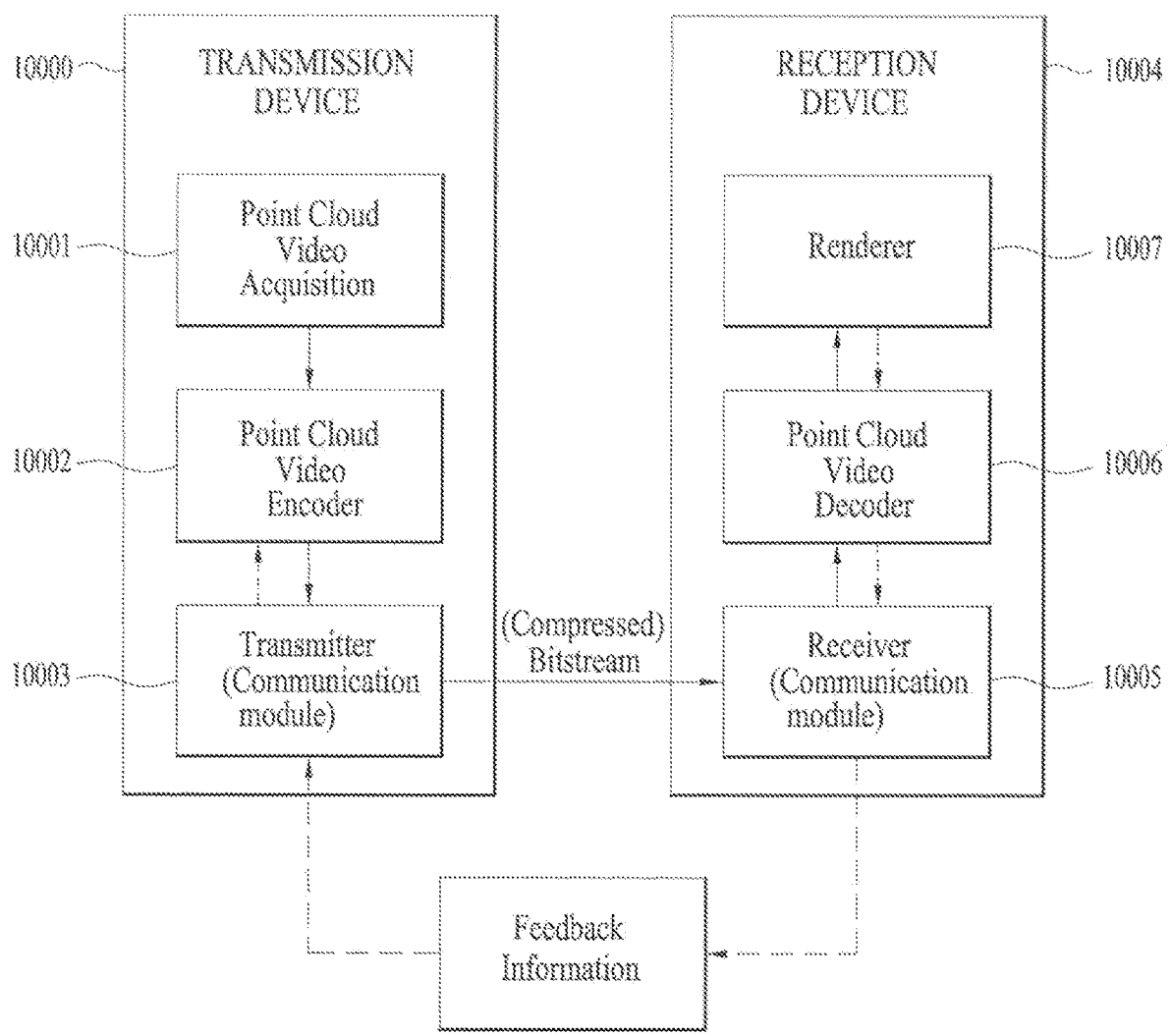
FIG. 1 illustrates an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like).

The dotted lines in FIG. 1 represent a process of transmitting the feedback information secured by the renderer 10007. The point cloud content providing system may process (encode/decode) point cloud data based on the feedback information. Accordingly, the point cloud video decoder 10006 may perform a decoding operation based on the feedback information. The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
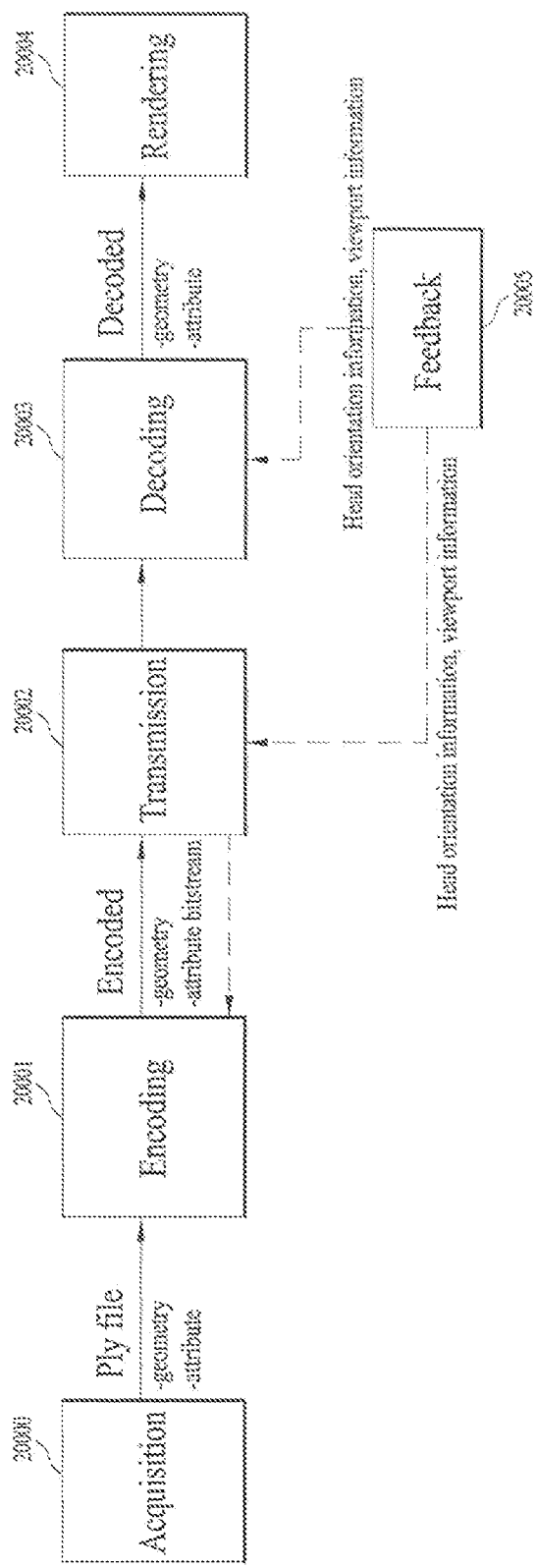
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquisition unit 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
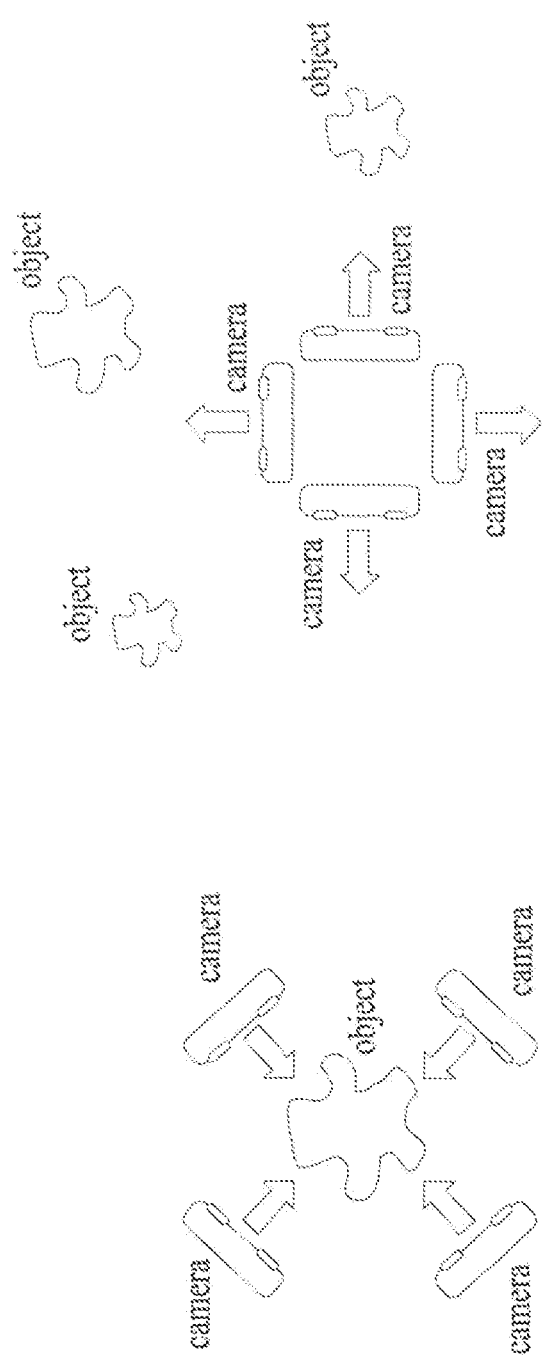
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate system transformation on points of the point cloud video secured from each camera. The point cloud content providing system may perform coordinate system transformation on the points based on the coordinates of the position of each camera. Accordingly, the point cloud content providing system may generate content representing one wide range, or may generate point cloud content having a high density of points.

Figure 4:
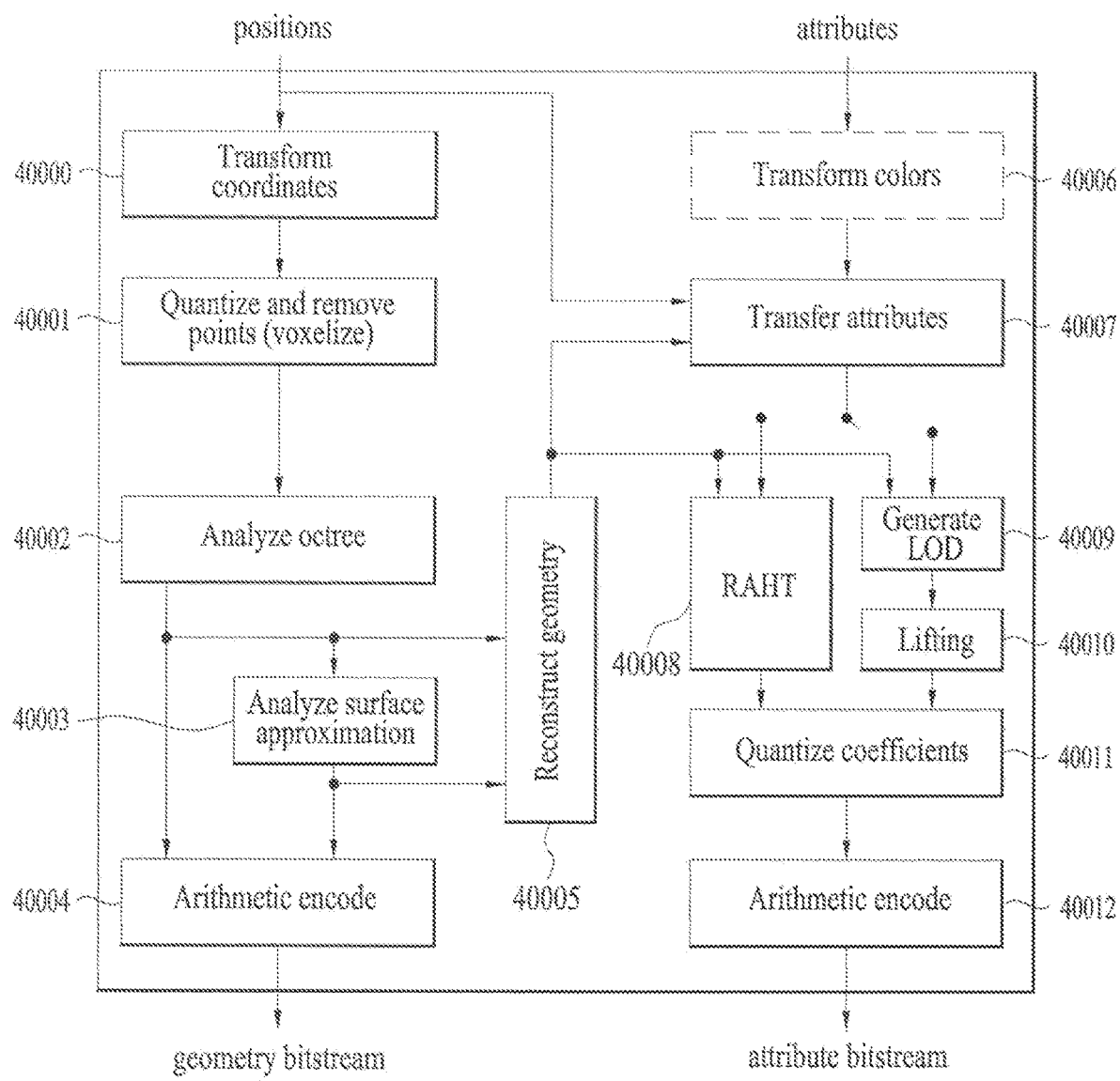
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (e.g., from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
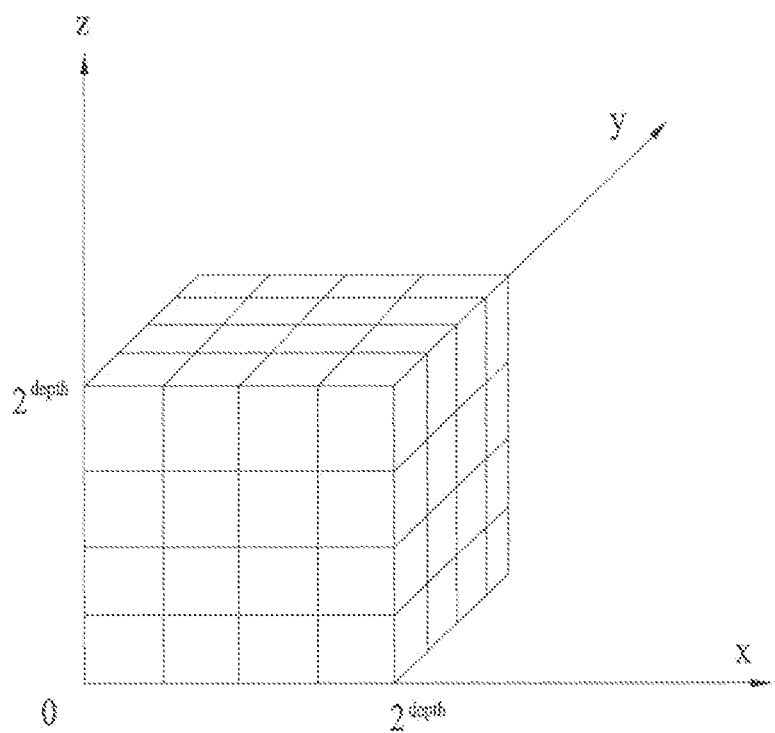
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x^{int}_n$, $y^{int}_n$, $z^{int}_n$) denotes the positions (or position values) of quantized points.

$$d = \text{Ceil}\left(\text{Log2}\left(\text{Max}\left(x_n^{int}, y_n^{int}, z_n^{int}, n = 1, \ldots, N\right) + 1\right)\right) \quad \text{[Equation 1]}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (e.g., the arithmetic encoder 40004) according to the embodiments may perform entropy encoding on the occupancy codes. In order to increase the compression efficiency, the point cloud video encoder may perform intra/inter-coding on the occupancy codes. The reception device (e.g., the reception device 10004 or the point cloud video decoder 10006) according to the embodiments reconstructs the octree based on the occupancy codes.

The point cloud video encoder (e.g., the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud video encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

[Equation 2]

$$\text{(1)} \begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix} \text{(2)} \begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \text{(3)} \begin{bmatrix} \sigma_x^2 \\ \sigma_y^2 \\ \sigma_z^2 \end{bmatrix} = \sum_{i=1}^{n}\begin{bmatrix} \bar{x}_i^2 \\ \bar{y}_i^2 \\ \bar{z}_i^2 \end{bmatrix}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2 (bi, ai), and the vertices are ordered based on the value of θ. Table 1 below shows a combination of vertices for creating a triangle according to the number of the vertices. The vertices are ordered from 1 to n. Table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

Triangles formed from vertices ordered 1, . . . , n

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |

TABLE 1-continued

Triangles formed from vertices ordered 1, . . . , n

| n | Triangles |
|---|---|
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (based on, for example, a table by which 64 is changed to 10 or 6).

Figure 8:
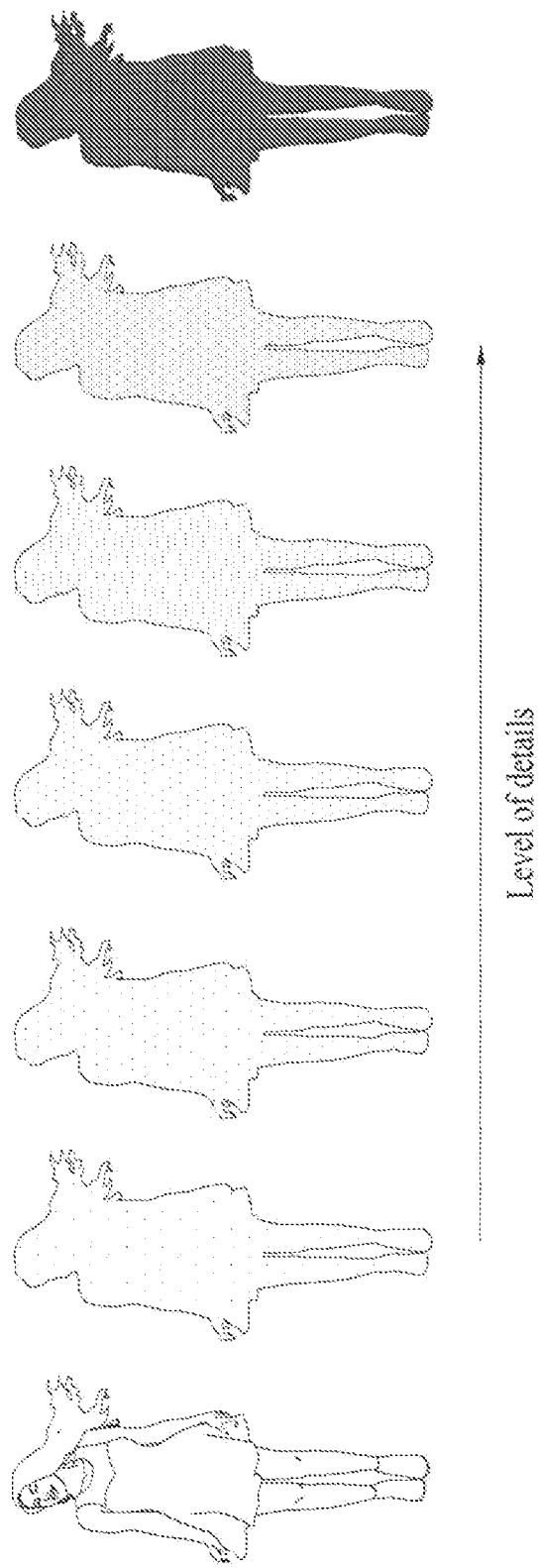
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (e.g., the LOD generator 40009) may classify (reorganize or group) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
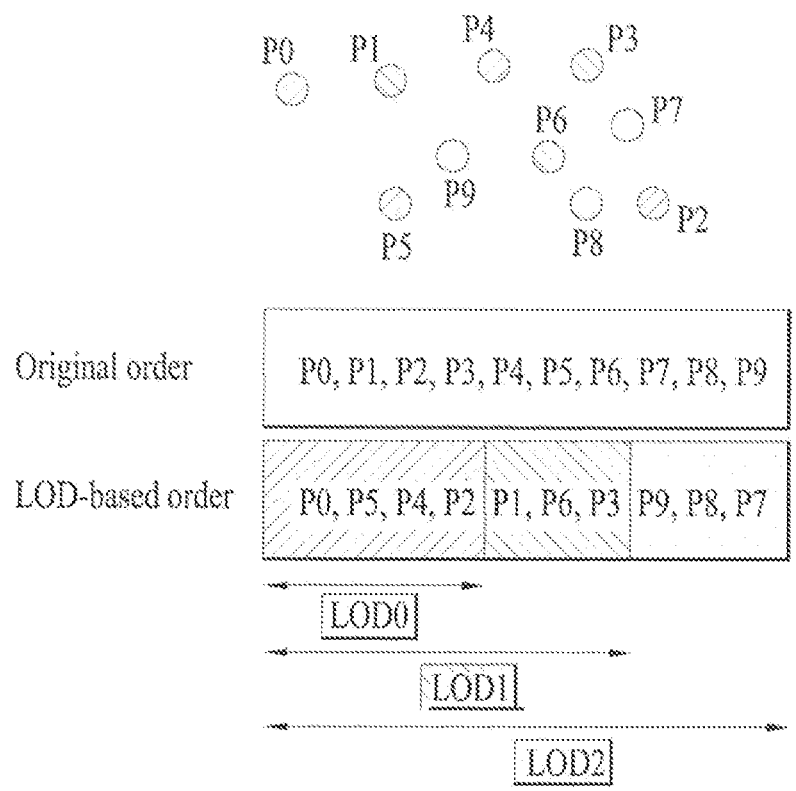
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (e.g., the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (e.g., the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in Table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above. When the predictor of each point has no neighbor point, the point cloud video encoder according to the embodiments (e.g., the arithmetic encoder 40012) may perform entropy coding on the attributes of the corresponding point without performing the above-described operation.

The point cloud video encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_l$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2}\begin{bmatrix} g_{l_{2x,y,z}} \\ g_{l_{2x+1,y,z}} \end{bmatrix} T_{w1w2} = \frac{1}{\sqrt{w1+w2}}\begin{bmatrix} \sqrt{w1} & \sqrt{w2} \\ -\sqrt{w2} & \sqrt{w1} \end{bmatrix}$$ [Equation 3]

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 40012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as Equation 4.

$$\begin{bmatrix} gDC \\ h_{0_{0,0,0}} \end{bmatrix} = T_{w1000\,w1001}\begin{bmatrix} g_{1_{0,0,0z}} \\ g_{1_{0,0,1}} \end{bmatrix}$$ [Equation 4]

The value of gDC is also quantized and subjected to entropy coding like the high-pass coefficients.

Figure 10:
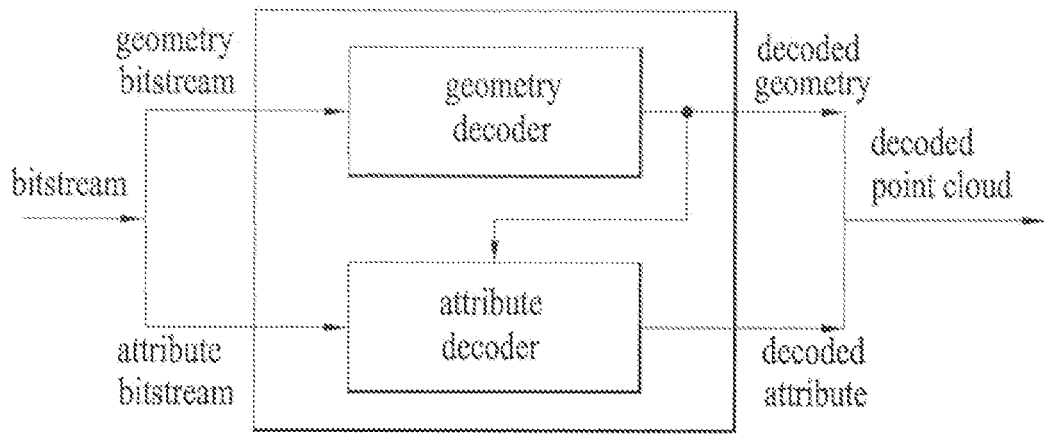
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
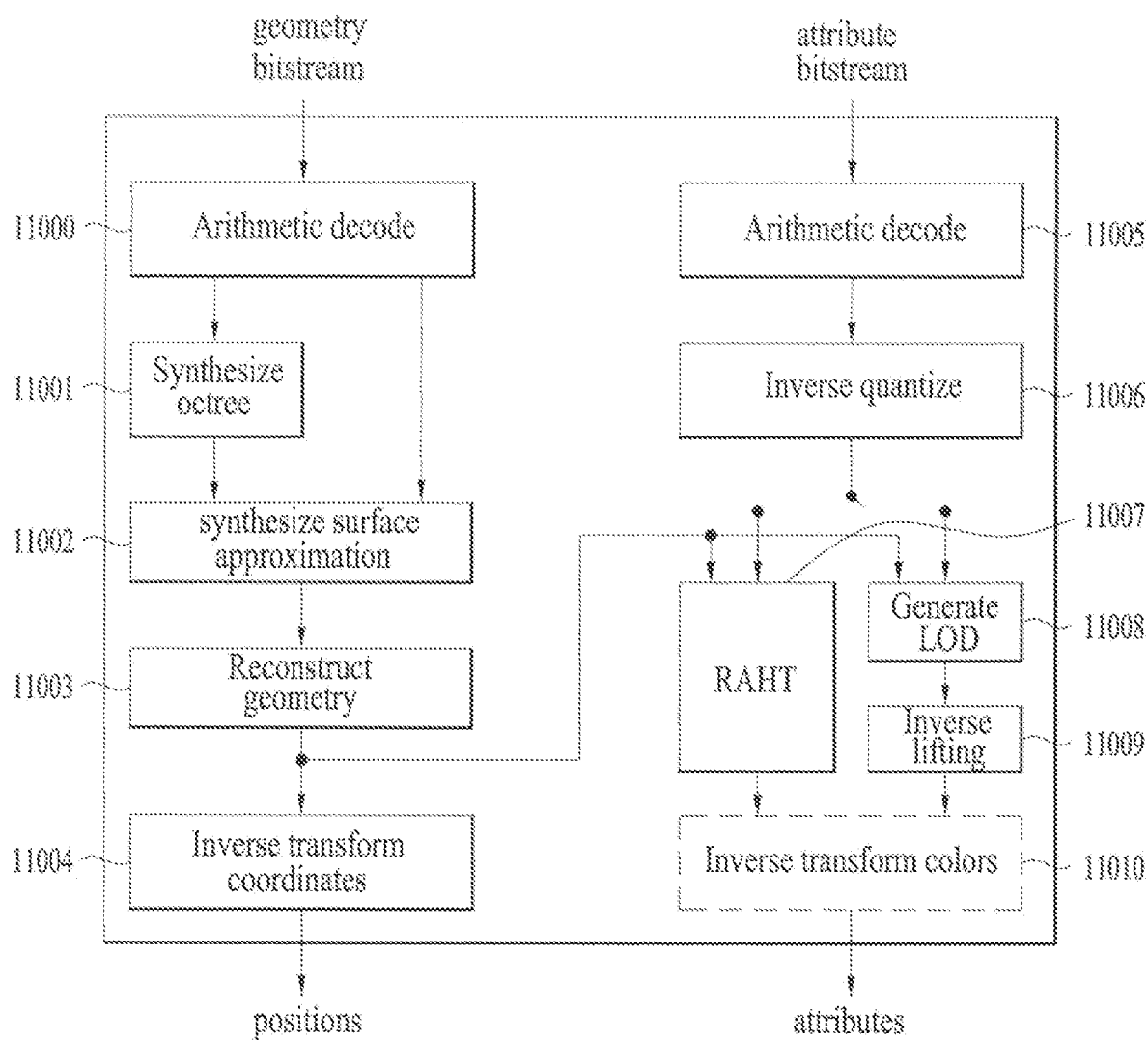
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is the reverse of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as the reverse of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
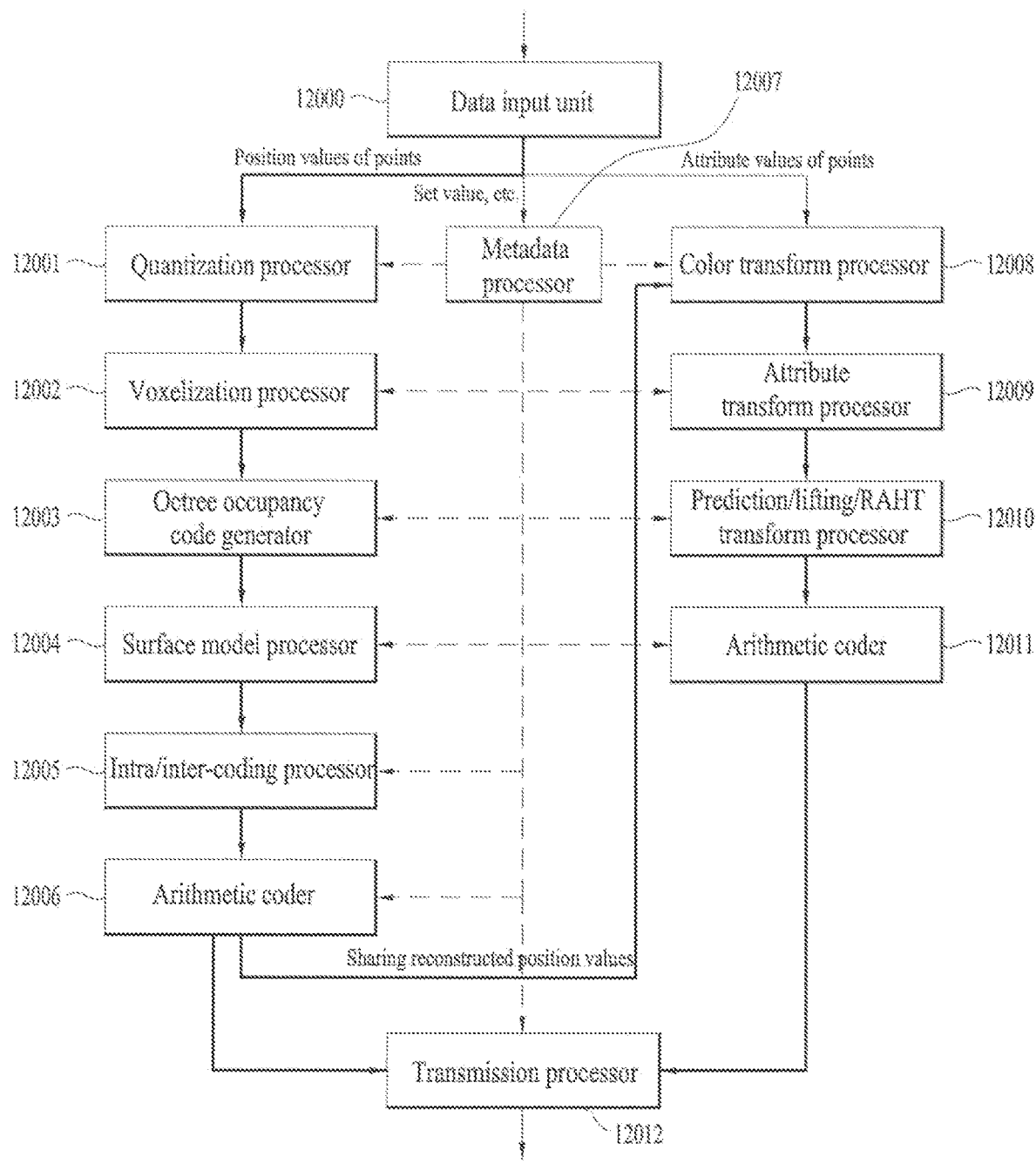
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

The slice is a series of a syntax element representing in whole or in part of the coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
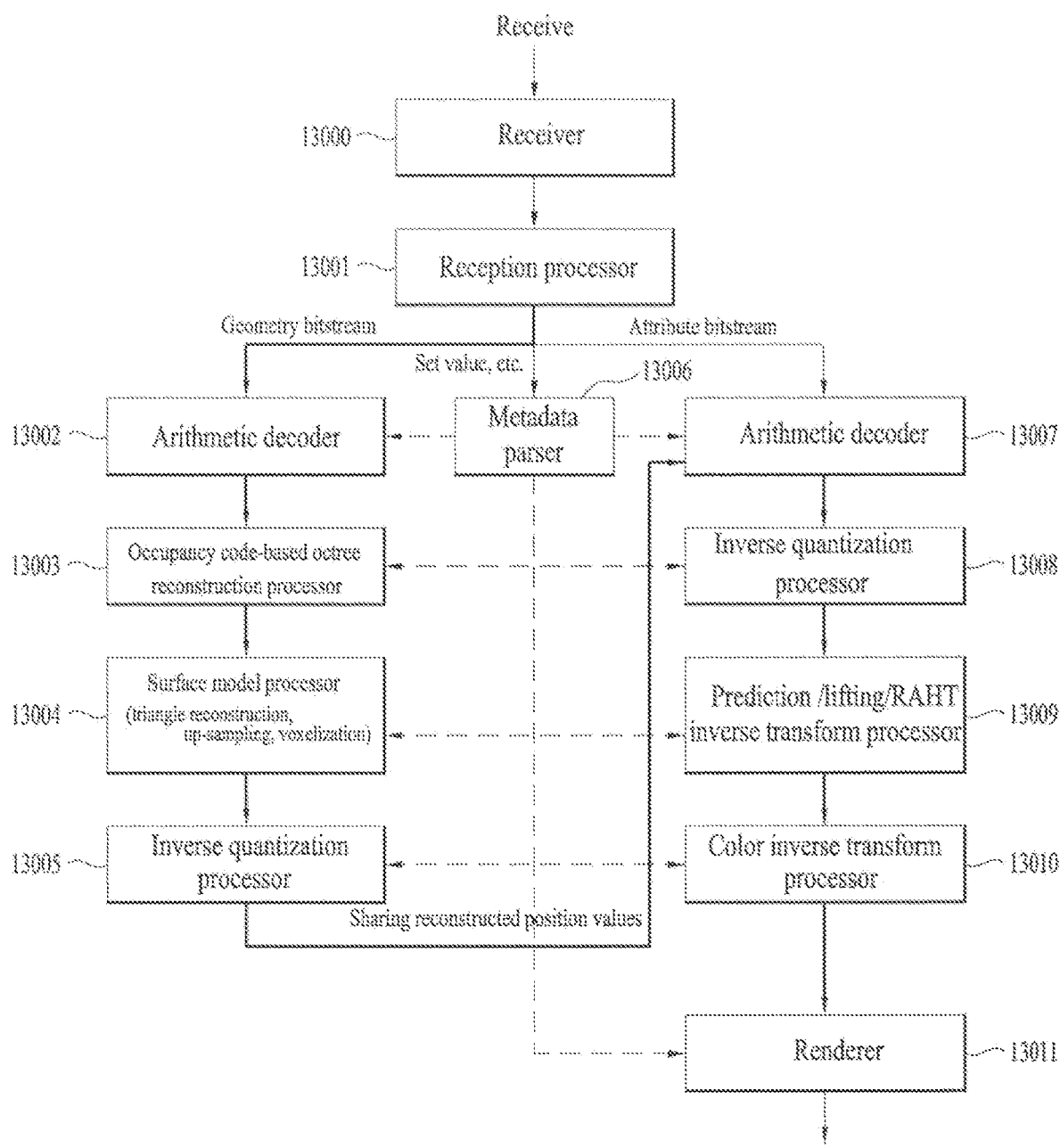
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform the reverse of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer

11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
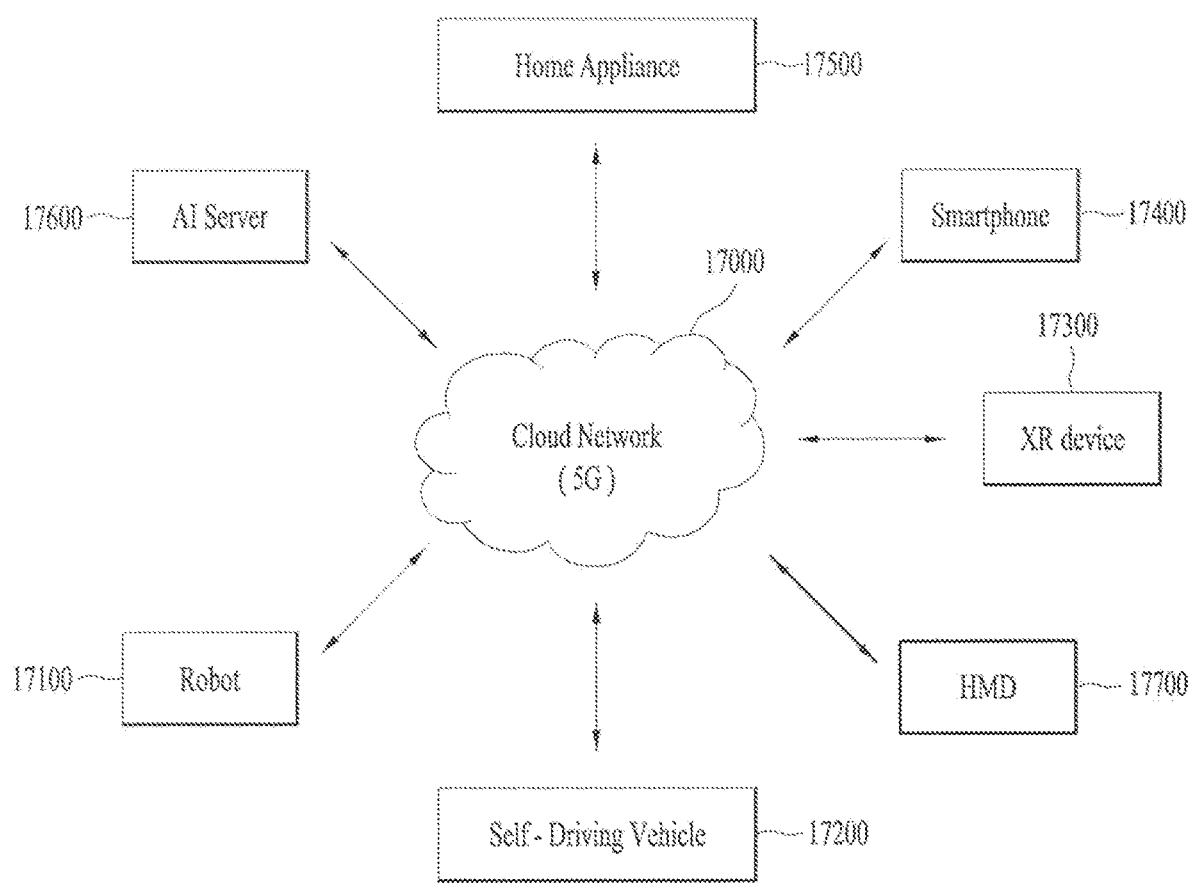
FIG. 14 illustrates an exemplary structure operatively connectable with a method/device for transmitting and receiving point cloud data according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compression data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud data may include a set of points, and each point may have a geometry (referred to also as geometry information) and an attribute (referred to as attribute information). The geometry information represents three-dimensional (3D) position information (xyz) of each point. That is, the position of each point is represented by parameters in a coordinate system representing a 3D space (e.g., parameters (x, y, z) of three axes, X, Y, and Z axes, representing a space). The attribute information represents color (RGB, YUV, etc.), reflectance, normal vectors, transparency, etc. of the point.

According to embodiments, a point cloud data encoding process includes compressing geometry information based on an octree, a trisoup, or prediction and compressing attribute information based on geometry information reconstructed (or decoded) with position information changed through compression. A point cloud data decoding process includes receiving an encoded geometry bitstream and an encoded attribute bitstream, decoding geometry information based on an octree, a trisoup, or prediction, and decoding attribute information based on geometry information reconstructed through a decoding operation.

The present disclosure is provided to increase compression efficiency by removing redundant information based on an inter-frame correlation when compressing geometry information.

In other words, the compression efficiency of continuous LiDAR point cloud data may be increased by removing the redundant information based on the inter-frame correlation. According to embodiments, LiDAR content may be considered as one of the point cloud data.

In detail, the present disclosure proposes a method and apparatus for increasing the compression efficiency of position information (or geometry information), and in particular, improves the compression efficiency by increasing information similarity between different frames based on the sampling characteristics of LiDAR.

As such, the present disclosure provides to obtain high coding efficiency by removing redundant information using the characteristics of a high correlation between adjacent frames when the point cloud data includes consecutive frames.

In the case of LiDAR data, the similarity between adjacent frames is not accurately estimated due to the sampling characteristics of a laser beam, which may cause a problem of low compression efficiency.

The present disclosure proposes a method to increase similarity between adjacent frames for LiDAR data.

In particular, the present disclosure proposes an error modeling and correction method based on a laser angle.

The method/apparatus for transmitting and receiving point cloud data according to embodiments may be referred to as a method/apparatus according to the embodiments.

A method/apparatus for transmitting point cloud data according to embodiments may be interpreted as a term referring to a transmission device 10000, a point cloud video encoder 10002, and a transmitter 10003 of FIG. 1, obtaining-encoding-transmitting 20000-20001-20002 of FIG. 2, a point cloud video encoder of FIG. 4, a transmission device of FIG. 12, a device of FIG. 14, and a transmission device of FIG. 32.

A method/apparatus for receiving point cloud data according to embodiments may be interpreted as a term referring to a reception device 10004, a receiver 10005, and a point cloud video decoder 10006 of FIG. 1, transmitting-decoding-rendering 20002-20003-20004 of FIG. 2, a decoder of FIG. 10, a point cloud video decoder of FIG. 11, a reception device of FIG. 13, a device of FIG. 14, and a reception device of FIG. 39.

According to embodiments, an encoding process of point cloud data may be performed by the point cloud video encoder 10002 of FIG. 1, the encoding 2001 of FIG. 2, the point cloud video encoder of FIG. 4, the point cloud video encoder of FIG. 12, a geometry encoder 51003 of FIG. 32, and a geometry encoder of FIG. 33. A decoding process of point cloud data according to embodiments may be performed by a point cloud video decoder 10006 of FIG. 1, the decoding 20003 of FIG. 2, a point cloud video decoder of FIG. 11, a point cloud video decoder of FIG. 13, a geometry decoder 61003 of FIG. 39, and a geometry decoder of FIG. 40. A detailed description of FIGS. 32, 33, 39, and 40 will be given below.

In some embodiments, geometry data, geometry information, position information, and the like that constitute point cloud data are interpreted to have the same meaning. Attribute data, attribute information, attribute information, and the like that constitute point cloud data are interpreted to have the same meaning.

Hereinafter, a method for increasing the compression efficiency of a position compression method of a point cloud compression method is described.

According to embodiments of the present disclosure, position compression may be performed by estimating a position of a point based on point similarity between adjacent frames for spinning LiDAR and removing redundant information present on the time axis.

According to embodiments of the present disclosure, a point position of a reference frame may be more accurately predicted by additionally considering vertical position movement of a point according to LiDAR movement based on laser-based sampling characteristics of spinning LiDAR. As such, the similarity between a current point and a predicted point may be increased, thereby reducing a residual component that makes up a bitstream and increasing compression efficiency.

In the present disclosure, point movement is compensated for based on the characteristics of spinning LiDAR, but the technology in the present disclosure may also be used in other types of LiDAR or other types of point cloud data obtaining devices. Although the present disclosure describes the point cloud data compression technology based on position compression, a method described in the present disclosure may be used for attribute compression or other types of point cloud data compression. Although the present disclosure describes compression of point cloud data as an example, the features of the present disclosure may be used in other types of data or other types of compression methods.

According to embodiments, a prediction unit (PU) and a predictor are defined to perform inter-frame position (i.e., geometry) compression.

According to embodiments, the PU is defined in the current frame and the predictor is defined in a reference frame (e.g., a previous frame).

In the present disclosure, a PU may be defined as a set of neighboring nodes at a certain depth in the octree of the current frame. In particular, a PU may be defined as a set of nodes that have the same parent.

In the present disclosure, a predictor may be defined as information in a reference frame that is found based on motion estimation. That is, a predictor may be defined as a set of nodes having characteristics most similar to the PU of the current frame within a search window (or range) of the reference frame.

According to embodiments, a motion that is present between frames may be defined in a three-dimensional space such as x, y, and z. The motion between frames may be defined by a global motion vector. In contrast, there may be locally different motions within a frame, which may be defined by a local motion vector.

According to embodiments, the motion vector (MV) may be provided by external sources (e.g., the global motion vector may be acquired through GPS information on a vehicle if the data is acquired by a LiDAR mounted on the vehicle), or motion estimation techniques may be used to estimate the motion vector between frames. The acquired MV may then be used to estimate information in the current frame based on information in the previous frame.

In an embodiment of the present disclosure, motion estimation is performed on a PU-by-PU basis. In other words, for each PU, motion estimation (ME) may be performed within a search window, which is a range for finding a MV in a reference frame (also referred to as a previous frame). The search window according to the embodiments may be defined as a whole or part of the reference frame, and may be defined in a three-dimensional space.

In this case, if the motion between adjacent frames is not significant, the similarity between the compression target node in the current frame and the predictive node in the reference frame as well as the similarity between at least one neighbor of the compression target node and at least one neighbor of the predictive node may be assumed. Based on these assumptions, the occupancy information about at least one neighbor of the predictive node may be used in addition to the occupancy information about the predictive node, and the compression efficiency may be increased based on this additional information.

A detailed description of a prediction method based on inter-frame correlation, the characteristics of spinning LiDAR, and a method to increase prediction accuracy between points of different frames will be described.

1) Motion Estimation Based on Neighbor Occupancy

Hereinafter, motion estimation based on neighbor occupancy is described.

Figure 15:
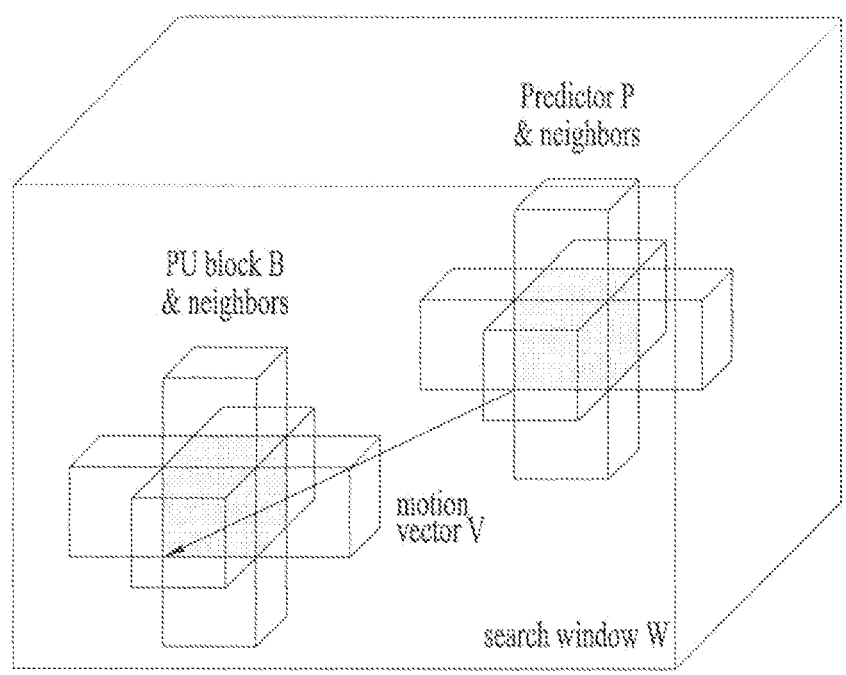
FIG. 15 is a diagram illustrating an example of a search window in a reference frame, according to embodiments.

FIG. 15 is a diagram illustrating an example of a search window in a reference frame, according to embodiments.

Motion estimation according to the embodiments may be performed on a per-PU basis.

For any PU defined in the current frame, motion estimation (ME) may be performed to estimate similar information in a reference frame, as shown in FIG. 15. In the present disclosure, the reference frame refers to a frame that is referenced in encoding/decoding the current frame, and may represent at least one frame that has been encoded and/or decoded prior to the current frame. That is, the encoding/decoding efficiency of the current frame may be increased by referencing a frame processed prior to the current frame in performing inter-frame estimation.

In this case, a motion search window may be defined within the reference frame for efficiency of motion estimation, and the similarity to the information contained in the PU of the current frame may be estimated. According to embodiments, the present disclosure may use information about a neighbor node for the PU (i.e., the compression target node) as a method for increasing the accuracy of motion estimation.

In FIG. 15, six neighbor nodes on the top, bottom, left, right, front, and back of the target node may be considered simultaneously. In another example, 26 neighbor nodes may be considered simultaneously. Also, depending on the method applied, other definitions of neighbor nodes (e.g., points, lines, face-touching nodes, etc.) may be used. This is based on the assumption that areas with high continuity between frames are highly likely to exhibit similar motion, not only for the target node, but also for its neighbors.

According to embodiments, when the set of points belonging to the PU of the current frame is defined as PU block B, and the set of points belonging to any prediction candidate defined within the search window W of the reference frame is defined as a predictor candidate or predictor P, the difference between B and P (i.e., the error or residual) D (B, P) may be defined as a function of the difference for each point, as shown in Equation 5.

$$D(B, Bn, P, Pn) = \sum_{b \in B, bn \in Bn} \log_2 \left( 1 + \right.$$ [Equation 5]

$$\left. \min_{p \in P} \{ \|b(x, y, z) - p(x, y, z)\|_L + w\|bn(x, y, z) - pn(x, y, z)\|_L \} \right)$$

In Equation 5, the sets of neighbors, B and P, are defined as Bn and Pn, respectively, and the relative position of each node with respect to PU and/or P may be represented by B (−1, 0, 0), B (1, 0, 0), B (0,−1, 0), B (0, 1, 0), B (0, 0, −1), and B (0, 0, 1), or P (−1, 0, 0), P (1, 0, 0), P (0, −1, 0), P (0, 1, 0), P (0, 0, −1), and P (0, 0, 1). Then, when the points belonging to B and P are defined as b and p, respectively, and the positions thereof may be defined as b (x,y,z) and p (x,y,z), respectively. Also, when the points belonging to Bn and Pn are defined as bn and pn, respectively, Equation 5 may represent the difference between B and P. In one embodiment, the value of the difference between B and P may be referred to as a residual value, a residual geometry value, or a prediction error geometry value.

In Equation 5, w may be used as a weight to determine the importance of the predictor and neighbors. Different weights may be applied to different neighbor positions as needed. For example, assuming that the node at the center (e.g., the target node) has a weight equal to 1, 0.5 may be assigned to its neighbors. As another example, assuming that 26 neighbor nodes are considered, nodes that share a face may be assigned a weight of 0.6, nodes that share a line may be assigned a weight of 0.4, and nodes that share only a vertex may be assigned a weight of 0.2. In this way, different weights may be assigned depending on the distance between the target node and its neighbors.

Then, when the difference between the PU and the predictor candidate is defined as described above, the motion estimation in the reference frame with respect to the PU may define as a predicted value the predictor candidate P with the least value of D (B, P) among all predictor candidates P definable in the search window. In this case, the motion vector V between two blocks (e.g., B and P) may be defined as the difference between the positions of the two blocks (P(x,y,z)−B (x,y,z)), as shown in Equation 6 below.

$$V(x, y, z) = P(x, y, z) - B(x, y, z)$$ [Equation 6]

By defining the motion vector as shown in Equation 6, the best motion vector may be found in terms of transmission efficiency while minimizing the error.

Furthermore, a cost function (C(V)) that adjusts the error D (B, P(W,V)) caused by the motion vector and the bit usage (R(V)) caused by the use of the motion vector with a weighting function λ may be derived as shown in Equation 7 below.

$$C(V) = D(B, P(W, V)) + \lambda R(V)$$ [Equation 7]

With the cost function in Equation 7, an optimal motion vector that uses fewer bits while reducing error may be found based on the weighting function. For example, when the weighting function is 0, a motion vector that minimizes error will be used. On the other hand, when the weighting function is infinite, the motion vector will converge to 0 to minimize the bits used (motion vector=0).

(a) of FIG. 16 and (b) of FIG. 16 are diagrams illustrating examples of signaling of split and flag information in an octree structure according to embodiments.

According to embodiments, in addition to a motion vector at a specific octree depth, a motion vector for the optimal octree may be found in a specific range of octree depths. In this case, flag information may be used to indicate whether each octree node is occupied, and to indicate that the octree should be split if no motion vector is found.

According to embodiments, the flag information may include a split flag (referred to as split flag information) and a population flag (referred to as population flag information). The flag information may be contained in a data unit.

According to embodiments, occupancy bit information for a child node of the current node at the current octree depth may be indicated by the population flag. According to embodiments, whether to transmit a motion vector at the current octree depth or at a lower depth may be indicated by the split flag. The population flag and the split flag may be included and transmitted in geometry compression related information.

For example, when the value of the split flag is 0, the motion vector may be transmitted based on the node at the current depth. That is, the split flag equal to 0 indicates that the corresponding node (e.g., a cube or space) at the current depth is no longer split. Therefore, the motion vector is transmitted at the node.

For example, the split flag equal to 1 may indicate that splitting to the next depth after the current depth is performed. That is, the split flag equal to 1 indicates that the corresponding node (e.g., a cube or space) at the current depth will be split to the next depth. Therefore, no motion vectors will be transmitted at the node.

Furthermore, whether the split region is occupied or not may be indicated using the population flag. For example, the population flag equal to 1 indicates that the region is occupied (i.e., the region contains at least one point), while the population flag equal to 0 indicates that the region is not occupied (i.e., the region does not contain the at least one point). In other words, when the population flag is equal to 1, there is an occupancy bit. When the population flag is equal to 0, there is no occupancy bit.

For example, when the value of the split flag is 0, the node at the current depth is split. As another example, when the value of the split flag is 1, the node at the current depth is split into four nodes in 2D. This means that it will be split into 8 nodes in 3D. If the split nodes are not further split, the value of the split flag will be 0. That is, the split flag will be 1 0000. When the split nodes are referred to as first quadrant, second quadrant, third quadrant, and fourth quadrant in 2D, the value of the population flag will be 1000 if the first quadrant has an occupancy bit and the others do not have an occupancy bit.

In other words, in (a) of FIG. 16, the first figure is not split, and therefore the value of the split flag is 0. The second figure has been split only once to a lower depth, and therefore the value of the split flag is 1 0000 in the case of 2D, and the value of the population flag is 1000 (where 1 represents the occupied hatched portion). The third figure is obtained by splitting the left two squares (or spaces) in the second figure into a sub-depth again, and therefore the value of the split flag is 1 1010 in the case of 2D and the value of the population flag is 01 1001 1000 (where 1 represents the occupied hatched portions).

(b) of FIG. 16 illustrates an example of partitioning (i.e., splitting) a large prediction unit (LPU) into multiple PUs. The LPU is the largest prediction unit. In (b) of FIG. 16, the hatched portion represents a populated LPU. That is, an LPU with an occupancy bit may be split into PUs. On an octree-depth basis, as the depth increases, the nodes may be split more finely.

In 2D, splitting after first splitting at a specific depth may yield various results, as shown in (b) of FIG. 16. In this case, the presence of an occupancy bit in the split nodes (regions) may be indicated using the population flag.

In the present disclosure, the split flag and population flag are transmitted to the reception device because the reception device needs to perform the same splitting operation as the transmission device. In other words, when the reception device receives an MV, the reception device may identify the node from which the MV is received based on the split flag and the population flag.

To determine whether to perform splitting for each octree depth, the transmission/reception device/method according to embodiments may define a cost function (C(V)) as a cumulative value of the costs of the sub-PUs, as shown in Equation 8 below. where λ1 and λ2 are weighting functions.

$$C(V) = \sum_i D\left(B, P(W, V_i) + \lambda_1 R(V_i) + \lambda_2 R\left(\frac{\text{split}}{\text{population}} \text{flags}\right)\right) \quad \text{[Equation 8]}$$

In Equation 8, the cost function may include a term that represents the error and bit usage resulting from using the motion vector, or the cost of the operation in the case of splitting a node. Thus, the cost function may determine whether to split an octree node according to the lowest cost calculated in the cost function. In other words, according to embodiments, the cost of splitting an octree node may be compared with the cost of transmitting a motion vector, and the splitting (or encoding operation) may be determined according to the lower cost.

FIG. 17 is a diagram illustrating an example of calculating a cost function for an octree node according to embodiments. In particular, the diagram illustrates an example of calculating a cost function (e.g., C(V1), C(V4)) for the occupied node(s) among the split child nodes. In this case, the value of the split flag is 10000 and the value of the population flag is 1001.

According to embodiments, the cost function for all nodes may be obtained by Equation 9 below, where λ is a weighting function.

$$C = C(V_1) + C(V_4) + \lambda R_{split}(10000) + \lambda R_{pop}(1001) \quad \text{[Equation 9]}$$

That is, based on the cost for MV 1 and the cost for MV 2 that have an occupancy bit, a cost function may be computed. When the occupancy is equal to 1001 at a specific depth, the cost for MV1 and MV2 of the occupancy node may be calculated to determine whether to split the node.

The transmission/reception device/method according to embodiments may select whether to split the node at a specific depth of the octree or apply a motion vector based on the cost function described above.

FIG. 18 is a diagram illustrating an example of performing splitting at an octree depth according to embodiments.

FIG. 18 shows the results of a process of searching for a motion vector for point cloud data having an octree structure. A depth range in which motion estimation is performed in the octree structure from a root to a leaf is indicated as 18001. According to embodiments, when MV is transmitted without splitting to a certain node requires less cost than splitting, a split flag of the node may be configured to 0 (split flag=0, that is, the node is not split) may transmit the MV for the corresponding node. In contrast, when splitting the node requires less cost than transmitting the MV, a split flag of the node may be set to 1 (split flag=1, that is, the node is not split) and the MV may be transmitted from a lower node. In other words, when a certain node is not split, the node transmits the MV, and when the node is split, a lower node transmits the MV.

A region 18001 may be indicated through motion estimation (ME) depth start and ME depth end. In this case, the ME depth start and the ME depth end may indicate a range of an octree depth (or level) in which motion estimation is performed. In FIG. 18, whether to perform motion estimation from a next lower node of a root node to an immediately higher node of a leaf node is determined. Nodes 18003, 18004, 18006, and 18007 in which a split flag value is 0 are nodes that require less cost to transmit a motion vector than splitting and are not split, and nodes 18002 and 18005 in which a split flag value is 1 are nodes that require less cost for splitting than transmitting the motion vector and are split. In the latter case, the MV is transmitted from lower nodes.

In other words, the nodes 18003, 18004, 18006, and 18007 in which a split flag value is 0 are not split, and thus each MV is transmitted from the nodes 18003, 18004, 18006, and 18007. The nodes 18002 and 18005 in which a split flag value is 1 are split, and thus each MV is transmitted from the lower nodes of the nodes 18002 and 18005.

According to embodiments, a cost when a MV is generated in a node 18002 may be calculated, the node 18002 may be split, a cost when a MV is generated in a node 18004 and a node 18005 may be calculated, and then the two costs may be compared with each other. When the cost of lower-depth splitting is more efficient (i.e., less), splitting may be performed in the node 18002 and 1 may be assigned to the split flag.

FIG. 19 is a diagram showing an example of an inter prediction process according to embodiments.

As described above, an inter prediction-based geometry compression method may specify a predictor P (or prediction block) in a reference frame through a motion vector V information for the reference frame. When a position of a PU block in which prediction within a current frame is performed is B(x,y,z) and the motion vector V is V(x,y,z), a position P(x,y,z) may be defined as Equation 10 below.

$$P(x, y, z) = B(x, y, z) + V(x, y, z) \quad \text{[Equation 10]}$$

In this case, a position of a block may be defined as a minimum value for each axis of a bounding box for points provided in the block. According to embodiments, a predicted target B (or referred to as a PU block) of the current frame may be predicted based on the predictor P defined in the reference frame. When the predicted block for the PU of the current frame is B', occupancy of points belonging to B' follows occupancy of P, and a position b' (x,y,z) of points b' belonging to B' may be defined based on a position p(x,y,z) and a motion vector V(x,y,z) of a point p belonging to P according to Equation 11 below.

$$\text{Occupancy of } B' = \text{occupancy of } P \quad \text{[Equation 11]}$$

$$b'(x, y, z) = p(x, y, z) - V(x, y, z)$$

Hereinafter, LiDAR coordinate system transformation will be described.

2) LiDAR Coordinate System Transformation

There may be various methods to sense an external object in LiDAR. Thereamong, spinning LiDAR, which rotates a vertically arranged laser by 360 degrees in a horizontal direction, may be used in an automotive drive/XR field in that it is possible to scan objects located near and far in the front, back, left, and right with a single LiDAR device.

(a) of FIG. 20 and (b) of FIG. 20 show point cloud data obtained by spinning LiDAR installed in a vehicle according to embodiments.

According to embodiments, spinning LiDAR may rotate around the z-axis on a local coordinate system to obtain data, and thus obtain/process data in a transformed coordinate system.

Hereinafter, the mechanical characteristics of spinning LiDAR will be analyzed the transformed coordinate system used based thereon will be described.

Geometry information may be represented using position information, for example, (x, y) of two-dimensional Cartesian coordinate system, (r, θ) of cylindrical coordinate system, (x, y, z) of Cartesian coordinate system of a three-dimensional space, (r, θ, z) of cylindrical coordinate system, or (ρ, θ, φ) of spherical coordinate system.

FIG. 21 is a diagram showing an example of a coordinate system transformation process of point cloud data according to embodiments.

According to embodiments, a point cloud transmission device performs coordinate transformation of geometry (i.e., a position of a point). The geometry is information that represents a position (e.g., location) of a point in a point cloud. As described with reference to FIG. 4, the geometry information may be represented by values of two-dimensional coordinate system (e.g., a parameter (x, y) of Cartesian coordinate system constructed by x and y axes or a parameter (r, θ) of cylindrical coordinate system), and values of three-dimensional coordinate system (e.g., a parameter (x, y, z) of orthogonal coordinate system, a parameter (r, θ, z) of cylindrical coordinate system, or a parameter (ρ, θ, φ) of spherical coordinate system). However, depending on a type and/or coordinate system of point cloud data, a position of a point indicated by the geometry may be expressed as having an irregular position or distribution. For example, geometry of LiDAR data expressed in Cartesian coordinate system indicates that a distance between points located further away from the origin increases. For example, geometry expressed in cylindrical coordinate system may represent a uniform distribution even for points far from the origin, but may not represent a uniform distribution for points close to the origin because a distance between the points increases. To represent the irregular position and distribution of these points, a larger amount of information, i.e., geometry, is required, which may result in lowering the efficiency of geometry coding. Therefore, the point cloud encoder according to embodiments (e.g., the point cloud encoder described with reference to FIG. 1, 4, or 12, or 32, or 33) may perform an operation of partially and/or entirely transforming coordinate system of geometry to increase efficiency of geometry coding. That is, the point cloud encoder according to embodiments may uniformly distribute points of the point cloud data via projection (point conversion) of points of the point cloud data (e.g., LIDAR data acquired through LIDAR).

FIG. 21 shows an example of transforming coordinate system for performing a projection process in a point cloud transmission device or transmission method according to embodiments.

In particular, FIG. 21 shows examples of mutually transformable coordinate system, that is, orthogonal coordinate system 18000, cylindrical coordinate system 18100, and spherical coordinate system 18200. The coordinate system according to embodiments are not limited to this example.

The orthogonal coordinate system 18000 according to embodiments may be transformed to and from the cylindrical coordinate system 18100.

The orthogonal coordinate system 18000 according to embodiments may be constructed by the X axis, the Y axis, and the Z axis that are orthogonal to each other at the origin. A point (or parameter) on orthogonal coordinate system may be expressed as (x, y, z). An X-Y plane formed by the X and Y axes, a Y-Z plane formed by the Y and Z axes, and an X-Z plane formed by the X and Z axes may intersect with each other perpendicularly at the origin. The terms of the X axis, Y axis, and Z axis according to embodiments are merely terms used to distinguish each axis, and may be replaced with other terms.

The cylindrical coordinate system 18100 according to embodiments may be constructed by the X axis, the Y axis, and the Z axis that are orthogonal to each other at the origin. An arbitrary point (or parameter) P on the cylindrical coordinate system 18100 may be expressed as (r, θ, z). r represents a distance between the origin and a point obtained by orthogonally projecting an arbitrary point P on a coordinate space onto the X-Y plane. θ represents an angle between a positive direction of the X axis and a straight line connecting the origin to the point obtained by orthogonally projecting the arbitrary point P onto the X-Y plane. z represents a distance between the point P and the point obtained by orthogonally projecting the point P to the X-Y plane. The terms of the X axis, Y axis, and Z axis according to embodiments are merely terms used to distinguish each axis, and may be replaced with other terms.

An Equation 18110 shown in FIG. 21 represents an Equation for representing geometry information expressed in Cartesian coordinate system by using cylindrical coordinate system when the Cartesian coordinate system is transformed to the cylindrical coordinate system according to Cartesian-cylindrical coordinate transformation. That is, the Equation 18110 indicates that a parameter of cylindrical coordinate system may be expressed as one or more parameters of Cartesian coordinate system according to coordinate transformation (for example, $r = \sqrt{x^2 + y^2}$).

An Equation 18120 shown in FIG. 21 represents an Equation for representing geometry information expressed in cylindrical coordinate system by using Cartesian coordinate system when the cylindrical coordinate system is transformed to the Cartesian coordinate system according to cylindrical-Cartesian coordinate transformation. That is, the Equation 18120 indicates that a parameter of Cartesian coordinate system may be expressed as one or more parameters of cylindrical coordinate system according to coordinate transformation (for example, $x = r \cos θ$).

The orthogonal coordinate system 18000 according to embodiments may be transformed to and from the spherical coordinate system 18200.

The spherical coordinate system 18200 according to embodiments may be constructed by the X axis, the Y axis, and the Z axis that are orthogonal to each other at the origin. An arbitrary point (or parameter) P on spherical coordinate system may be expressed as (ρ, Ø, θ). ρ represents a distance from the origin to the arbitrary point P and has a value greater than or equal to 0 (ρ≥0). Ø represents an angle between a positive direction of the Z axis and the arbitrary point P and has a value within a certain range (0≤Ø≤π). θ represents an angle between a point obtained by orthogonally projecting the arbitrary point P onto the X-Y plane and a positive direction of the X axis and has a value within a certain range (0≤θ≤2π). The terms of the X axis, Y axis, and Z axis according to embodiments are merely terms used to distinguish each axis, and may be replaced with other terms.

An Equation 18210 shown in FIG. 21 represents an Equation for representing geometry information expressed in Cartesian coordinate system by using spherical coordinate system when the Cartesian coordinate system is transformed to the spherical coordinate system according to Cartesian-spherical coordinate transformation. That is, the Equation 18210 indicates that a parameter of spherical coordinate system may be expressed as one or more parameters of Cartesian coordinate system according to coordinate transformation (for example, $\rho=\sqrt{x^2+y^2+z^2}$)).

An Equation 18220 shown in FIG. 21 represents an Equation for representing geometry information expressed in spherical coordinate system by using Cartesian coordinate system when the spherical coordinate system is transformed to the Cartesian coordinate system according to spherical-Cartesian coordinate transformation. That is, the Equation 18220 indicates that a parameter of Cartesian coordinate system may be expressed as one or more parameters of spherical coordinate system according to coordinate transformation (for example, $z=\rho \cos \theta$).

FIG. 22 is a diagram showing an example of sector-shaped coordinate system according to embodiments. The sector-shaped coordinate system according to embodiments may be an additional option for coordinate system transformation in addition to the cylindrical coordinate system and the spherical coordinate system. The sector-shaped coordinate system may be obtained by considering the characteristic in that lasers arranged perpendicular to Lidar obtain data while rotating horizontally.

That is, FIG. 22 shows an example of coordinate system considering the arrangement of laser modules of LiDAR data. A left side of FIG. 22 shows a LiDAR head 19000 that collects Light Detection and Ranging or Light Imaging, Detection, and Ranging (LiDAR) data. The LiDAR data is obtained using an LiDAR method of measuring a distance by shining a laser beam on a target. The LiDAR head 19000 includes one or more laser modules (or laser sensors) arranged at a certain angle in a vertical direction and rotates horizontally around a vertical axis to obtain data. Time periods (and/or wavelengths) for laser beams output from respective laser modules to be reflected from a target (e.g., object) and return may be the same or different. Therefore, the LiDAR data is 3D representation configured based on a difference in time and/or wavelength for the laser beams to return from the target. To have wider coverage, the laser modules are arranged to output the laser beams radially. Therefore, coordinate system according to embodiments may include sector-shaped cylindrical coordinate system 19100 obtained by the cylindrical coordinate system around the axis thereof by 360 degrees as a sector-shaped plane corresponding to the form in which the laser modules output laser beams, and sector-shaped spherical coordinate system 19200 obtained by rotating the spherical coordinate system around the axis thereof by 360 degrees as a sector-shaped shape as a portion of a combination of the cylindrical coordinate system and the spherical coordinate system. The sector-shaped cylindrical coordinate system 19100 according to embodiments may have a certain range when a vertical direction of the cylindrical coordinate system is expressed as an elevation. The sector-shaped spherical coordinate system 19200 according to embodiments may have a certain range when a vertical direction of the spherical coordinate system is expressed as an elevation.

FIG. 23 is a diagram showing an example of a sector-shaped coordinate system transformation of point cloud data according to embodiments.

As described above, a point cloud transmission device performs coordinate transformation. FIG. 23 shows coordinate transformation between Cartesian coordinate system 20500 (e.g., the orthogonal coordinate system 18000 described with reference to FIG. 21) to sector-shaped cylindrical coordinate system 20100 (e.g., the sector-shaped cylindrical coordinate system 19100 described with reference to FIG. 22) and sector-shaped spherical coordinate system 20200 (e.g., the sector-shaped spherical coordinate system 19200 described with reference to FIG. 22) based on the characteristics of the laser module. Transformable coordinate systems according to embodiments are not limited to the above-described examples.

The Cartesian coordinate system 20500 according to embodiments may be transformed to and from the sector-shaped cylindrical coordinate system 20100.

The Cartesian coordinate system 20500 according to embodiments are the same as the orthogonal coordinate system 18000 described with reference to FIG. 21, and thus a detailed description is omitted.

The sector-shaped cylindrical coordinate system 20100 according to embodiments may be constructed by the X axis, the Y axis, and the Z axis that are orthogonal to each other at the origin. An arbitrary point (or parameter) P on the sector-shaped cylindrical coordinate system 20100 may be expressed as (r, θ, φ). r represents a distance between the origin and a point obtained by orthogonally projecting the arbitrary point P on a coordinate space onto the X-Y plane. θ represents an angle between a positive direction of the X axis and a straight line connecting the origin to the point obtained by orthogonally projecting the arbitrary point P onto the X-Y plane. φ represents an angle between a straight line connecting a point P to a point obtained by orthogonally projecting the point P onto the X-Y plane, a straight line perpendicular to the center of the flat sector shape described with reference to FIG. 22, and a straight line connecting the center to the point P (shown as dotted lines). The terms of the X axis, Y axis, and Z axis according to embodiments are merely terms used to distinguish each axis, and may be replaced with other terms.

An Equation 20110 shown in FIG. 23 is an Equation for representing geometry information expressed in Cartesian coordinate system by using sector-shaped cylindrical coordinate system when the Cartesian coordinate system 20500 are transformed to the sector-shaped cylindrical coordinate system 20100 according to Cartesian-sector-shaped cylindrical coordinate transformation. That is, the Equation 20110 indicates that a parameter of sector-shaped cylindrical coordinate system may be expressed as one or more parameters of Cartesian coordinate system according to coordinate transformation (for example, $r=\sqrt{x^2+y^2}$).

An Equation 20120 shown in FIG. 23 represents an Equation for representing geometry information expressed in sector-shaped cylindrical coordinate system by using Cartesian coordinate system when the sector-shaped cylindrical coordinate system is transformed to the Cartesian coordinate system according to sector-shaped cylindrical-Cartesian coordinate transformation. That is, the Equation 20120 indicates that a parameter of Cartesian coordinate system may be expressed as one or more parameters of sector-shaped cylindrical coordinate system according to coordinate transformation (for example, x=r cos θ).

The Cartesian coordinate system 20500 according to embodiments may be transformed to and from the sector-shaped spherical coordinate system 20200.

The sector-shaped spherical coordinate system 20200 according to embodiments may be constructed by the X axis, the Y axis, and the Z axis that are orthogonal to each other at the origin. An arbitrary point (or parameter) P on spherical coordinate system may be expressed as (ρ, θ, φ). ρ represents a distance from the origin to the arbitrary point P and has a value greater than or equal to 0 (ρ≥0). θ represents an angle between a point obtained by orthogonally projecting the arbitrary point P along a curved surface onto the X-Y plane and a positive direction of the X axis and has a value within a certain range (0≤θ≤2π). φ represents an angle between a line connecting a point P to a point obtained by orthogonally projecting the point P onto the X-Y plane and a straight line connecting the origin to the point P (shown as dotted lines). The terms of the X axis, Y axis, and Z axis according to embodiments are merely terms used to distinguish each axis, and may be replaced with other terms.

An Equation 20210 shown in FIG. 23 represents an Equation for representing geometry information expressed in Cartesian coordinate system by using sector-shaped spherical coordinate system when the Cartesian coordinate system is transformed to the sector-shaped spherical coordinate system according to Cartesian-sector-shaped spherical coordinate transformation. That is, the Equation 20210 indicates that a parameter of sector-shaped spherical coordinate system may be expressed as one or more parameters of Cartesian coordinate system according to coordinate transformation (for example, $\rho=\sqrt{x^2+y^2+z^2}$)).

An Equation 20220 shown in FIG. 23 represents an Equation for representing geometry information expressed in sector-shaped spherical coordinate system by using Cartesian coordinate system when the sector-shaped spherical coordinate system is transformed to the Cartesian coordinate system according to sector-shaped spherical-Cartesian coordinate transformation. That is, the Equation 20220 indicates that a parameter of Cartesian coordinate system may be expressed as one or more parameters of sector-shaped spherical coordinate system according to coordinate transformation (for example, z=ρ sin φ).

According to embodiments, coordinate system transformation may include a coordinate system selection operation and coordinate system transformation applying operation. The coordinate system selection operation may derive coordinate system transformation information. The coordinate system transformation information may include information about whether to transform coordinate system or coordinate system information. The coordinate system transformation information may be signaled in units such as a sequence, a frame, a tile, a slice, and a block. The coordinate system transformation information may be derived based on whether to transform the coordinate system of a surrounding block, a size of a block, the number of points, a quantization value, a block division depth, a position of a unit, a distance between the unit and the origin, and the like. The coordinate system transformation applying operation may be an operation of transforming coordinate system based on coordinate system selected in the coordinate system selection operation. The coordinate system transformation applying operation may perform coordinate system transformation based on coordinate system transformation information. Alternatively, coordinate system transformation may not be performed based on information about whether to transform coordinate system.

That is, the point cloud data transmission device (e.g., the point cloud data transmission device described with reference to FIG. 1, 12, or FIG. 32) according to embodiments may generate signaling information related to coordinate transformation and transmit the signaling information to the point cloud data reception device (e.g., the point cloud data reception device described with reference to FIG. 1, 13, or 39). The signaling information related to coordinate transformation (e.g., coordinate system transformation information) may be signaled at a sequence level, a frame level, a tile level, a slice level, or the like. The point cloud decoder according to embodiments (e.g., the point cloud decoder described with reference to FIG. 1, 11, 13, 39, or 40) may perform a decoding operation as a reverse operation of an encoding operation of the point cloud encoder based on the signaling information related to coordinate transformation. The point cloud decoder according to embodiments may not receive the signaling information related to coordinate transformation, but may perform coordinate transformation by deriving the signaling information based on whether to transform coordinate system of a surrounding block, a size of a block, the number of points, a quantization value, and the like.

FIG. 24 is a diagram showing an example of coordinate projection of point cloud data according to embodiments.

The point cloud transmission device according to embodiments may perform coordinate projection to project geometry expressed in coordinate system transformed according to the coordinate transformation described with reference to FIGS. 21 to 23 to a compressible form. FIG. 24 is a diagram showing an example of the aforementioned coordinate projection. FIG. 24 shows a process of mutually transforming (projecting) sector-shaped cylindrical coordinate system 21000 (e.g., the sector-shaped cylindrical coordinate system 19100 described with reference to FIG. 22) and the sector-shaped cylindrical coordinate system 20100 described with reference to FIG. 23) and sector-shaped spherical coordinate system 21100 (e.g., the sector-shaped spherical coordinate system 19200 described with reference to FIG. 22 and the sector-shaped spherical coordinate system 20200 described with reference to FIG. 23) to a square column space 21200.

The square column space 21200 according to embodiments may be represented in three-dimensional coordinate system constructed by the x axis, the y axis, and the z axis (which are also represented as the x' axis, the y' axis, and the z' axis) and may be referred to as a bounding box. The x' axis, the y' axis, and the z' axis may have respective maximum values (x_max, y_max, and z_max) and respective minimum values (x_min, y_min, and z_min). In the transformation process shown in FIG. 24, parameters (r, θ, φ) representing a value of an arbitrary point P of the sector-shaped cylindrical coordinate system 21000 and parameters (ρ, θ, φ) representing a value of the arbitrary point P of the sector-shaped spherical coordinate system 21100 may be expressed as parameters of the x' axis, the y' axis, and the z' axis, respectively. Each parameter of the parameters (r, θ, φ) and the parameters (ρ, θ, φ) may correspond to one axis of the x' axis, the y' axis, and the z' axis (for example, r corresponds to the X' axis) or may be transformed and may correspond thereto according to a separate transformation formula. For example, a parameter ¢ of the sector-shaped cylindrical coordinate system 21000 having a limited range is mapped to the z' axis by applying a tangent function. Therefore, the values mapped to the z' axis are collected according to a limited range, thereby increasing compression efficiency.

Projection of the parameters (r, θ, ϕ) of the sector-shaped cylindrical coordinate system 21000 according to embodiments may be performed according to Equation 12 below.

$$f_x(r) = r = \sqrt{(x-x_c)^2 + (y-y_c)^2},$$

$$f_y(\theta) = \theta = \tan^{-1}\left(\frac{y-y_c}{x-x_c}\right),$$

$$f_z(\phi) = \phi = \tan^{-1}\left(\frac{z-z_c}{\sqrt{(x-x_c)^2 + (y-y_c)^2}}\right)$$

[Equation 12]

That is, $f_x(r)$ represents that parameter r is projected to the x axis, $f_y(\theta)$ represents that the parameter θ is projected to the y axis, and $f_z(\theta)$ represents that parameter ϕ is projected to the z axis. Projection that minimizes a trigonometry calculation of Equation 12 above may be represented according to Equation 13 below.

$$f_x(r) = r^2 = (x-x_c)^2 + (y-y_c)^2,$$

$$f_y(\theta) = \cos^2\frac{\theta}{2} = \frac{1+\cos\theta}{2} = \left[1 + \frac{x-x_c}{\sqrt{(x-x_c)^2 + (y-y_c)^2}}\right]/2 = \frac{r+x-x_c}{2r},$$

$$f_z(\phi) = \tan\phi = \frac{z-z_c}{\sqrt{(x-x_c)^2 + (y-y_c)^2}} = \frac{z-z_c}{r}$$

[Equation 13]

Projection of the parameters (ρ, θ, ϕ) of the sector-shaped spherical coordinate system 21100 according to embodiments may be performed according to Equation 14 below.

$$f_x(\rho) = \rho = \sqrt{(x-x_c)^2 + (y-y_c)^2 + (z-z_c)^2},$$

$$f_y(\theta) = \theta = \tan^{-1}\left(\frac{y-y_c}{x-x_c}\right),$$

$$f_z(\phi) = \phi = \sin^{-1}\left(\frac{z-z_c}{\sqrt{(x-x_c)^2 + (y-y_c)^2 + (z-z_c)^2}}\right)$$

[Equation 14]

That is, $f_x(\rho)$ represents that parameter ρ is projected to the x axis, $f_y(\theta)$ represents that the parameter θ is projected to the y axis, and $f_z(\phi)$ represents that parameter ϕ is projected to the z axis. Projection that minimizes a trigonometry calculation of Equation 14 above may be represented according to Equation 15 below.

$$f_x(\rho) = \rho^2 = (x-x_c)^2 + (y-y_c)^2 + (z-z_c)^2,$$

$$f_y(\theta) = \cos^2\frac{\theta}{2} = \frac{1+\cos\theta}{2} = \left[1 + \frac{x-x_c}{\sqrt{(x-x_c)^2 + (y-y_c)^2}}\right]/2 = \frac{r+x-x_c}{2r},$$

$$f_z(\phi) = \sin\phi = \frac{z-z_c}{\sqrt{(x-x_c)^2 + (y-y_c)^2 + (z-z_c)^2}} = \frac{z-z_c}{\rho}$$

[Equation 15]

In the above Equations, $(x_c, y_c, z_c)$ is a center position of the sector-shaped cylindrical coordinate system 21000 before projection (i.e., before transformation), and the center is the same as a center of the flat sector described with reference to FIG. 22. $(x_c, y_c, z_c)$ according to embodiments may represent a LiDAR head position (e.g., the origin of xyz coordinate system of the world coordinate system).

In a structure of LiDAR, a plurality of lasers are arranged vertically in the LiDAR head. In particular, lasers may be placed respectively above and below the LiDAR head to obtain more point cloud data. In this case, a position difference occurs between the lasers, which may cause a decrease in projection accuracy. Therefore, a method of correcting projection in consideration of the position of the laser may be used.

FIG. 25 is a diagram showing an example of adjustment of a laser position of point cloud data according to embodiments. That is, the diagram shows an example of projection correction in consideration of a laser position of LiDAR.

Projection correction considering a laser position according to embodiments may be performed by hardware, software, firmware, or a combination thereof, including one or more processors or integrated circuits that are set to communicate with the transmission device of FIG. 1, the transmission device of FIG. 12, the XR device of FIG. 14, the transmission device of FIG. 32, and/or one or more memories.

Projection correction considering a laser position according to embodiments may be performed by hardware, software, firmware, or a combination thereof, including one or more processors or integrated circuits that are set to communicate with the reception device of FIG. 1, the reception device of FIG. 13, the XR device of FIG. 14, the reception device of FIG. 39, and/or one or more memories.

As described in FIG. 22, the LiDAR head (for example, the LiDAR head 19000 described with reference to FIG. 22) includes one or more laser modules arranged vertically. One or more laser modules are arranged to output laser beams radially to ensure more data with wider coverage. An actual laser beam is output from an end of the laser module. Therefore, the laser position is different from the LiDAR head position corresponding to the center point of the flat fan described in FIGS. 22 and 23. There is a difference in position between the uppermost laser beam output from the laser module placed above the LiDAR head and the lowermost laser beam output from the laser module placed below the LiDAR head. When the position difference between the laser beams is not applied, the accuracy of projection may be reduced. Therefore, the point cloud transmission device according to embodiments may perform projection by applying laser position adjustment such that a start point of each laser beam is the same as starting from the LiDAR head position.

A left side of FIG. 25 shows a structure 22000 of a LiDAR head including an arbitrary laser module configured to output a laser beam. As shown in FIG. 25, a position of a laser beam output from an arbitrary laser module is expressed as a relative position separated by $r_L$ in a horizontal direction and $z_L$, in a vertical direction from the LiDAR head position $(x_c, y_c, z_c)$.

A right side of FIG. 25 illustrates an example 22100 showing a relative position of a laser beam in three-dimensional coordinate system. The three-dimensional coordinate system shown in the drawing are coordinate system for representing the projection (e.g., square column space 21200) described with reference to FIG. 24, and is constructed by the x' axis, the y' axis, and the z' axis. The above-described head position may be set to the origin (0,0,0) of the coordinate system, and a relative position of a laser beam is expressed as $(x_L, y_L, z_L)$. Parameters $(x_{LL}, y_L)$ may be obtained based on $r_L$ (i.e., relative distance from a head position in a horizontal direction) according to Equation 16 below.

$$x_L = r_L \cdot \cos\theta \cdot y_L = r_L \cdot \sin\theta \quad \text{[Equation 16]}$$

($x_L$, $y_L$, $z_L$) according to embodiments may directly calculated by the point cloud transmission device and reception device or may be transmitted to the point cloud transmission device and reception device through signaling or the like.

A value obtained by applying a laser position of parameters (r, θ, ϕ) of a sector-shaped cylindrical coordinate system (e.g., the sector-shaped cylindrical coordinate system 21000) may be calculated according to Equation 17 below. That is, Equation 17 shows an example of sector-shaped cylindrical coordinate system transformation considering a laser position.

$$r_L = \sqrt{(x-x_c-x_L)^2 + (y-y_c-y_L)^2} = \quad \text{[Equation 17]}$$
$$\sqrt{(x-x_c)^2 + (y-y_c)^2} - r_L,$$
$$\theta_L = \tan^{-1}\left(\frac{y-y_c-y_L}{x-x_c-x_L}\right)$$
$$\phi_L = \tan^{-1}\left(\frac{z-z_c-z_L}{\sqrt{(x-x_c-x_L)^2+(y-y_c-y_L)^2}}\right)$$

A value obtained by applying a laser position of parameters (ρ, θ, ϕ) of a sector-shaped spherical coordinate system (e.g., the sector-shaped spherical coordinate system 21100) may be calculated according to Equation 18 below. That is, Equation 18 shows an example of sector-shaped spherical coordinate system transformation considering a laser position.

$$\rho_L = \sqrt{(x-x_c-x_L)^2 + (y-y_c-y_L)^2 + (z-z_c-z_L)^2}, \quad \text{[Equation 18]}$$
$$\theta_L = \tan^{-1}\left(\frac{y-y_c-y_L}{x-x_c-x_L}\right)$$
$$\phi_L = \sin^{-1}\left(\frac{z-z_c-z_L}{\sqrt{(x-x_c-x_L)^2+(y-y_c-y_L)^2+(z-z_c-z_L)^2}}\right)$$

When considering a relative position of a laser beam as described above, a start point of each laser beam has an effect of starting from a head position through Equation 17 or 18 above.

FIG. 26 shows an example of converting point cloud data into an index according to embodiments. According to embodiments, an elevation angle may be expressed as a laser index. That is, FIG. 26 shows an example of points arranged based on a laser index according to embodiments.

An example 34000 shown in an upper left end of FIG. 26 represents a LiDAR head (eg, the LiDAR head 19000 described with reference to FIG. 22) configured to output one or more laser beams. As described with reference to FIG. 22, LiDAR data is obtained using a LiDAR method of measuring a distance by shining a laser on a target. The LiDAR head 34000 includes one or more laser modules (or laser sensors) arranged at a certain angle in a vertical direction and rotates around a vertical axis. Times (and/or wavelengths) for laser beams output from respective laser modules to be reflected from the target and return may be the same or different. Therefore, LiDAR data is 3D representation configured based on a difference in time and/or wavelength for the laser beams to return from the target. To have wider coverage, the laser modules are arranged to output laser beams radially.

An example 34100 shown in an upper right end of FIG. 26 shows a value obtained by simplifying an elevation angle and shows an example of a laser index. As described above, the LiDAR head 34000 rotates in a horizontal direction around a header position (or the origin) and outputs one or more laser beams (Laser n and Laser m). As shown in FIG. 26, a trajectory of a laser beam is expressed as a dotted or a solid line. Here, the dotted and solid lines are examples used to distinguish different laser beams. Therefore, a position of an object is estimated based on a difference in emission and/or reception time when laser beams distributed at different angles in a vertical direction are reflected by the object. One or more points located on a line (the above-mentioned dotted or solid line) representing the trajectory of Laser n shown in FIG. 26 are points obtained to represent the object when receiving laser beams reflected from the object. Therefore, one or more points may exist on a straight line corresponding to the trajectory of Laser n. However, due to an influence of noise, and the like, an actual point position may not be located on a trajectory of a laser beam, but may be located around the trajectory (e.g., expressed as +/− based on the trajectory). The position of each point may be expressed as an elevation angle, and the elevation angle may be expressed as a +/−value for an angle of a laser beam.

An example 34200 shown in a lower right end of FIG. 26 shows an actual position of positions located around each laser beam. As shown in FIG. 26, an elevation angle of each point corresponds to a +/−value for an elevation angle of a laser beam (or laser angle, for example, øn shown in the drawing). The laser angle and laser index according to embodiments may be contained in signaling information.

The point cloud transmission device according to embodiments may perform approximation quantization on the position of each point (i.e., elevation angle) in consideration of the related laser angle or an index of the corresponding laser beam. An example 34300 shown in a lower left end of FIG. 26 shows the results of approximation quantization. The point cloud transmission device performs approximation quantization to estimate points on a trajectory of a laser beam without considering a difference in the elevation angle of each point. That is, as shown in the drawing, all points are estimated to be located on the corresponding trajectory of the laser beam. Therefore, the elevation angle of each point has the same value as the elevation angle (or laser angle) of the corresponding laser beam. For example, the elevation angle of points corresponding to Laser n is estimated to be the same as the elevation angle of Laser n. Points are aligned according to an index of the corresponding laser beam. For example, points corresponding to Laser n are aligned according to a laser index n.

FIG. 27 shows an example of correction by converting an azimuthal angle into an index in point cloud data according to embodiments. An azimuthal index may be used as sampling correction for the azimuthal angle in cylindrical coordinate system, spherical coordinate system, or sector-shaped coordinate system.

Referring to FIG. 27, a plurality of lasers arranged in a vertical direction rotate in a horizontal direction (37001) to obtain point cloud data. When a position sampled by each laser beam is expressed as a line, sampled points need to theoretically be located on the line, but the point may be sampled at a position that deviates from the line due to sampling noise, quantization error, laser interference, and the like (37002).

FIG. 27 shows a $k^{th}$ sampling of an $n^{th}$ laser from among a plurality of lasers arranged vertically and sampling ($k^{th}-1$, $k^{th}+1$ sampling) points adjacent thereto (37003). The positions of points sampled by the $k^{th}$ light beam and the $k^{th}+1$ and $k^{th}+1$th light beams are distributed with an error around a trajectory of a laser beam. As such, the position of the point with an error in an azimuthal angle may be approximated with an index and corrected to be located on the trajectory of a laser beam.

Hereinafter, error correction of a reference frame will be described based on the LiDAR characteristics described thus far.

3) Reference Frame Error Correction Based on LiDAR Characteristics (a) of FIG. 28 and (b) of FIG. 28 are diagrams showing an example of changes in points generated as a vehicle equipped with a LiDAR system moves, according to embodiments. (b) of FIG. 28 shows an example obtained by rotating (a) of FIG. 28 counterclockwise by 90 degrees.

As described above, the LiDAR system may use both a laser beam above a reference ($\theta>0$) and a laser beam below a reference ($\theta<0$) based on a horizontal direction in vehicle local coordinate. In this case, $\theta$, which is an angle between a horizontal reference and a direction in which a laser beam is directed in the vehicle local coordinate system of a LiDAR system, may have a unique value depending on a laser beam.

As shown in (a) of FIG. 28, an elevation angle of an $N^{th}$ laser beam at a position at which a reference frame is obtained may be $\theta_N$.

Similarly, when the LiDAR system performs sampling while rotating a laser beam in a horizontal direction, the number of rotations is fixed, and thus it may be assumed that a laser sampling position remains constant. In this case, as shown in (b) of FIG. 28, an $M^{th}$ horizontal sampling position may be considered as a function of azimuthal angle $\phi_M$.

Then, a point $P_{ref}$ of the reference frame obtained at the $M^{th}$ horizontal sampling position by using the $N^{th}$ laser beam with respect to the reference frame may be represented on the Cartesian coordinate system and the spherical coordinate system as shown in Equation 19 below.

$$P_{ref} = (x_{ref}, y_{ref}, z_{ref}) = (r_{ref}, \phi_M, \theta_N) \quad \text{[Equation 19]}$$

In Equation 19 above, $r_{ref}$ represents a distance from the center of LiDAR $P_{origin}=(x_{origin}, y_{origin}, z_{origin})$ to an object (or point) and may be obtained according to Equation 20 below.

$$r_{ref} = \sqrt{(x_{ref} - x_{origin})^2 + (y_{ref} - y_{origin})^2 + (z_{ref} - z_{origin})^2} \quad \text{[Equation 20]}$$

When the position of the LiDAR system is changed by movement $v=(x_{mv}, y_{mv}, z_{mv})$ of a vehicle as shown in (a) of FIG. 28 and (b) of FIG. 28, a point $P_{cur}$ of the current frame sampled at the same horizontal angle $\phi_M$ with respect to the same $N^{th}$ laser beam may be defined according to Equation 21 below.

$$P_{cur} = (x_{cur}, y_{cur}, z_{cur}) = (r_{cur}, \phi_M, \theta_N) \quad \text{[Equation 21]}$$

In Equation 21 above, $r_{cur}$ represents a distance from the center of LiDAR $P_{origin}=(x_{origin}, y_{origin}, z_{origin})$ to an object and may be obtained according to Equation 22 below.

$$r_{cur} = \sqrt{(x_{cur} - x_{origin})^2 + (y_{cur} - y_{origin})^2 + (z_{cur} - z_{origin})^2} \quad \text{[Equation 22]}$$

In this case, a point $P_{cur}$ of the current frame may be estimated based on the point $P_{ref}$ in the reference frame. In general, when inter-frame reference is made, movement of each point may be estimated by moving a point $P_{ref}$ of the reference frame by the motion vector v as shown in Equation 23 below ($P_{est}$).

$$P_{est} = P_{ref} + v = (x_{ref} + x_{mv}, y_{ref} + y_{mv}, z_{ref} + z_{mv}) \quad \text{[Equation 23]}$$

However, when the above general motion correction is used in the LiDAR system, a difference occurs between the estimated position of the point $P_{est}$ and the position of the target $P_{cur}$. In this case, compression efficiency decreases.

(a) of FIG. 29 and (b) of FIG. 29 are diagrams showing an example of a difference between an estimated position of a point and a position of a target according to embodiments. (b) of FIG. 29 shows an example obtained by rotating (a) of FIG. 29 counterclockwise by 90 degrees.

That is, (a) of FIG. 29 and (b) of FIG. 29 show a difference between the estimated position of the point $P_{est}$ and the position of the target point $P_{cur}$ according to a laser position $\theta_N$ and a sampling position $\theta_M$ when a point $P_{ref}$ in a reference frame is compensated for on the Cartesian coordinate system based on a motion vector.

The present disclosure proposes a LiDAR motion compensation method based on laser sampling characteristics to compensate for drop in compression efficiency, which occurs when there is a difference between the estimated position of the point $P_{est}$ and the position of the target point $P_{cur}$ as shown in (a) of FIG. 29 and (b) of FIG. 29.

Typically, in the case of spinning LiDAR, compression efficiency increases when compression is performed using coordinate system transformation, but it is difficult to apply compression using inter prediction. Inter prediction uses a tendency in that a change in spatial positions of points is estimated and the points move entirely or move together within a limited range, and this is because, when coordinate system transformation is performed, the tendency changes and the directions of adjacent points change.

The present disclosure is provided to perform geometry compression by using inter prediction even when coordinate transformation by overcoming the above problem. That is, a laser angle of a certain laser beam is fixed in a LiDAR system, and in this case, a sampling period at which sampling is performed while the corresponding laser beam rotates is fixed, and in this regard, the present disclosure may perform inter prediction of geometry information using the laser sampling characteristics.

a) Perform Prediction on Fixed Laser Sensor and Fixed Sampling Position (Spherical Coordinate System)

As in the example above, the characteristics of LiDAR are not considered in motion compensation on the Cartesian coordinate system.

In other words, in LiDAR, a point is defined as a distance to an object for a laser located in each direction. For example, when a laser is not located or is not in a sampling position, a point may not exist, and a frequency of points per unit of space decreases away from the center of the LiDAR. In other words, there is a high possibility of finding a point in the reference frame that corresponds to a point in the current frame at the center of LiDAR, but the possibility of finding a reference point in the reference frame that corresponds to the target point of the current frame becomes very low away from the center. However, as shown in FIG. 30, a laser obtains one point on a laser beam (for example, the object is assumed to be present within a threshold from the laser), it may be assumed that a corresponding point exists for the sampling position of each laser.

Therefore, according to an embodiment of the present disclosure, inter-frame prediction of geometry information is performed based on a point corresponding to a sampling position of each laser for two adjacent frames.

According to embodiments, a radius difference between a point of a previous frame and a point of the current frame that correspond to the sampling positions of respective lasers for two adjacent frames may be transmitted. In this case, motion estimation or motion compensation processes are not performed.

b) Estimate Local Shift Based on Correlation Between Laser Sensor and Object

Even when a corresponding point is found based on a sampling position of a laser, positions of points may not match each other, as described above. This may be seen as a problem caused by a relative change in a distance between LiDAR and the object. When a laser position and a laser sampling position are fixed to $\theta_N$ and $\phi_M$ according to the above assumption, $r_{est}$ similar to $r_{cur}$ may be estimated to increase prediction accuracy.

According to embodiments, the point $P_{est}$ estimated based on the point in the reference frame may be expressed on the Cartesian coordinate system and the spherical coordinate system, as shown in FIG. 24.

$$P_{est} = (x_{est}, y_{est}, z_{est}) = (r_{est}, \phi_M, \theta_N) \quad \text{[Equation 24]}$$

In Equation 24 above, $r_{est}$ may represent a distance to an object (or point) from the center $P_{origin} = (x_{origin}, y_{origin}, z_{origin})$ of LiDAR and may be obtained according to Equation 25 below.

$$r_{est} = \sqrt{(x_{est} - x_{origin})^2 + (y_{est} - y_{origin})^2 + (z_{est} - z_{origin})^2} \quad \text{[Equation 25]}$$

That is, in Equation 25, $r_{est}$ is a radius value of the point estimated assuming that a laser sampling position is fixed to $\theta_N$ and $\phi_M$.

(a) of FIG. 31 and (b) of FIG. 31 are diagrams showing an example of an estimated position of a current point according to embodiments. (b) of FIG. 31 shows an example obtained by rotating (a) of FIG. 31 counterclockwise by 90 degrees.

In more detail, (a) of FIG. 31 and (b) of FIG. 31 show the results of estimating the position of the current point based on the estimated radius and reference frame laser sampling information (i.e., $\theta_N$ and $\phi_M$). $s_{object}$ represents relative movement of an object with respect to LiDAR. In this case, the relative movement of the object may be considered as local motion.

That is, the estimated position $P_{est}$ of the point of the current frame may be obtained based on a point $p_{ref}$ of a reference frame, a motion vector v, and relative motion $s_{object}$ of an object, as shown in Equation 26 below.

$$P_{est} = P_{ref} + v + s_{object} \quad \text{[Equation 26]}$$

$$s_{object} = (x_{shift}, y_{shift}, z_{shift})$$

In this case, when a point is estimated based on a fixed laser and a fixed sampling position on the spherical coordinate system, an influence of the motion vector may be assumed to be 0, and thus the estimated position $P_{est}$ of the current frame may be obtained by applying only the relative movement $s_{object}$ of the object to the point $p_{ref}$ of the reference frame. As such, bits required to transmit the motion vector may be saved, and compression and restoration may be performed more quickly because motion estimation/motion compensation is not performed.

When point compression is performed using this method, point compression on the spherical coordinate system may be considered. In this case, point compression may be performed assuming that a laser position and a sampling position are the same, and in this case, compression efficiency may be increased by not transmitting a value of ($\phi_M$, $\theta_N$). In other words, only $r_{res}$ may be transmitted through a relationship in Equation 27 below. Here, $r_{res}$ is a difference between a radius value $r_{cur}$ of the estimated point of the current frame and a radius value $r_{ref}$ of the reference frame. In the present disclosure, this difference may be referred to as residual radius information, residual, or radius residual information. In this case, it is assumed that the laser positions and sampling positions of the reference frame and the current frame are the same.

$$r_{res} = r_{cur} - r_{ref} \phi_{res} = \phi_{cur} - \phi_{ref} = \phi_M - \phi_M = 0 \quad \text{[Equation 27]}$$

$$\theta_{res} = \theta_{cur} - \theta_{ref} = \theta_N - \theta_N = 0$$

When output coordinate system is Cartesian coordinate system, Cartesian residuals for x, y, and z like in Equation 28 below may be additionally transmitted.

$$x_{res} = x_{cur} - x_{est} \quad \text{[Equation 28]}$$

$$y_{res} = y_{cur} - y_{est}$$

$$z_{res} = z_{cur} - z_{est}$$

In this case, a point position on the spherical coordinate system may be restored as shown in Equation 29 below. According to embodiments, restoration of the point position may be performed by a point cloud decoder of a reception device or a decoding operation.

$$r_{rec} = r_{ref} + r_{res} \quad \text{[Equation 29]}$$

$$\phi_{rec} = \phi_{ref} = \phi_M$$

$$\theta_{rec} = \theta_{ref} = \theta_N$$

The point location on the Cartesian coordinate system restored therethrough may be obtained as in Equation 30 below.

$$x_{res} = r_{rec} \cdot \cos\phi_{rec}$$ [Equation 30]
$$y_{res} = r_{rec} \cdot \sin\phi_{rec}$$
$$z_{res} = r_{rec} \cdot \tan\theta_{rec}$$

According to embodiments, when a laser beam deviates from an object, point matching between frames may not occur. In this case, when an azimuthal angle and an elevation angle are estimated through values ($\phi_M$, $\theta_N$), larger errors may occur, resulting in larger ($x_{res}$, $y_{res}$, $z_{res}$) and lower compression efficiency. In this case, a transmitting side needs to transmit all values ($r_{res}$, $\phi_{res}$, $\theta_{res}$), and in this case, spherical residual for all points may be transmitted, but in preset cases, the entire residual needs to be transmitted. For example, in most cases, when the same laser position and the same sampling position are expected to refer to the same object, the entire spherical residual is transmitted only for a certain condition, as shown in Equation 31 below, and in the remaining cases, the azimuthal angle and the elevation angle of the reference frame may be used. In other words, when a value of the three spherical residual present flag is 1, all values ($r_{res}$, $\phi_{res}$, $\theta_{res}$) may be transmitted, and when the value is not 1, only a value $r_{res}$ may be transmitted. In the present disclosure, $r_{res}$ may be radius residual information, $\phi_{res}$ may be considered as azimuthal angle residual information, and $\theta_{res}$ may be elevation angle residual information.

$$\begin{cases} \text{code } (r_{res}, \phi_{res}, \theta_{res}) & \text{if three spherical residual present flag} = 1 \\ \text{code } r_{res} & \text{else} \end{cases}$$ [Equation 31]

In this case, the three spherical residual present flag (all_spherical_residual_present_flag or spherical_residual_enabled_flag) may be signaling information indicating whether a laser deviates from an object and transmitted to a receiving side. Alternatively, a receiver may determine this information based on a predefined (or separately transmitted) threshold as shown in Equation 32 below. For example, when $r_{res}$ is greater than the threshold, the point position in the Cartesian coordinate system may be restored using all values ($r_{res}$, $\phi_{res}$, $\theta_{res}$), otherwise, the point position on the Cartesian coordinate system may be restored using only $r_{res}$.

$$\text{three spherical residual present flag} = \begin{cases} 1 & \text{if } r_{res} > Th \\ 0 & \text{else} \end{cases}$$ [Equation 32]

In this case, the threshold may be an arbitrarily determined constant, or may be determined as different values set on a frame/tile/slice/object/block basis. Alternatively, the threshold may be determined to be a value that varies variably based on a speed of LiDAR, an estimated value of change in distance between an object and LiDAR, and the position of the object.

FIG. 32 is a diagram showing another example of a point cloud transmission device according to embodiments. Elements of the point cloud transmission device shown in FIG. 32 may be implemented with hardware, software, processor, and/or a combination thereof.

According to embodiments, the point cloud transmission device may include a data input unit 51001, a signaling processor 51002, a geometry encoder 51003, an attribute encoder 51004, and a transmission processor 51005.

The geometry encoder 51003 and the attribute encoder 51004 may perform some or all of the operations described above by the point cloud video encoder 10002 of FIG. 1, the encoding 20001 of FIG. 2, the point cloud video encoder of FIG. 4, and the point cloud video encoder of FIG. 12.

The data input unit 51001 according to embodiments receives or obtains point cloud data. The data input unit 51001 may perform some or all of the operations of the point cloud video acquisition unit 10001 of FIG. 1 or perform some or all of the operations of the data input unit 12000 of FIG. 12.

The data input unit 51001 outputs the positions of points of the point cloud data to the geometry encoder 51003, and outputs the attributes of the points of the point cloud data to the attribute encoder 51004. Parameters are output to the signaling processor 51002. According to embodiments, parameters may be provided to the geometry encoder 51003 and the attribute encoder 51004.

According to an embodiment, the data input unit 51001 receives (or obtains) point cloud data from a spinning LiDAR that rotates a vertically arranged laser by 360 degrees in a horizontal direction. In this case, the LiDAR head includes one or more laser modules (or laser sensors) arranged at a certain angle in a vertical direction and rotates horizontally around a vertical axis to obtain data. Times (and/or wavelengths) for laser beams output from respective laser modules to be reflected from the target (e.g., object) and return may be the same or different. Therefore, LiDAR data is 3D representation configured based on a difference in time and/or wavelength for the laser beams to return from the target.

According to embodiments, the spinning LiDAR rotates around the z axis on local coordinate system to obtain data.

According to an embodiment, the geometry encoder 51003 performs coordinate transformation of geometry information of point cloud data. For example, geometry information, that is, position information of each point, may be converted into cylindrical coordinate system, spherical coordinate system, or sector-shaped spherical coordinate system as shown in FIGS. 21 to 24.

The geometry encoder 51003 performs prediction between frames (or inter-frame prediction) based on at least one of FIGS. 25 to 31 and Equations 19 to 32 in transformed coordinate system, for example, spherical coordinate system to compress geometry information. That is, according to an embodiment, the geometry encoder 51003 performs inter-frame prediction of geometry information based on points corresponding to the sampling positions of each laser for two adjacent frames. In other words, a laser angle of a certain laser beam is fixed in a LiDAR system, and in this case, a sampling period at which sampling is performed while the corresponding laser beam rotates is fixed, and in this regard, the geometry encoder 51003 may perform inter prediction of geometry information using the laser sampling characteristics. The inter prediction of the geometry information is described above in detail with reference to FIGS. 25 to 31 and Equations 19 to 32, and thus a description thereof will be omitted here to avoid redundant explanation.

The geometry encoder 51003 performs entropy encoding on the compressed geometry information and outputs the geometry information to the transmission processor 51005 in the form of a geometry bitstream.

The geometry encoder 51003 reconfigures the geometry information based on positions changed through compression, and outputs the reconfigured (or decoded) geometry information to the attribute encoder 51004.

The attribute encoder 51004 compresses attribute information based on positions at which geometry encoding is not performed and/or reconfigured geometry information. According to an embodiment, the attribute information may be coded using any one or a combination of one or more of RAHT coding, LOD-based predictive transform coding, and lifting transform coding. The attribute encoder 51004 performs entropy encoding on the compressed attribute information and outputs the information to the transmission processor 51005 in the form of an attribute bitstream.

The signaling processor 51002 may generate and/or processes signaling information necessary for encoding/decoding/rendering of the geometry information and attribute information and provide the generated and/or processed signaling information to the geometry encoder 51003, the attribute encoder 51004, and/or the transmission processor 51005. Alternatively, the signaling processor 51002 may be provided with the signaling information generated by the geometry encoder 51003, the attribute encoder 51004, and/or the transmission processor 51005. The signaling processor 51002 may provide information fed back from the reception device (e.g., head orientation information and/or viewport information) to the geometry encoder 51003, the attribute encoder 51004, and/or the transmission processor 51005.

In the present disclosure, the signaling information may be signaled and transmitted in units of a parameter set (an SPS, a GPS, an APS, and a TPS (also referred to as a tile inventory)). In addition, the signaling information may be signaled and transmitted in units of a coding unit (or a compression unit or a prediction unit) of each image, such as a slice or a tile.

The transmission processor 51005 may perform the same or similar operation and/or transmission method as or to the operation and/or transmission method of the transmission processor 12012 of FIG. 12 and perform the same or similar operation and/or transmission method as or to the transmitter 1003 of FIG. 1. For a detailed description, refer to the description of FIG. 1 or FIG. 12 and the detailed description will be omitted herein.

The transmission processor 51005 may multiplex the geometry bitstream output from the geometry encoder 51003, the attribute bitstream output from the attribute encoder 51004, and the signaling bitstream output from the signaling processor 51002 into one bitstream. The multiplexed bitstream may be transmitted without change or transmitted by being encapsulated in a file or a segment. In an embodiment of the present disclosure, the file is in an ISOBMFF file format.

According to embodiments, the file or the segment may be transmitted to the reception device or stored in a digital storage medium (e.g., a USB drive, SD, CD, DVD, Blu-ray disc, HDD, SSD, etc.). The transmission processor 51005 according to the embodiments may communicate with the reception device through wired/wireless communication through a network such as 4G, 5G, or 6G. In addition, the transmission processor 51005 may perform a necessary data processing operation depending on a network system (e.g., a 4G, 5G, or 6G communication network system). The transmission processor 51005 may transmit encapsulated data according to an on-demand scheme.

According to embodiments, compression-related information is included in GPS and/or TPS and/or geometry data unit (also referred to as a geometry slice bitstream) by at least one of the signaling processor 51002, the geometry encoder 51003, and the transmission processor 51005 and may be transmitted.

FIG. 33 is a detailed block diagram of the geometry encoder 51003 according to embodiments. In more detail, FIG. 33 is a detailed block diagram of the geometry encoder 51003 for performing geometry compression based on inter-frame correlation according to embodiments. Elements of the geometry encoder shown in FIG. 33 may be implemented with hardware, software, processor, and/or a combination thereof.

According to embodiments, the geometry encoder 51003 may include a first tree generator 51031, a second tree generator 51036, a first coordinate converter 51032, a second coordinate converter 51037, a spherical domain estimator 51033, a third coordinate converter 51034, a cartesian domain estimator 51035, a spherical residual acquisition unit 51038, a distance estimator 51039, and an orthogonal residual acquisition unit 51040. In FIG. 33, an execution order of each block may be changed, some blocks may be omitted, and some blocks may be newly added.

The first tree generator 51031 may generate a tree based on the point cloud data of the current frame and generate a connection relationship between points. Here, the tree may be an octree or a prediction tree.

The second tree generator 51036 may generate a tree based on the point cloud data of the reference frame (e.g., previous frame) and generate a connection relationship between points.

Here, the tree is not limited to the octree or the prediction tree, and any tree representing a connection relationship between points is possible. The first tree generator 51031 and the second tree generator 51036 may include a process such as sorting or may be replaced.

The first coordinate converter 51032 may transform coordinate system of points in a tree of the current frame to a coding domain. Here, according to an embodiment, the coding domain may be a spherical domain.

The second coordinate converter 51037 may transform coordinate system of points in a tree of the reference frame to a coding domain.

According to an embodiment, the first coordinate converter 51032 and the second coordinate converter 51037 may transform Cartesian coordinate system to spherical coordinate system.

The coordinate transformation in the first coordinate converter 51032 and the second coordinate converter 51037 will be referred to the description of FIGS. 21 to 24 to avoid redundant explanation.

The spherical domain estimator 51034 performs spherical domain estimation on points of the current frame converted to a spherical coordinate system.

The spherical residual acquisition unit 51038 estimates a position of a corresponding point of the current frame based on output of the spherical domain estimator 51033 and the second coordinate system converter 51037, that is, based on a laser sampling position of the reference frame on the spherical coordinate system. The estimated point $P_{est}$ may be expressed in Cartesian coordinate system and spherical coordinate system. The spherical residual acquisition unit 51038 obtains a residual between a point position of the reference frame and an estimated point position on the spherical coordinate system.

The distance estimator 51039 may determine whether to transmit the related residual by estimating a distance between an object and the LiDAR. Based on the result estimated by the distance estimator 51039, only the radius residual information is included in the output bitstream and transmitted ($r_{res}$), or the radius residual information, azimuthal angle residual information, and elevation angle residual information are included in the output bitstream and transmitted ($r_{res}$, $\phi_{res}$, $\theta_{res}$).

According to an embodiment, all values ($r_{res}$, $\phi_{res}$, $\theta_{res}$) may be transmitted or only a value $r_{res}$ may be transmitted according to a value of the three spherical residual present flag (or three residual signaling flag) or a preset threshold.

According to an embodiment, it is assumed that the laser position and the laser sampling position are fixed at $\theta_N$ and $\phi_M$. That is, when a point is estimated based on a fixed laser and a fixed sampling position on the spherical coordinate system, an influence of the motion vector may be assumed to be 0, and thus the estimated position $P_{est}$ of the current frame may be obtained by applying only the relative movement $s_{object}$ of the object to the point $p_{ref}$ of the reference frame.

A laser position and a sampling position are assumed to be the same, and thus, in this case, compression efficiency may be increased by not transmitting a value of ($\phi_M$, $\theta_N$). In other words, only $r_{res}$ may be transmitted through a relationship in Equation 27. Here, $r_{res}$ is a difference between the radius value $r_{cur}$ of the estimated point in the current frame and the radius value $r_{ref}$ of the reference point in the reference frame.

The third coordinate converter 51034 performs coordinate transformation based on the output of the spherical domain estimator 51033 and the output of the distance estimator 51039. In other words, coordinate transformation from spherical coordinate system to Cartesian coordinate system is performed. The cartesian domain estimator 51035 performs cartesian domain estimation on points of the current frame converted to Cartesian coordinate system.

The orthogonal residual acquisition unit 51040 may calculates a residual between the estimated point position and the point position of the reference frame in the Cartesian coordinate system based on the output of the cartesian domain estimator 51035 and the output of the second tree generator 51036. Residual information (xres, yres, zres) of the Cartesian coordinate system may be included in the output bitstream and transmitted.

As described above, the geometry encoder of FIG. 33 creates a connection relationship between points through tree generation for input point cloud data. Conversion to a coding domain may be performed through coordinate transformation, and a residual with a corresponding point having the same laser position and sampling interval in the reference frame may be obtained. In this case, whether to transmit a related residual may be determined by estimating a distance between an object and a LiDAR. Based thereon, transformation to Cartesian coordinate system may be performed, and then a Cartesian residual is estimated and transmitted in the form of a bitstream. If necessary, a motion vector may be estimated and included and transmitted in the bitstream.

FIG. 34 shows an example bitstream structure of point cloud data for transmission/reception according to embodiments. According to embodiments, a bitstream output from the point cloud video encoder of one of FIGS. 1, 2, 4, 12, 32 and 33 may be in the form of FIG. 34.

According to embodiments, the bitstream of point cloud data provides a tile or a slice to divide and process point cloud data by region. Each region of a bitstream according to embodiments may have different importance. Therefore, when point cloud data is divided into tiles, different filters (encoding methods) and different filter units may be applied to each tile. When point cloud data is divided into slices, different filters and different filter units may be applied to each slice.

The transmitting device according to the embodiments may transmit point cloud data according to the bitstream structure as shown in FIG. 34, and thus provided may be provided a method of applying different encoding operations according to importance and using an encoding method with good quality in an important area. In addition, efficient encoding and transmission according to the characteristics of point cloud data may be supporte4d and an attribute value according to user requirements may be provided.

The receiving device according to embodiments receives point cloud data according to the bitstream structure as shown in FIG. 34, and thus different filtering methods (decoding methods) may be applied for each region (region divided into tiles or slices) instead of using a complicated decoding (filtering) method for entire point cloud data according to the processing capacity of the receiving device. Accordingly, a better image quality in an important region to a user and appropriate latency on a system may be ensured.

When a geometry bitstream, an attribute bitstream, and/or a signaling bitstream (or signaling information) according to embodiments constitute one bitstream (or G-PCC bitstream) as shown in FIG. 34, the bitstream may include one or more sub bitstreams. A bitstream according to embodiments may include a sequence parameter set (SPS) for signaling of a sequence level, a geometry parameter set (GPS) for signaling of geometry information coding, one or more attribute parameter sets ($APS_0$ and $APS_1$)) for signaling of attribute information coding, a tile inventory for signaling at a tile level (also referred to as a TPS), and one or more slices (slice 0 to slice n). That is, a bitstream of point cloud data according to embodiments may include one or more tiles, and each tile may be a group of slices including one or more slices (slice 0 to slice n). A tile inventory (i.e., TPS) according to embodiments may include information about each tile (e.g., coordinate value information and height/size information of a tile bounding box) for one or more tiles. Each slice may include one geometry bitstream (Geom0) and/or one or more attribute bitstreams (Attr0 and Attr1). For example, slice 0 may include one geometry bitstream ($Geom0^0$) and one or more attribute bitstreams ($Attr0^0$ and $Attr1^0$).

The geometry bitstream in each slice may include a geometry slice header (geom_slice_header) and geometry slice data (geom_slice_data). According to embodiments, the geometry bitstream within each slice is also referred to as a geometry data unit, the geometry slice header is referred to as a geometry data unit header, and the geometry slice data is referred to as geometry data unit data or geometry data unit or data unit. A geometry slice header (or geometry data unit header) according to embodiments may include information (geomBoxOrigin, geom_box_log 2_scale, Geom_max_node_size_log 2, geom_num_points) and the like about data included in identification information (geom_parameter_set_id), a tile identifier (geom_tile_id), a slice identifier (geom_slice_id), and geometry slice data (geom_slice_data) of a parameter set included in a geometry parameter set (GPS). geomBoxOrigin is geometry box origin information indicating the box origin of the corresponding geometry slice data, geom_box_log 2_scale is information indicating a log scale of the corresponding geometry slice data, geom_max_node_size_log 2 is information indicating the size of the root geometry octree node, and geom_num_points is information related to information related to the number of points of the corresponding geometry slice data. Geometry slice data (or geometry data unit data) according to embodiments may include geometry information (or geometry data) of point cloud data within a corresponding slice.

Each attribute bitstream in each slice may include attribute slice header (attr_slice_header) and attribute slice data (attr_slice_data). According to embodiments, an attribute bitstream within each slice is also referred to as an attribute data unit, an attribute slice header is referred to as an attribute data unit header, and attribute slice data is referred to as attribute data unit data. An attribute slice header (or attribute data unit header) according to embodiments may include information about the corresponding attribute slice data (or corresponding attribute data unit), and the attribute slice data may include attribute information (also referred to as attribute data or attribute value) of point cloud data in the corresponding slice. When there are a plurality of attribute bitstreams in one slice, each attribute bitstream may include different attribute information. For example, one attribute bitstream may include attribute information corresponding to color, and another attribute stream may include attribute information corresponding to reflectance.

According to embodiments, parameters required for encoding and/or decoding of point cloud data may be defined in parameter sets of point cloud data (e.g., SPS, GPS, APS, and TPS (also referred to as a tile inventory)) and/or a header of the corresponding slice. For example, during encoding and/or decoding of geometry information, the parameters may be added to a geometry parameter set (GPS), and during tile-based encoding and/or decoding, the parameters may be added to a tile and/or a slice header.

According to embodiments, geometry compression-related information may be signaled to at least one of a geometry parameter set, a geometry slice header (also referred to as a geometry data unit header), or geometry slice data (also referred to as geometry data unit data or data unit).

According to embodiments, geometry compression-related information may be signaled to an attribute parameter set and/or an attribute slice header (also referred to as an attribute data unit header) in connection with an attribute coding method or applied to attribute coding.

According to embodiments, the geometry compression-related information may be signaled to a sequence parameter set and/or a tile parameter set.

According to embodiments, when a syntax element defined below is to be applied to a plurality of point cloud data streams as well as the current point cloud data stream, the geometry compression-related information may be transferred through a parameter set of a higher concept, and the like.

According to embodiments, the geometry compression-related information may be defined in a corresponding position or a separate position depending on the application or system, and an application range, an application method, and the like may be used differently. A field, a term used in syntaxes of the present specification described below, may have the same meaning as a parameter or a syntax element.

According to embodiments, parameters (which may be variously called metadata, signaling information, and the like) including the geometry compression-related information may be generated by a metadata processor (or metadata generator) or a signaling processor of a transmitting device, and may be transferred to a receiving device to be used in a decoding/reconstruction process. For example, a parameter generated and transmitted by a transmitting device may be obtained from a metadata parser of the receiving device.

FIG. 35 shows an example of a syntax structure of a geometry parameter set (geometry_parameter_set ( ) (GPS) according to an embodiment of the present disclosure. The GPS according to embodiments may include information about a method of encoding geometry information of the point cloud data contained in one or more slices.

A geometry parameter set according to embodiments may include a motion_vector_disabled_flag field and a spherical_residual_enabled_flag field.

The motion_vector_disabled_flag field may indicate whether to transmit a motion vector. For example, when a value of the motion_vector_disabled_flag field is 0, this may indicate that the motion vector is transmitted, and when the value of the motion_vector_disabled_flag field is 1, this may indicate that the motion vector is not transmitted.

The spherical_residual_enabled_flag field may indicate whether to transmit a spherical residual (e.g., refer to Equation 27). For example, when a value of the spherical_residual_enabled_flag field is 0, this may indicate that a spherical residual is not transmitted, and the value of the spherical_residual_enabled_flag field is 1, this may indicate that a spherical residual is transmitted.

In the present disclosure, the motion_vector_disabled_flag field and the spherical_residual_enabled_flag field may be referred to as geometry compression related information. According to embodiments, the geometry compression related information may be included at any position in the geometry parameter set of FIG. 35.

FIG. 36 is a diagram showing an example of a syntax structure of geometry_data_unit( ) according to embodiments.

The geometry_data_unit( ) according to embodiments may include geometry_data_unit_header( ) or may include geometry_octree( ) or geometry predtree_data( ).

For example, the geometry_data_unit( ) includes geometry_octree( ) when a value of the geom_tree_type field included in the geometry parameter set is 0, and includes geometry_predtree_data( ) when the value is 1.

FIG. 37 is a diagram showing an example of a syntax structure of geometry_data_unit_header( ) according to embodiments.

In FIG. 37, gsh_geometry_parameter_set_id specifies the value of the gps_geom_parameter_set_id of the active GPS.

The gsh_tile_id field indicates a identifier of a corresponding tile referenced by the corresponding geometry_data_unit_header( ).

The gsh_slice_id field indicates an identifier of the slice header for reference by other syntax elements.

The slice_tag field may be used to identify one or more slices having a specific value of slice_tag.

The frame_ctr_lsb field indicates least significant bits (LSB) of a notional frame number.

The geometry_data_unit_header( ) according to embodiments may further include ref_frame_id field.

The ref_frame_id field may indicate an index of a reference frame used for PU prediction.

The geometry_data_unit_header( ) according to embodiments may further include an mv_depth_start field and an mv_depth_end field when a value of the motion_vector_disabled_flag field is false. According to an embodiment, the motion_vector_disabled_flag field may be signaled to the geometry parameter set.

The mv_depth_start field and the mv_depth_end field may indicate start and end of an octree depth at which the motion vector is to be transmitted.

The geometry_data_unit_header( ) according to embodiments may further include a skip_angles_flag field when a value of the spherical_residual_enabled_flag field is true. According to an embodiment, the spherical_residual_enabled_flag field may be signaled to the geometry parameter set.

The skip_angles_flag field may indicate whether to transmit a portion of the spherical residual. For example, when a value of the skip_angles_flag field is 1, this may indicate that a portion of the spherical residual is not transmitted, and when the value is 0, this may indicate that a portion of the spherical residual is transmitted.

The geometry_data_unit_header( ) according to embodiments may further include a per_point_three_residual_signaling_flag field when a value of the skip_angles_flag field is false.

The per_point_three_residual_signaling_flag field may indicate whether to transmit a residual for each point. For example, a value of the per_point_three_residual_signaling_flag field is 1, this may indicate that a residual is transmitted for each point, and when the value is 0, this may indicate that the residual is not transmitted.

The geometry_data_unit_header( ) according to embodiments may further include a threshold field when a value of the per_point_three_residual_signaling_flag field is true.

The threshold field may indicate a threshold for determining whether to transmit a residual.

In the present disclosure, the skip_angles_flag field, the per_point_three_residual_signaling_flag field, and/or the threshold field may be referred to as geometry compression related information. According to embodiments, the geometry compression related information may be included at any position in the geometry_data_unit_header( ) of FIG. 37.

FIG. 38 shows an example syntax structure of a data unit (data_unit( )) including geometry compression related information according to embodiments. In one embodiment, the data unit (data_unit( )) of FIG. 38 is included in the geometry octree data (geometry_octree( )).

The data unit (data_unit( )) of FIG. 38 may include a split_flag[i][j] field, a population_flag[i][j] field, a motion_vector[i][j][k] field, and an occupancy_map[i][j] field.

The split_flag[i][j] field indicates whether the j-th node among the nodes belonging to the i-th octree depth of the octree is split. For example, split_flag[i][j] equal to 1 indicates that the motion vector for the j-th node of the i-th octree depth is delivered after splitting into child nodes. That is, it indicates that the j-th node of the i-th octree depth is split. Also, split_flag[i][j] equal to 0 indicates that the motion vector for the j-th node of the i-th octree depth is delivered. That is, it indicates that the j-th node of the i-th octree depth is not split, and therefore the motion vector is delivered from the j-th node.

The population_flag[i][j] field is included when the value of the split_flag[i][j] field is 0, and indicates whether the j-th node is occupied among the nodes belonging to the i-th octree depth of the octree. For example, population_flag[i][j] equal to 1 indicates that the j-th node of the i-th octree depth is occupied, while population_flag[i][j] equal to 0 indicates that the j-th node is non-occupied. In other words, population_flag[i][j] may indicate whether a non-split node is occupied.

The motion_vector[i][j][k] field is included when the value of the population_flag[i][j] field is 1, and may indicate the motion vector for each axis of the j-th node among the nodes belonging to the i-th octree depth of the octree. where k denotes the x, y, and z axes.

The occupancy_map[i][j] field may carry the occupancy map of the j-th node among the nodes belonging to the i-th octree depth of the octree. The occupancy map may be passed in bits or bytes.

The data_unit( ) according to embodiments may further include a res_radius field when a value of the spherical_residual_enabled_flag field is true. According to an embodiment, the spherical_residual_enabled_flag field may be signaled to the geometry parameter set.

The res_radius field may indicate radius residual information $r_{res}$ of the spherical residual.

The data_unit( ) according to embodiments may further include a three_residual_signaling_flag field when a value of the skip_angles_flag field is false and a value of the per_point_three_residual_signaling_flag field is true. According to an embodiment, the skip_angles_flag field and the per_point_three_residual_signaling_flag field may be signaled to a data unit header.

The three_residual_signaling_flag field may indicate whether to transmit all three residuals. For example, when a value of the three_residual_signaling_flag field is 0, this may indicate that only radius residual information $r_{res}$ is transmitted, and when the value is 1, this may indicate all of radius residual information, azimuthal angle residual information, and elevation angle residual information ($r_{res}$, $\phi_{res}$, $\theta_{res}$) are transmitted. That is, $r_{res}$, $\phi_{res}$, and $\theta_{res}$ may indicate spherical residual for a radius, a azimuthal angle, and an elevation angle. The three_residual_signaling_flag field may be used with the same or similar meaning as the three spherical residual present flag field, all_spherical_residual_present_flag, or spherical_residual_enabled_flag.

Thus, the data_unit( ) may further include a res_azimuthal_angle field and a res_elevation_angle field when a value of the three_residual_signaling_flag field is true.

The res_azimuthal_angle field indicate azimuthal angle residual information $\phi_{res}$ of the spherical residual.

The res_elevation_angle field indicate elevation angle residual information $\theta_{res}$ of the spherical residual.

The data_unit( ) according to embodiments may further include a $res_x$ field, a $res_y$ field, and a $res_z$ field. The $res_x$ field, the $res_y$ field, and the $res_z$ field indicate residual information for x, y, and z axes in Cartesian coordinate system. That is, when output coordinate system is Cartesian coordinate system, a Cartesian residual for x, y, and z axes may be further transmitted.

FIG. 39 is a diagram showing another example of a point cloud data reception device according to embodiments. Elements of the point cloud data reception device shown in FIG. 39 may be implemented by hardware, software, processor, and/or a combination thereof.

According to embodiments, the point cloud data reception device may include a reception processor 61001, a signaling processor 61002, the geometry decoder 61003, an attribute decoder 61004, and a post-processor 61005.

The reception processor 61001 according to embodiments may receive one bitstream or may receive each of a geometry bitstream, an attribute bitstream, and a signaling bitstream. When receiving a file and/or a segment, the reception processor 61001 according to embodiments may decapsulate the received file and/or segment and output the decapsulated file and/or segment in a bitstream.

When receiving (or decapsulating) one bitstream, the reception processor 61001 according to embodiments may demultiplex a geometry bitstream, an attribute bitstream, and/or a signaling bitstream from one bitstream, output the demultiplexed signaling bitstream to the signaling processor

61002, output the geometry bitstream to the geometry decoder 61003, and output the attribute bitstream to the attribute decoder 61004.

When receiving (or decapsulating) a geometry bitstream, an attribute bitstream, and/or a signaling bitstream, the reception processor 61001 according embodiments may transfer the signaling bitstream to the signaling processor 61002, transfer the geometry bitstream to the geometry decoder 61003, and transfer the attribute bitstream to the attribute decoder 61004.

The signaling processor 61002 may parse and process information included in signaling information, e.g., SPS, GPS, APS, TPS, and metadata from the input signaling bitstream and provide the parsed and processed information to the geometry decoder 61003, the attribute decoder 61004, and the post-processor 61005. According to another embodiment, signaling information included in the geometry data unit header and/or the attribute data unit header may also be pre-parsed by the signaling processor 61002 prior to decoding of corresponding slice data.

According to embodiments, the signaling processor 61002 may also parse and process signaling information (e.g., geometry compression-related information) signaled to the geometry data unit and provide the parsed and processed information to the geometry decoder 61003.

According to embodiments, the geometry decoder 61003 may restore geometry by performing a reverse process of the geometry encoder 51003 of FIG. 32 based on signaling information for the compressed geometry bitstream. That is, the geometry decoder 61003 restores the compressed and received geometry information based on inter-frame correlation.

Geometry information restored (or reconstructed) from the geometry decoder 61003 is provided to an attribute decoder 61004. The attribute decoder 61004 may restore attribute by performing a reverse process of the attribute encoder 51004 of FIG. 32 based on signaling information of the compressed attribute bitstream and the constructed geometry information.

According to embodiments, the post-processor 61005 may reconstruct point cloud data by matching geometry information (i.e., positions) restored and output by the geometry decoder 61003 and attribute information restored and output by the attribute decoder 61004 and display/render the point cloud data.

FIG. 40 is a detailed block diagram of the geometry decoder 61003 according to embodiments. FIG. 40 is a detailed block diagram of a geometry decoder for restoring geometry information based on an inter-frame correlation.

According to embodiments, the geometry decoder 61003 may include an entropy decoder 61031, a spherical domain restorer 61032, a tree generator 61033, a distance estimator 61034, a coordinate transformer 61035, and a Cartesian domain restorer 61036.

Elements of the geometry decoder shown in FIG. 40 may be implemented with hardware, software, processor, and/or a combination thereof. In FIG. 40, an execution order of each block may be changed, some blocks may be omitted, and some blocks may be newly added.

According to embodiments, when the reception processor 61001 obtains a bitstream, the geometry compression related information described with reference to FIGS. 35 to 38 may be obtained.

The entropy decoder 61031 may perform entropy decoding on a bitstream of the geometry information. According to an embodiment, the geometry information entropy-decoded by the entropy decoder 61031 may be entropy-coded prediction error (residual information or residual). According to embodiments, the prediction error may include spherical residuals for a radius, an azimuthal angle, and an elevating angle, and/or a Cartesian residual for x, y, and z. According to embodiments, the prediction error may include only a spherical residual for a radius (also referred to as radius residual information).

The tree generator 61033 may generate a tree based on data of a reference frame.

The distance estimator 61034 may estimate a distance between an object and a LiDAR based on output of the tree generator 61033 to determine whether to restore the related residual. Alternatively, the distance estimator 61034 may determine whether to restore a radius, an azimuthal angle, and an elevation angle according to signaling information (three spherical residual present flag and/or threshold) or a preset threshold.

The spherical domain restorer 61032 may parse geometry information decoded by the entropy decoder 61031 based on output of the distance estimator 61034 to restore a spherical residual. In other words, trees of the reference frame may be generated to be aligned to correspond points one-to-one and then a restoration value on the spherical domain may be obtained.

The coordinate transformer 61035 may perform coordinate transformation based on the restoration value on the spherical domain. The Cartesian domain restorer 61036 may restore a point position on the Cartesian domain through a residual transmitted after being transformed to the Cartesian coordinate system.

As described above, the geometry decoder of FIG. 40 parses the bitstream to restore the spherical residual. Trees of the reference frame may be generated to be aligned to correspond points one-to-one and then a restoration value on the spherical domain may be obtained. Then, a point position in the orthogonal domain may be restored through the residual transmitted after coordinate transformation based on the restored value in the spherical domain.

Compression based on inter-frame similarity described in the present disclosure thus far may be used for compression of point cloud data.

In particular, the accuracy of point prediction between adjacent frames may be increased based on the characteristics of LIDAR through the method described in the present disclosure. Compression between adjacent frames may also be performed without motion estimation. When prediction accuracy is high, compression efficiency may be further improved by not transmitting some of the residuals.

Therefore, the point cloud data transmission device and the encoder according to embodiments have an effect of efficiently compressing point cloud data by additionally considering not only intra-frame prediction but also inter-frame data prediction mode. Likewise, the point cloud data receiving device and the decoder according to embodiments have an effect of efficiently restoring the point cloud data based on signaling information in a bitstream and/or a decoding operation according to embodiments by receiving the bitstream including the point cloud data.

As above, operations of the point cloud compression transmission and reception method/device according to the embodiments described above may be described in combination with/reference to the process of the point cloud compression device/method below.

The operations according to embodiments described in the present disclosure may be performed by a transmitting and receiving device including a memory and/or a processor in some embodiments. The memory may store programs for processing/controlling the operations according to embodiments, and the processor may control various operations described in the present disclosure. The processor may be referred to as a controller or the like. The operation according to the embodiments may be performed by firmware, software, and/or a combination thereof, and the firmware, software, and/or a combination thereof may be stored in the processor or stored in the memory.

The aforementioned operation according to embodiments may be performed through components of the point cloud transmitting and receiving device/method including a memory and/or a processor. The memory may store programs for processing/controlling operations according to embodiments. Each component of the point cloud transmitting and receiving device/method according to embodiments may correspond to hardware, software, a processor, and/or a combination thereof. The processor may control the various operations described in the present disclosure. The processor may be referred to as a controller or the like. The operations according to embodiments may be performed by firmware, software, and/or a combination thereof and firmware, software, and/or a combination thereof may be stored in the processor or stored in the memory. In the present embodiment, the method of compressing geometry information of point cloud data has been described, but the methods described in the specification may be applied to attribute information compression and other compression methods.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Operations according to the embodiments described in this specification may be performed by a transmission/reception device including one or more memories and/or one or more processors according to embodiments. The one or more memories may store programs for processing/controlling the operations according to the embodiments, and the one or more processors may control various operations described in this specification. The one or more processors may be referred to as a controller or the like. In embodiments, operations may be performed by firmware, software, and/or combinations thereof. The firmware, software, and/or combinations thereof may be stored in the processor or the memory.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise. The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition. Embodiments may include variations/modifications within the scope of the claims and their equivalents. It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

Additionally, the operations according to the embodiments described in this document may be performed by transmitting and receiving devices, each of which includes a memory and/or processor, depending on the embodiments. The memory may store programs for processing and controlling the operations according to the embodiments, and the processor may control various operations described in this document. The processor may be referred to as a controller or the like. The operations according to the embodiments may be implemented by firmware, software, and/or combinations thereof, and the firmware, software, and/or combinations thereof may be stored in the processor or memory.

MODE FOR DISCLOSURE

The details have been specifically described in the best mode for the disclosure.

INDUSTRIAL APPLICABILITY

It will be apparent to those skilled in the art that various modifications and variations are possible without departing from the spirit or scope of the embodiments. Thus, it is intended that the embodiments cover the modifications and variations of the embodiments provided they come within the appended claims and their equivalents.

The invention claimed is:

1. A method of encoding point cloud data, the method comprising:
encoding geometry data of the point cloud data;
encoding attribute data of the point cloud data based on the geometry data; and
transmitting the encoded geometry data, the encoded attribute data, and signaling information,
wherein the encoding of the geometry data includes:
transforming a coordinate of the geometry data from a first coordinate system to a second coordinate system; and
compressing the geometry data by performing prediction based on a reference frame on the second coordinate system,
wherein the compressing of the geometry data includes:
obtaining radius residual information in the geometry data based on radius information in the geometry data and radius information in the predicted geometry data, and
wherein the signaling information includes information related to the radius residual information.

2. The method of claim 1, wherein the first coordinate system is a Cartesian coordinate system constructed by an x axis, a y axis, and a z axis, and the second coordinate system is a spherical coordinate system constructed by a radius, an azimuthal angle, and an elevation angle.

3. The method of claim 1, wherein the point cloud data is obtained by at least one laser, and
the encoding of the geometry data further includes estimating a point position of a current frame based on position information of a point of the reference frame corresponding to a sampling position of the at least one laser and relative movement information of an object.

4. The method of claim 3, wherein the at least one laser and the sampling position are fixed.

5. A device for encoding point cloud data, the device comprising:
a geometry encoder configured to encode geometry data of the point cloud data;
an attribute encoder configured to encode attribute data of the point cloud data based on the geometry data; and
a transmitter configured to transmit the encoded geometry data, the encoded attribute data, and signaling information,
wherein the geometry encoder comprises:
a coordinate converter configured to transform a coordinate of the geometry data from a first coordinate system to a second coordinate system; and
a compressor configured to compress the geometry data by performing prediction a reference frame on the transformed second coordinate system,
wherein the compressor obtains radius residual information in the geometry data based on radius information in the geometry data and radius information in the predicted geometry data, and
wherein the signaling information includes information related to the radius residual information.

6. The device of claim 5, wherein the first coordinate system is a Cartesian coordinate system constructed by an x axis, a y axis, and a z axis, and the second coordinate system is a spherical coordinate system constructed by a radius, an azimuthal angle, and an elevation angle.

7. The device of claim 5, wherein the point cloud data is obtained by at least one laser, and
the geometry encoder is configured to estimate a point position of a current frame based on position information of a point of the reference frame corresponding to a sampling position of the at least one laser and relative movement information of an object.

8. The device of claim 7, wherein the at least one laser and the sampling position are fixed.

9. A method of decoding point cloud data, the method comprising:
receiving geometry data, attribute data, and signaling information;

decoding the geometry data including radius residual information based on the signaling information; and decoding the attribute data based on the signaling information and the decoded geometry data, wherein the decoding of the geometry data includes deriving radius information of the geometry data on a first coordinate system based on the radius residual information in the geometry data and the signaling information; and transforming a coordinate of the geometry data including the derived radius information from the first coordinate system to a second coordinate system, and wherein the signaling information includes information related to the radius residual information.

10. The method of claim 9, wherein the first coordinate system is a spherical coordinate system constructed by a radius, an azimuthal angle, and an elevation angle, and the second coordinate system is a Cartesian coordinate system constructed by an x axis, a y axis, and a z axis.

11. The method of claim 9, wherein the point cloud data is obtained by at least one laser at a transmitting side, and a point position of a current frame is estimated based on a point of the reference frame in a state in which the at least one laser and the sampling position are fixed.

12. The method of claim 9, wherein the information related to the radius residual information includes information about whether a prediction error included in the received geometry data includes only the radius residual information or includes the radius residual information, azimuthal angle residual information, and elevation angle residual information.

13. A device for decoding point cloud data, the device comprising:

a receiver configured to receive geometry data, attribute data, and signaling information;

a geometry decoder configured to decode the geometry data including radius residual information based on the signaling information; and an attribute decoder configured to decode the attribute data based on the signaling information and the decoded geometry data, wherein the geometry decoder includes a reconstructor configured to derive radius information of the geometry data on a first coordinate system based on the radius residual information in the geometry data and the signaling information; and a coordinate inverse transformer configured to transform a coordinate of the geometry data including the derived radius information from the first coordinate system to a second coordinate system, and wherein the signaling information includes information related to the radius residual information.

14. The device of claim 13, wherein the first coordinate system is a spherical coordinate system constructed by a radius, an azimuthal angle, and an elevation angle, and the second coordinate system is a Cartesian coordinate system constructed by an x axis, a y axis, and a z axis.

15. The device of claim 13, wherein the point cloud data is obtained by at least one laser at a transmitting side, and a point position of a current frame is estimated based on a point of the reference frame in a state in which the at least one laser and the sampling position are fixed.

16. The device of claim 13, wherein the information related to the radius residual information includes information about whether a prediction error included in the received geometry data includes only the radius residual information or includes the radius residual information, azimuthal angle residual information, and elevation e residual information.

* * * * *